US011711789B2

(12) United States Patent
Abedini et al.

(10) Patent No.: US 11,711,789 B2
(45) Date of Patent: Jul. 25, 2023

(54) CONTROL SIGNAL DESIGN FOR SMART REPEATER DEVICES

(71) Applicant: QUALCOMM Incorporated, San Diego, CA (US)

(72) Inventors: Navid Abedini, Basking Ridge, NJ (US); Tao Luo, San Diego, CA (US); Ashwin Sampath, Skillman, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/234,642

(22) Filed: Apr. 19, 2021

(65) Prior Publication Data
US 2022/0053486 A1 Feb. 17, 2022

Related U.S. Application Data

(60) Provisional application No. 63/066,031, filed on Aug. 14, 2020.

(51) Int. Cl.
*H04W 72/04* (2023.01)
*H04B 7/155* (2006.01)
(Continued)

(52) U.S. Cl.
CPC .... *H04W 72/0446* (2013.01); *H04B 7/15542* (2013.01); *H04L 5/14* (2013.01)

(58) Field of Classification Search
CPC ... H04W 72/0446; H04B 7/15542; H04L 5/14
See application file for complete search history.

(56) References Cited

U.S. PATENT DOCUMENTS

2019/0230545 A1* 7/2019 Liou ............... H04W 76/19
2019/0306924 A1* 10/2019 Zhang ............. H04B 7/063
(Continued)

OTHER PUBLICATIONS

International Search Report and Written Opinion—PCT/US2021/040734—ISA/EPO—dated Oct. 25, 2021.
(Continued)

*Primary Examiner* — Huy D Vu
*Assistant Examiner* — Bailor C Hsu
(74) *Attorney, Agent, or Firm* — Loza & Loza, LLP

(57) ABSTRACT

Aspects of the disclosure relate to repeater controlled by a base station. The repeater receives control signaling including control information in association with traffic relayed through the repeater, between a first wireless communication device and a second wireless communication device, the repeater obtains a time division duplex state from the control information, obtains a fronthaul-link transmission control indicator (TCI) state index from the control information, obtains an access-link TCI state index from the control information, obtains a time domain resource allocation from the control information, and configures a relay unit of the repeater to communicate the traffic between the first wireless communication device and the second wireless communication device based the control information comprising at least one of: the time division duplex state, the fronthaul-link TCI state index, the access-link TCI state index, and the time domain resource allocation. The base station sends the control signaling to control the repeater.

30 Claims, 22 Drawing Sheets

(51) Int. Cl.
 *H04L 5/14* (2006.01)
 *H04W 72/0446* (2023.01)

(56) References Cited

U.S. PATENT DOCUMENTS

| | | | |
|---|---|---|---|
| 2019/0312698 A1* | 10/2019 | Akkarakaran | H04L 5/0048 |
| 2019/0373450 A1* | 12/2019 | Zhou | H04W 8/24 |
| 2019/0394793 A1 | 12/2019 | Venugopal et al. | |
| 2020/0267713 A1* | 8/2020 | Bagheri | H04L 5/0053 |
| 2020/0350972 A1* | 11/2020 | Yi | H04L 1/12 |
| 2020/0367230 A1* | 11/2020 | Raghavan | H04L 5/0035 |
| 2021/0160881 A1* | 5/2021 | Rahman | H04W 72/23 |
| 2021/0250144 A1* | 8/2021 | Nam | H04L 5/0057 |
| 2021/0321276 A1* | 10/2021 | Kim | H04W 76/27 |
| 2021/0328641 A1* | 10/2021 | Xu | H04B 7/0617 |

OTHER PUBLICATIONS

Qualcomm: "New SID on Smart Repeaters for NR", 3GPP Draft, 3GPP TSG RAN Meeting #88e, RP-201139, 3rd Generation Partnership Project (3GPP), Mobile Competence Centre, 650, Route Des Lucioles, F-06921, Sophia-Antipolis Cedex, France, vol. TSG RAN, No. Electronic Meeting, Jun. 29, 2020-Jul. 3, 2020, Jun. 22, 2020 (Jun. 22, 2020), XP051903778, 4 Pages, Retrieved from the Internet: URL: https://ftp.3gpp.org/tsg_ran/TSG_RAN/TSGR_88e/Docs/RP-201139.zip RP-201139-Draft SID-on smart repeaters.doc [retrieved on Jun. 22, 2020] chapter 3, sections 3 and 4.1.

\* cited by examiner

| Parameter | Range of Values |
|---|---|
| Time Division Duplex State 1 | 0 (DL), 1 (UL) |
| Fronthaul TCI State Index 1 | 0, ..., g1-1 |
| Access Link TCI State Index 1 | 0, ..., h1-1 |
| Time Division Duplex State 2 | 0 (DL), 1 (UL) |
| Fronthaul TCI State Index 2 | 0, ..., g2-1 |
| Access Link TCI State Index 2 | 0, ..., h2-1 |
| Time Configuration | Start Symbol and Duration |

FIG. 15

CONTROL SIGNAL DESIGN FOR SMART REPEATER DEVICES

CROSS-REFERENCE TO RELATED APPLICATIONS

This application for patent claims priority to and the benefit of provisional patent application No. 63/066,031 entitled "Control Signal Design for Smart Repeater Devices" filed in the United States Patent and Trademark Office on Aug. 14, 2020, the entire content of which is incorporated herein by reference as if fully set forth below in its entirety and for all applicable purposes.

TECHNICAL FIELD

The technology discussed below relates generally to wireless communication systems, and more particularly, to control signal design for smart repeater devices.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station. To extend the coverage of a wireless network, repeater devices may be used to relay communication traffic between two nodes.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to one aspect, a method of wireless communication at a wireless repeater device controlled by a base station in a wireless communication network is disclosed. The method includes receiving, from the base station, control signaling comprising control information, in association with traffic relayed through the repeater device between a first wireless communication device and a second wireless communication device, obtaining a time division duplex state from the control information, obtaining a fronthaul-link transmission control indicator (TCI) state index from the control information, obtaining an access-link TCI state index from the control information, obtaining a time domain resource allocation from the control information, and configuring a relay unit of the repeater device to communicate the traffic between the first wireless communication device and the second wireless communication device using at least one of: the time division duplex state, the fronthaul-link TCI state index, the access-link TCI state index, or the time domain resource allocation.

According to another aspect, a wireless repeater device for wireless communication, controlled by a base station, in a wireless communication network, is disclosed. The wireless repeater device includes a wireless transceiver, a memory, and a processor communicatively coupled to the wireless transceiver and the memory. In one example the processor and the memory are configured to: receive, from the base station, control signaling comprising control information, in association with traffic relayed through the repeater device between a first wireless communication device and a second wireless communication device, obtain a time division duplex state from the control information, obtain a fronthaul-link transmission control indicator (TCI) state index from the control information, obtain an access-link TCI state index from the control information, obtain a time domain resource allocation from the control information, and configure a relay unit of the repeater device to communicate the traffic between the first wireless communication device and the second wireless communication device using at least one of: the time division duplex state, the fronthaul-link TCI state index, the access-link TCI state index, or the time domain resource allocation.

According to another aspect, a method of wireless communication at a base station that controls a wireless repeater device in a wireless communication network is disclosed. The method includes determining to relay traffic, between a first wireless communication device and a second wireless communication device, through the repeater device, obtaining a time division duplex state associated with the traffic, obtaining a fronthaul-link transmission control indicator (TCI) state index associated with the traffic, obtaining an access-link TCI state index associated with the traffic, obtaining a time domain resource allocation associated with the traffic, and transmitting, to the repeater device, control information over control signaling to configure a relay unit of the repeater device to communicate the traffic between the first wireless communication device and the second wireless communication device using the control information comprising at least one of: the time division duplex state, the fronthaul-link TCI state index, the access-link TCI state index, or the time domain resource allocation.

According to another aspect, a base station for wireless communication, that controls a wireless repeater device in a wireless communication network, is disclosed. The wireless base station includes a wireless transceiver, a memory, and a processor communicatively coupled to the wireless transceiver and the memory. In one example the processor and the memory are configured to: determine to relay traffic, between a first wireless communication device and a second wireless communication device, through the repeater device, obtain a time division duplex state associated with the traffic obtain a fronthaul-link transmission control indicator (TCI) state index associated with the traffic obtain an access-link TCI state index associated with the traffic, obtain a time domain resource allocation associated with the traffic, and transmit, to the repeater device, control information over control signaling to configure a relay unit of the repeater device to communicate the traffic between the first wireless communication device and the second wireless communication device using the control information comprising at least one of: the time division duplex state, the fronthaul-link TCI state index, the access-link TCI state index, or the time domain resource allocation.

These and other aspects of the invention will become more fully understood upon a review of the detailed description, which follows. Other aspects, features, and examples will become apparent to those of ordinary skill in the art, upon reviewing the following description of specific examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while examples may be discussed below in terms of specific devices, systems, or methods it should be understood that such examples can be implemented in various devices, systems, or methods.

BRIEF DESCRIPTION OF THE DRAWINGS

FIG. 15 is a table depicting another example of control information that may be carried in control signaling for a repeater device according to some aspects of the disclosure.

DETAILED DESCRIPTION

Figure 1:
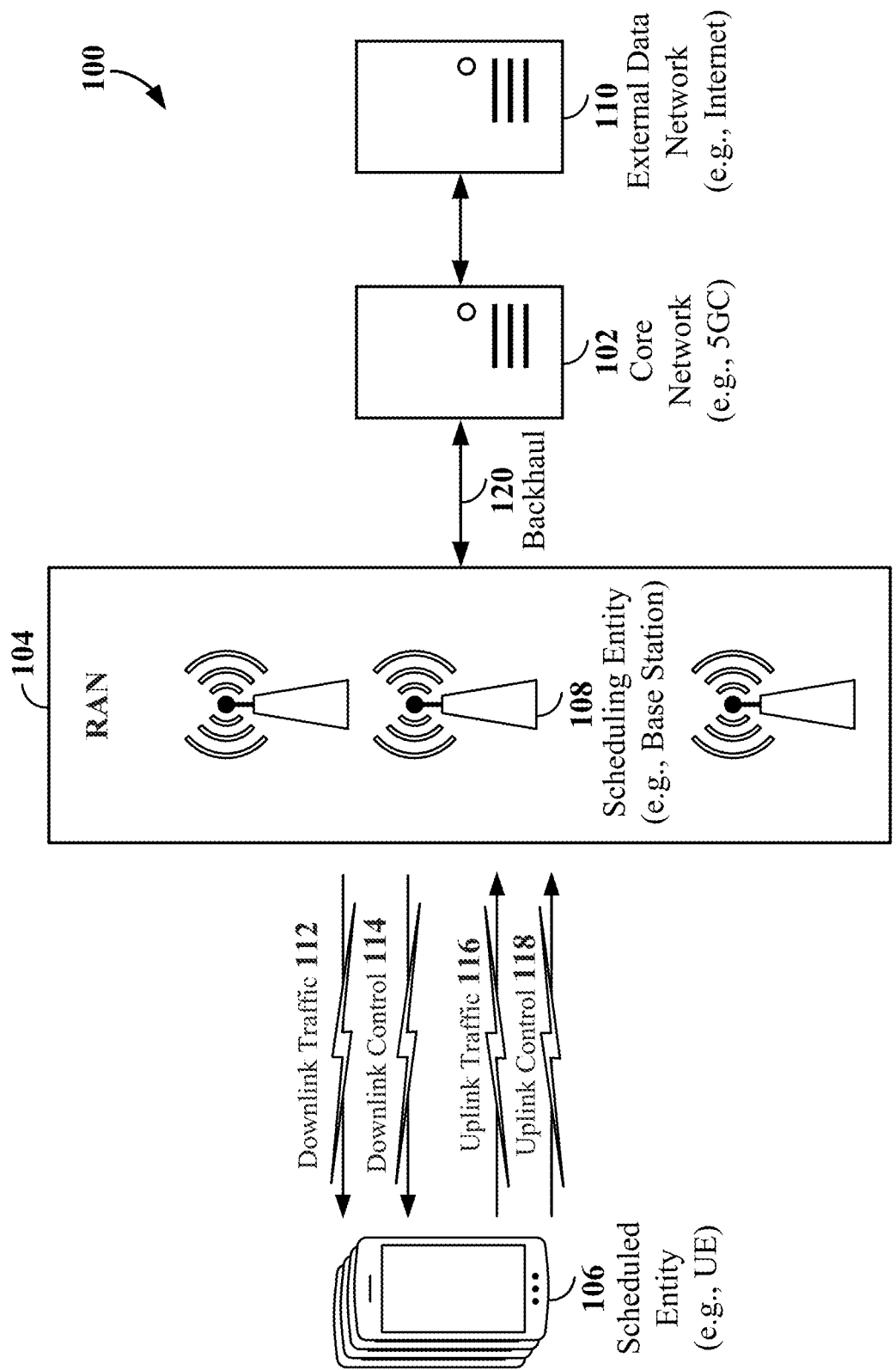
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, well known structures and components are shown in block diagram form in order to avoid obscuring such concepts.

While aspects and examples are described in this application by illustration to some examples, those of ordinary skill in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The disclosure relates to remote control of a repeater device that relays traffic between two nodes (e.g., entities, devices). A base station may remotely control the repeater device. The two entities may be the base station and a user equipment. In some aspects, one or both of the entities are UEs, integrated access and backhaul (IAB) nodes, base stations (including the base station controlling the relay), and/or other repeater devices. Remote control of the repeater device may reduce cost and complexity. The reductions may be realized in simplified hardware and/or software of the repeater device. The repeater device may be, for example, a Layer-1 repeater device, where Layer-1 refers to a lowest layer, a physical layer, of a 5G protocol stack, for example. The repeater device may be referred to as a smart repeater device. The smart repeater device utilizes a Layer-1 repeater device with enhancements. The enhancements may include, for example, functionalities directed toward channel estimation and beamforming. The channel estimation and beamforming functionalities may be applied to a fronthaul-link, between the base station and the repeater device, and/or an access-link, between the repeater device and the user equipment (UE) or wireless communication device in general. The repeater device may obtain fronthaul-link transmission configuration indication (TCI) state indexes and access-link TCI state indexes from control information sent to the repeater device in control signaling from the base station. The repeater device may also obtain time-domain resource allocation (TDRA) control information in the control information from the base station. Other capabilities, such as, for example, transmitter power control may also be received in control information from the base station.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102 (e.g., a 5G core (5GC) network); a radio access network (RAN) 104; and a user equipment (UE) 106 (e.g., a scheduled entity). By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of scheduling entities (schematically illustrated as scheduling entity 108) also referred to herein as base stations. Broadly, a base station is a network element in a radio access network responsible for radio transmission and reception in one or more cells to or from a UE. In different technologies, standards, or contexts, a base station may variously be referred to by those of ordinary skill in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in standards and specifications promulgated by the $3^{rd}$ Generation Partnership Project (3GPP), but may also be referred to by those of ordinary skill in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services. UEs may include a number of hardware structural components sized, shaped, and arranged to help in communication; such components can include antennas, antenna arrays, antenna array modules, RF chains, amplifiers, one or more processors, etc. electrically coupled to each other.

Within the present document, a "mobile" apparatus need not necessarily have a capability to move and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., scheduling entity 108) to one or more UEs (e.g., similar to UE 106) may be referred to as downlink (DL) transmission. In accordance with certain aspects of the present disclosure, the term downlink may refer to a point-to-multipoint transmission originating at the scheduling entity 108 (e.g., a base station). Another way to describe this scheme may be to use the term broadcast channel multiplexing. Transmissions from a UE (e.g., UE 106) to the scheduling entity 108 (e.g., a base station) may be referred to as uplink (UL) transmissions. In accordance with further aspects of the present disclosure, the term uplink may refer to a point-to-point transmission originating at a scheduled entity (e.g., UE 106).

In some examples, access to the air interface may be scheduled, wherein a scheduling entity 108 (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, a plurality of UEs (e.g., a plurality of UE 106), which may be scheduled entities, may utilize resources allocated by the scheduling entity 108.

Base stations, represented in both the singular and the plural by scheduling entity 108, are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities (e.g., one or more UE 106). Broadly, the scheduling entity 108 is a node or device responsible for scheduling traffic in a wireless communication network, including the downlink traffic 112 and, in some examples, uplink traffic 116 from one or more scheduled entities (e.g., one or more UE 106) to the scheduling entity 108. On the other hand, the scheduled entity (e.g., one or more UE 106) may be a node or device that receives downlink control 114 (e.g., downlink control information), including but not limited to scheduling information (e.g., a grant), synchronization or timing information, or other control information from another entity in the wireless communication network such as the scheduling entity 108.

In general, scheduling entities, as graphically represented in the singular and plural by scheduling entity 108, may include a backhaul interface for communication with a backhaul portion 120 of the wireless communication system 100. The backhaul portion 120 may provide a link between the scheduling entity 108 and the core network 102. Further, in some examples, a backhaul network may provide interconnection between the respective base stations (each similar to scheduling entity 108). Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Of further note concerning wireless systems, such as the wireless communication system 100, the electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Figure 2:
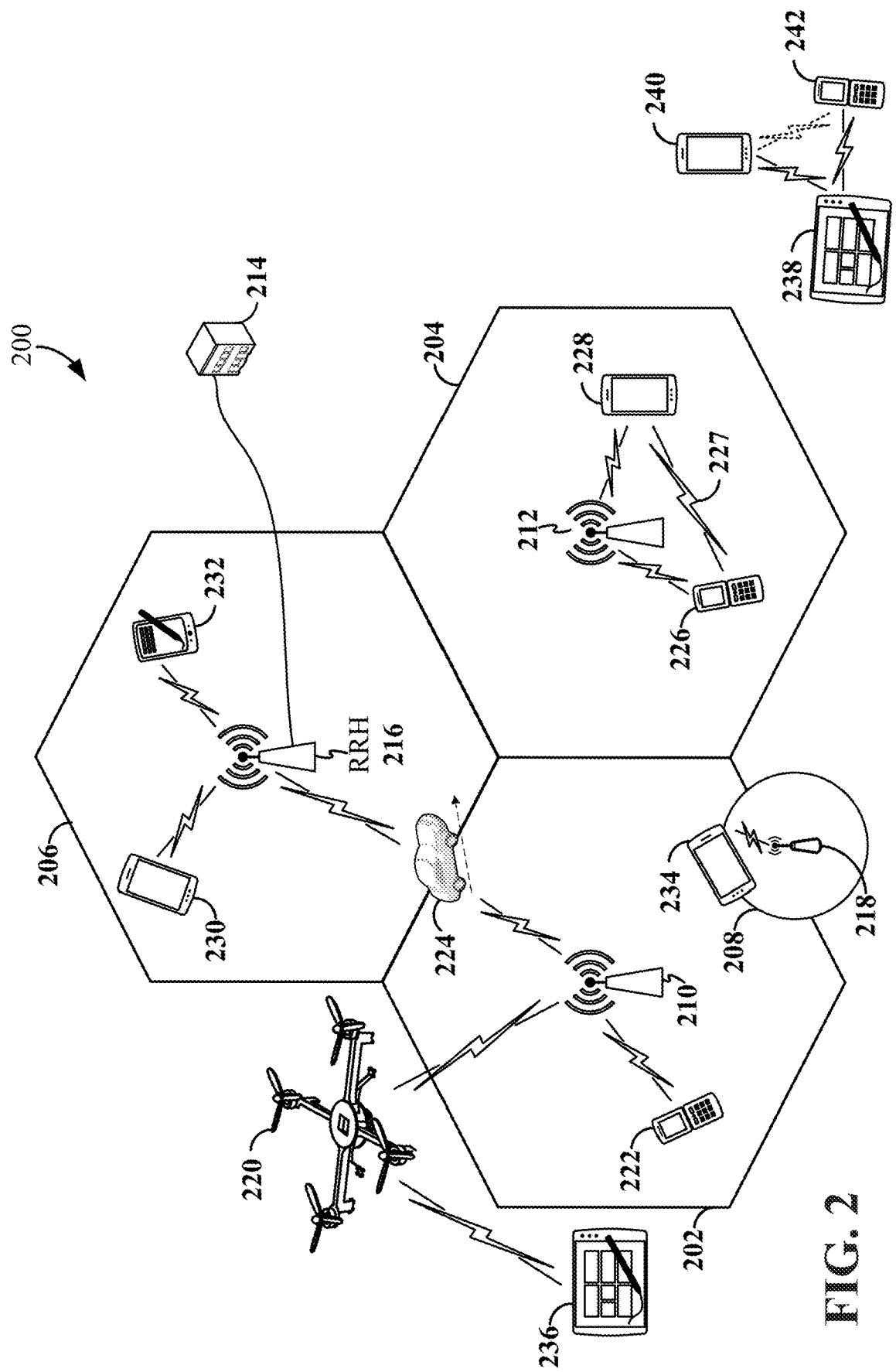
FIG. 2 is a schematic illustration of a radio access network (RAN) according to some aspects of the disclosure.

Referring now to FIG. 2, as an illustrative example without limitation, a schematic illustration of a radio access network (RAN) 200 according to some aspects is provided. In some examples, the RAN 200 may correspond to the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). Cells 202, 204, and 206 may be referred to as macrocells and cell 208 may be referred to as a small cell. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 2, two base stations, base station 210 and base station 212, are shown in cells 202 and 204. A third base station, base station 214, is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208 (e.g., a small cell, a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints. It is to be understood that the RAN 200 may include any number of wireless base stations and cells. Further, a relay node may be deployed to extend the size or coverage area of a given cell.

FIG. 2 further includes a quadcopter or drone, which may be configured to function as a base station, or more specifically as a mobile base station 220. That is, in some examples, a cell may not necessarily be stationary, and the geographic area of the cell may move according to the location of a mobile base station 220 such as a quadcopter or drone. A mobile base station 220 may also provide an access point to a core network.

Within the RAN 200, the cells may include UEs that may be in communication with one or more sectors of each cell. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. Here, each base station 210, 212, 214, 218, and 220 may be configured to provide an access point to a core network (not shown) for all the UEs in the respective cells. In another example, the mobile base station 220 (e.g., the quadcopter) may be configured to function as a UE. For example, the mobile base station 220 may operate within cell 202 by communicating with base station 210. In some examples, the UEs 222, 224, 226, 228, 230, 232, 234, 236, 238, 240, and/or 242 may be the same as or similar to the UE 106 described above and illustrated in FIG. 1.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In some examples, the sidelink signals 227 include sidelink traffic and sidelink control. In a further example, UE 238 is illustrated communicating with UEs 240 and 242. Here, the UE 238 may function as a scheduling entity or a primary/transmitting sidelink device, and UEs 240 and 242 may function as a scheduled entity or a non-primary (e.g., secondary/receiving) sidelink device. For example, a UE may function as a scheduling entity or a scheduled entity in a device-to-device (D2D), peer-to-peer (P2P), vehicle-to-vehicle (V2V) network, vehicle-to-everything (V2X), and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P/D2D configuration, or a mesh configuration, a scheduling entity and one or more scheduled entities may communicate utilizing the scheduled resources.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 200, the ability for a UE to communicate while moving, independent of the location of the UE, is referred to as mobility. The various physical channels between the UE and the RAN 200 are generally set up, maintained, and released under the control of an access and mobility management function (AMF), which may include a security context management function (SCMF) that manages the security context for both the control plane and the user plane functionality and a security anchor function (SEAF) that performs authentication.

In various aspects of the disclosure, a RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell, cell 202, to the geographic area corresponding to a neighbor cell, cell 206. When the signal strength or quality from the neighbor cell 206 exceeds that of its serving cell, cell 202, for a given amount of time, the UE 224 may transmit a reporting message to its serving base station, base station 210, indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

Figure 3:
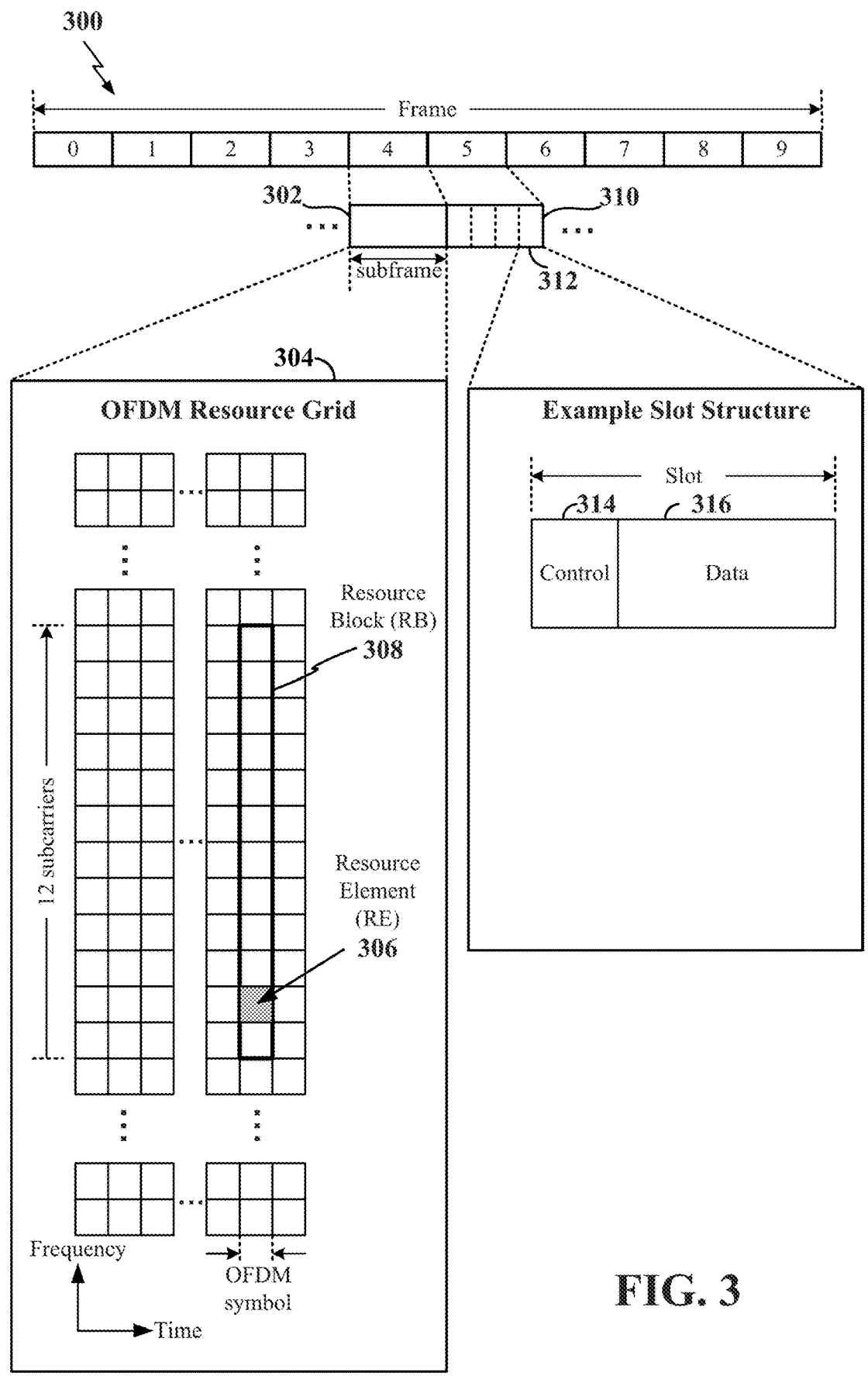
FIG. 3 is a schematic illustration of an organization of wireless resources in an air interface utilizing orthogonal frequency divisional multiplexing (OFDM) according to some aspects of the disclosure.

Various aspects of the present disclosure will be described with reference to an OFDM waveform, an example of which is schematically illustrated in FIG. 3. It should be understood by those of ordinary skill in the art that the various aspects of the present disclosure may be applied, for example, to a discrete Fourier transform-spread-OFDM (DFT-s-OFDM) with a CP (also referred to as single-carrier FDMA (SC-FDMA)) waveform in substantially the same way as described herein below. That is, while some examples of the present disclosure may focus on an OFDM link for clarity, it should be understood that the same principles may be applied as well to DFT-s-OFDM or SC-FDMA waveforms.

Referring now to FIG. 3, an expanded view of an exemplary subframe 302 is illustrated, showing an OFDM resource grid. However, as those of ordinary skill in the art will readily appreciate, the physical (PHY) transmission structure for any particular application may vary from the example described here, depending on any number of factors. Here, time is in the horizontal direction with units of OFDM symbols and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter connectively referred to as USs) for downlink, uplink, or sidelink transmissions may involve scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication, for example.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

According to some examples, a frame may refer to a duration of 10 ms, with each frame sub-divided into 10 subframes 302 of 1 ms each. Each 1 ms subframe may be comprised of one or multiple adjacent slots. In the illustrative example shown in FIG. 3, a subframe on the right includes four slots 310. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., 1, 2, or 3 OFDM symbols). These mini-slots or shortened TTIs may in some cases be transmitted occupying resources scheduled for ongoing slot transmissions for the same or for different UEs. Any number of resource blocks may be utilized within a subframe or slot.

An expanded view of one slot 312 of the four slots 310 of the subframe on the right illustrates the slot 312 as including a control region 314 and a data region 316. In a first example of the slot 312, the control region 314 may carry control channels (e.g., a physical downlink control channel (PDCCH)) and the data region 316 may carry data channels (e.g., a physical downlink shared channel (PDSCH)). In a second example of the slot 312, the control region 314 may carry control channels (e.g., a physical uplink control channel (PUCCH)) and the data region 316 may carry data channels (e.g., a physical uplink shared channel (PUSCH)). Of course, a slot may contain all DL, all UL, or at least one DL portion and at least one UL portion. The structures illustrated in FIG. 3 are merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 312 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., DL REs within the control region 314) to carry DL control information (DCI) including one or more DL control channels, such as a physical downlink control channel (PDCCH), to one or more scheduled entities (e.g., UEs). The PDCCH carries DCI, including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 314 or the data region 316) to carry other DL signals, such as a demodulation reference signal (DMRS), a phase-tracking reference signal (PT-RS), a positioning reference signal (PRS), a channel state information reference signal (CSI-RS), and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESETO), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals, may include one or more supplemental channels in addition to the PBCH, may omit a PBCH, and/or may utilize nonconsecutive symbols for an SS block, within the scope of the present disclosure.

In an UL transmission, the scheduled entity may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding references signal (SRS) and an uplink DMRS. In some examples, the UCI may include a scheduling request (SR), i.e., a request for the scheduling entity to schedule uplink transmissions. Here, in response to the SR transmitted on the UCI, the scheduling entity may transmit DCI that may schedule resources for uplink packet transmissions. UCI may also include HARQ feedback, channel state feedback (CSF), such as a CSI report, or any other suitable UCI.

In addition to control information, one or more REs 306 (e.g., within the data region 316) may be allocated for traffic (e.g., user data). Such traffic may be carried on one or more traffic channels, such as, for a DL transmission, a physical downlink shared channel (PDSCH), or for an UL transmission, a physical uplink shared channel (PUSCH). In some examples, one or more REs 306 within the data region 316 may be configured to carry other signals, such as one or more SIBs and DMRSs.

In an example of sidelink communication over a sidelink carrier via a PC5 interface, the control region 314 of the slot 312 may include a physical sidelink control channel (PSCCH) including sidelink control information (SCI) transmitted by an initiating (transmitting) sidelink device (e.g., Tx V2X or other Tx UE) towards a set of one or more other receiving sidelink devices (e.g., Rx V2X device or other Rx UE). The data region 316 of the slot 312 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs within slot 410. For example, HARQ feedback information may be transmitted in a physical sidelink feedback channel (PSFCH) within the slot 410 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In 5G NR, a physical downlink shared channel (PDSCH) may be repeated on a plurality of time domain resource allocation (TDRA) candidate occasions (e.g., on two or more TDRA candidate occasions) with different transmission configuration indicator (TCI) states. Each PDSCH repetition may carry the same transport block (TB). Here, a TCI state indicates quasi co-location (QCL) information for the PDSCH repetition. An example of a QCL type is QCL-TypeD, which indicates a spatial Rx parameter (e.g., spatial property of a beam on which the PDSCH repetition is transmitted). The spatial property of the beam may be inferred from an associated reference signal (e.g., synchronization signal block (SSB), channel state information—reference signal (CSI-RS), etc.) and may indicate, for example, at least one of a beam direction or a beam width. Each TCI state specifies an antenna downlink beam. Accordingly, if there are two TCI states configured for a PDSCH transmission to a UE, there may be two antenna downlink beams (e.g., two downlink beams emanating from a network access node such as a gNB toward a wireless communication device). Accordingly, two mini-slots may provide a wireless communication device with two PDSCH repetitions, one PDSCH repetition for each antenna downlink beam.

Prior to conveying data in a plurality of PDSCH repetitions, for example, a gNB may convey TDRA information to the wireless communication device. The TDRA information may be conveyed in downlink control information (DCI) within a PDCCH. The TDRA information defines, among other things, where a wireless communication device should expect to locate, in a slot, valid TDRA candidate occasions in the time domain. In some examples, only a first TDRA for a PDSCH first repetition is indicated to a wireless communication device by a gNB. The wireless communication device may reuse the first TDRA for a PDSCH second repetition by shifting the first TDRA by a fixed time gap.

As indicated above, PDSCHs are transmitted in a downlink from the network access node (e.g., base station, such as the gNB) to the wireless communication device in the downlink direction. As a consequence, the symbol positions in the portions of a slot carrying the PDSCH repetitions are generally configured for transmissions in the downlink direction. Nevertheless, because the same symbol positions used for PDSCH repetitions are used for other channels at other times, one or all of the symbols may have been, or will be, configured to handle traffic in the uplink direction. Additionally, the symbols for PDSCH data may have been allocated using semi-persistent-scheduling (SPS). With SPS, a given set of symbols may be allocated for periodic downlink data without needing to schedule each individual downlink transmission. After scheduling the periodic downlink data transmissions using SPS, some form of dynamic scheduling from an upper layer may override the previously established SPS. As a consequence, it is possible that a symbol, for example, of a mini-slot used for a PDSCH repetition, may be utilized to carry uplink data or uplink control. Consequently, if coordination is somehow lacking, it is possible for there to be a collision between data flowing in the downlink direction and data flowing in the uplink direction on the same symbol in a given slot.

In some examples, if any of a plurality of PDSCH repetitions collides with at least one symbol configured by a higher layer as an uplink symbol, the wireless communication device will skip decoding of all of the plurality of PDSCH repetitions and send a "fake" NACK to the network access node to memorialize the skipped decoding of all of the PDSCH repetitions. The NACK is referred to as "fake" because the NACK is not based on a decoding of the symbols per se; that is, the NACK is not based on actual decoding. Instead, the NACK is based on recognition of a non-decoding, or skipped decoding, event. The PDSCH repetitions that are not decoded are referred to as being "dropped."

The result of the dropped PDSCH repetition is a consequence of a rule in, for example, a semi-static ACK/NACK codebook, such as the type-1 codebook. The codebook indicates that the position of the ACK/NACK bit(s) for PDSCH repetitions are decided by the signaled TDRA for the PDSCH first repetition. If the PDSCH first repetition is dropped, due, for example, to a collision, the corresponding TDRA candidate occasions (for the remaining one or more additional PDSCH repetitions) will not be considered in the codebook construction and, hence, no position for corresponding ACK/NACK bit(s) is established for those remaining additional PDSCH repetitions. However, dropping a plurality of PDSCH repetitions, including both collided repetitions and the non-collided repetitions is inefficient.

In various aspects of the disclosure, in general, for mini-slot based repetition, a wireless communication device may receive downlink channel repetitions (e.g., PDSCH repetitions) and, if any of the downlink channel repetitions collides with an uplink symbol, or is otherwise not able to be decoded, none of the downlink channel repetitions will be dropped. The rules set out herein are exemplified for certain codebook types, for example codebook types 1 or 2, but the rules are not limited to these codebook types.

Figure 4:
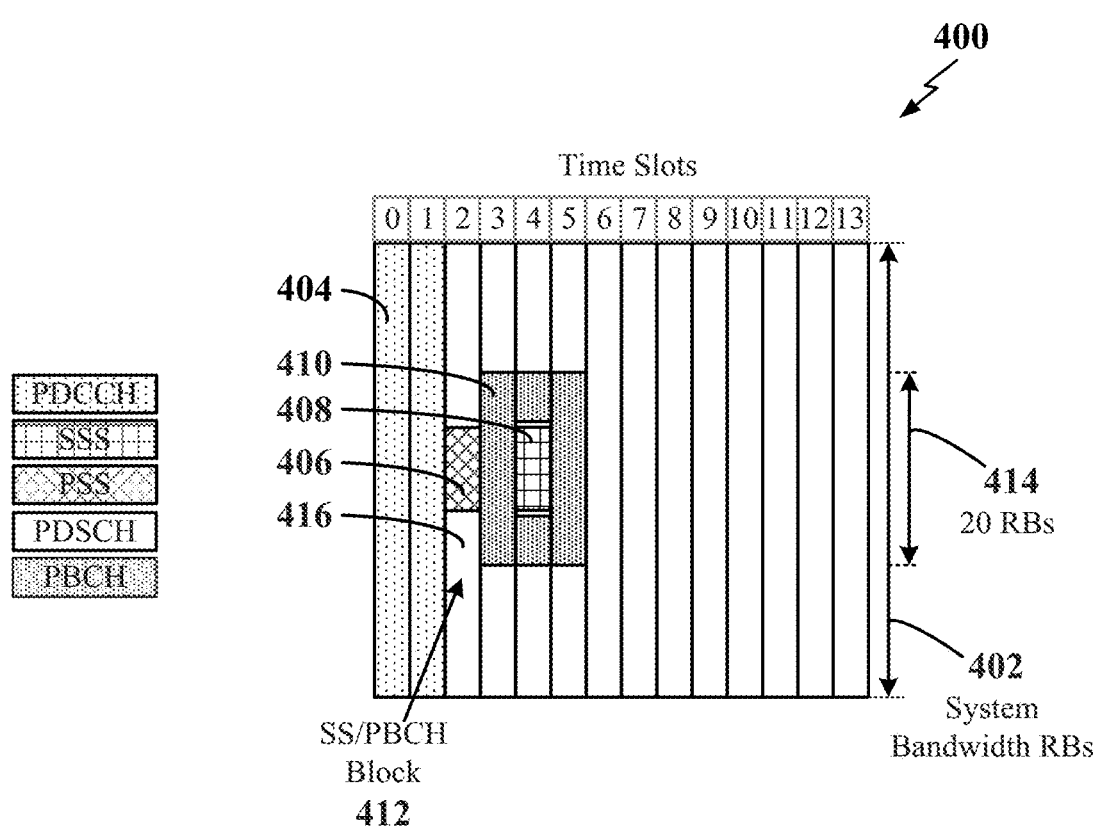
FIG. 4 is a diagram of an example of downlink channels according to some aspects of the disclosure.

FIG. 4 is a diagram 400 illustrating an example of DL channels within a 5G NR subframe. In this example (e.g., for a slot configuration 0), each slot may include 14 symbols. A first double-headed arrowed line indicates a subset of the system bandwidth RBs 402 (e.g., a subset of the resource grid 304 of FIG. 3). The symbols on the DL may be cyclic prefix (CP) OFDM (CP-OFDM) symbols in some examples.

A physical downlink control channel (PDCCH) 404 may carry a DCI within one or more control channel elements (CCEs). Each CCE may include nine resource element (RE) groups (REGs), where each REG may include four consecutive REs in an OFDM symbol.

A primary synchronization signal (PSS) 406 is shown in symbol 2 of the subframe. A UE may use the PSS 406 to determine subframe and symbol timing and a physical layer identity. A secondary synchronization signal (SSS) 408 is shown in symbol 4 of the subframe. The SSS 408 may be used by a UE to determine a physical layer cell identity group number and radio frame timing. Based on the physical layer identity and the physical layer cell identity group number, the UE can determine a physical cell identifier (PCI). Based on the PCI, the UE can determine the locations of DMRS. A physical broadcast channel (PBCH) 410, which carries a master information block (MIB) as discussed herein, may be logically grouped with the PSS 406 and the SSS 408 to form an SS/PBCH block 412. The MIB may indicate the number of RBs in the system bandwidth, a system frame number (SFN), and other information. As indicated by a second arrowed line, the length of the SS/PBCH block 412 is 20 RBs 414 in this example.

A physical downlink shared channel (PDSCH) 416 carries user data, broadcast system information not transmitted through the PBCH such as system information blocks (SIBs), and paging messages. In addition, the PDSCH 416 may carry a DCI (e.g., control-related information) in some examples.

A brief discussion of an initial access procedure for a UE using the above information follows. As discussed above, a BS may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over the PBCH and may broadcast the RMSI and/or the OSI over the PDSCH.

A UE attempting to access a RAN may perform an initial cell search by detecting a PSS from a BS (e.g., the PSS of a cell of the BS) of the RAM. The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive the SI from the BS. The system information may take the form of the MIB and SIBs discussed above. The system information includes essential or critical information for a UE to access the network such as downlink (DL) channel configuration information, uplink (UL) channel configuration information, access class information, and cell barring information, as well as other less critical information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN (e.g., the RAN 200 of FIG. 2). In some examples, SIB 2 includes random access configuration information (e.g., a RACH configuration) that indicates the resources that the UE is to use to communicate with the RAN during initial access. The random access configuration information may indicate, for example, the resources allocated by the RAN for a PRACH procedure. For example, the RACH configuration may indicate the resources allocated by the network for the UE to transmit a PRACH preamble and to a receive random access response. In some examples, the RACH configuration identifies monitoring occasions (MOs) that specify a set of symbols (e.g., in a PRACH slot) that are scheduled by a base station for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

Figure 5:
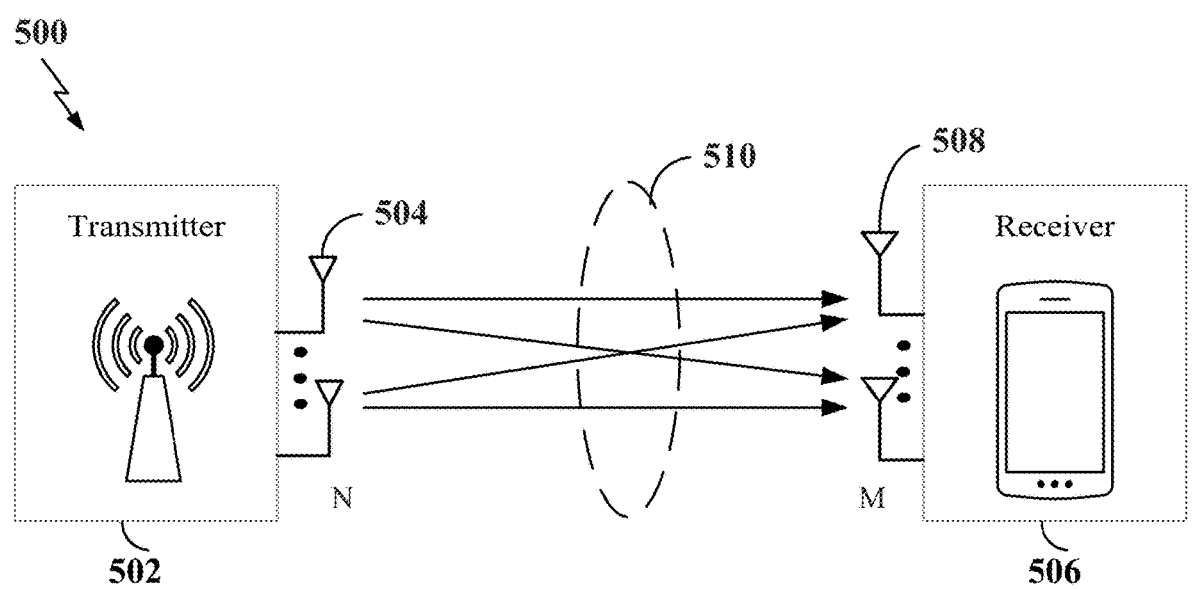
FIG. 5 is a block diagram illustrating an example of a wireless communication system supporting beamforming and/or multiple-input multiple-output (MIMO) communication according to some aspects of the disclosure.

In some aspects of the disclosure, the scheduling entity and/or scheduled entity may be configured for beamforming and/or multiple-input multiple-output (MIMO) technology. FIG. 5 illustrates an example of a wireless communication system 500 supporting beamforming and/or MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a scheduling entity, a scheduled entity, or any other suitable wireless communication device. The transmitter 502 may correspond to any of the BSs (e.g., gNBs,) or scheduling entities shown in any of FIGS. 1, 2, 6, 7, 8, 9, 11, 12, 21 and/or 19. The receiver 506 may correspond to any of the UEs or scheduled entities of FIGS. 1, 2, 6, 7, 8, 9, 11, 12, 18, and/or 19.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). Spatial multiplexing may be achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 500 (MIMO system) is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (hereinafter a beam) (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link Reciprocal beams are within the scope of the disclosure.

Figure 6:
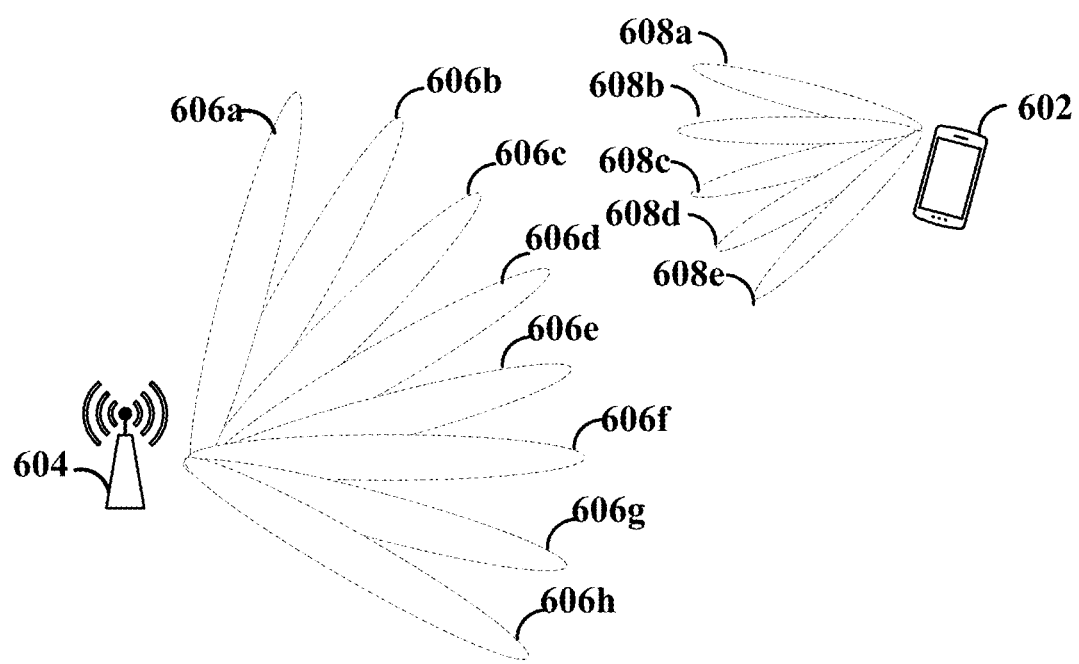
FIG. 6 is a diagram illustrating an example of communication between a radio access network (RAN) node and a wireless communication device using beamforming according to some aspects of the disclosure.

FIG. 6 is a diagram illustrating communication between a base station 604 and a UE 602 using beamformed signals according to some aspects of the disclosure. The base station 604 may correspond to any of the BSs (e.g., gNBs,) or scheduling entities shown in any of FIGS. 1, 2, 5, 7, 8, 9, 11, 12, 21 and/or 19. The UE 602 may correspond to any of the UEs or scheduled entities of FIGS. 1, 2, 5, 7, 8, 9, 11, 12, 18, and/or 19.

In the example shown in FIG. 6, the base station 604 is configured to generate a plurality of beams 606a-606h, each associated with a different beam direction. In addition, the UE 602 is configured to generate a plurality of beams 608a-608e, each associated with a different beam direction. The base station 604 and UE 602 may select one or more beams 606a-606h on the base station 604 and one or more beams 608a-608e on the UE 602 for communication of uplink and downlink signals therebetween using a downlink beam management scheme and/or an uplink beam management scheme.

In an example of a downlink beam management scheme for selection of downlink beams, the base station 604 may be configured to sweep or transmit on each of a plurality of downlink transmit beams 606a-606h during one or more synchronization slots. For example, the base station 604 may transmit a reference signal, such as an SSB or CSI-RS, on each beam in the different beam directions during the synchronization slot.

Transmission of the beam reference signals may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 606a-606h transmitted during a same symbol may not be adjacent to one another. In some examples, the base station 604 may transmit more or less beams distributed in all directions (e.g., 360 degrees).

In addition, the UE 602 is configured to receive the downlink beam reference signals on a plurality of downlink receive beams 608a-608e. In some examples, the UE 602 searches for and identifies each of the downlink transmit beams 606a-606h based on the beam reference signals. The UE 602 then performs beam measurements (e.g., RSRP, SINR, RSRQ, etc.) on the beam reference signals on each of the downlink receive beams 608a-608e to determine the respective beam quality of each of the downlink transmit beams 606a-606h as measured on each of the downlink receive beams 608a-608e.

The UE 602 can generate and transmit a beam measurement report, including the respective beam index and beam measurement of each downlink transmit beam 606a-606h on each downlink receive beam 608a-608e to the base station 604. The base station 604 may then select one or more downlink transmit beams on which to transmit unicast downlink control information and/or traffic (e.g., user data) to the UE 602. In some examples, the selected downlink transmit beam(s) has (have) the highest gain from the beam measurement report. In some examples, the UE 602 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 604 or the UE 602 may further select a corresponding downlink receive beam on the UE 602 for each selected serving downlink transmit beam to form a respective downlink beam pair link (BPL) for each selected serving downlink transmit beam. Reciprocal beams are within the scope of the disclosure. For example, the UE 602 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 606d) on the base station 604 and a single downlink receive beam (e.g., beam 608c) on the UE may form a single downlink BPL used for communication between the base station 604 and the UE 602. In another example, multiple downlink transmit beams (e.g., beams 606c, 606d, and 606e) on the base station 604 and a single downlink receive beam (e.g., beam 608c) on the UE 602 may form respective downlink BPLs used for communication between the base station 604 and the UE 602. In another example, multiple downlink transmit beams (e.g., beams 606c, 606d, and 606e) on the base station 604 and multiple downlink receive beams (e.g., beams 608c and 608d) on the UE 602 may form multiple downlink BPLs used for communication between the base station 604 and the UE 602. In this example, a first downlink BPL may include downlink transmit beam 606c and downlink receive beam 608c, a second downlink BPL may include downlink transmit beam 608d and downlink receive beam 608c, and a third downlink BPL may include downlink transmit beam 608e and downlink receive beam 608d.

When the channel is reciprocal, the above-described downlink beam management scheme may also be used to select one or more uplink BPLs for uplink communication from the UE 602 to the base station 604. For example, the downlink BPL formed of beams 606d and 608e may also serve as an uplink BPL. Here, beam 608c is utilized as an uplink transmit beam, while beam 606d is utilized as an uplink receive beam.

In an example of an uplink beam management scheme, the UE 602 may be configured to sweep or transmit on each of a plurality of uplink transmit beams 608a-608e. For example, the UE 602 may transmit an SRS on each beam in the different beam directions. In addition, the base station 604 may be configured to receive the uplink beam reference signals on a plurality of uplink receive beams 606a-606h. In some examples, the base station 604 searches for and identifies each of the uplink transmit beams 608a-608e based on the beam reference signals. The base station 604 then performs beam measurements (e.g., RSRP, SINR, RSRQ, etc.) on the beam reference signals on each of the uplink receive beams 606a-606h to determine the respective beam quality of each of the uplink transmit beams 608a-608e as measured on each of the uplink receive beams 606a-606h.

The base station 604 may then select one or more uplink transmit beams on which the UE 602 will transmit unicast downlink control information and/or traffic (e.g., user data) to the base station 604. In some examples, the selected uplink transmit beam(s) has (have) the highest gain. The base station 604 may further select a corresponding uplink receive beam on the base station 604 for each selected serving uplink transmit beam to form a respective uplink beam pair link (BPL) for each selected serving uplink transmit beam. Reciprocal beams are within the scope of the disclosure. For example, the base station 604 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The base station 604 may then notify the UE 602 of the selected uplink transmit beams. For example, the base station 604 may provide the SRS resource identifiers (IDs) identifying the SRSs transmitted on the selected uplink transmit beams. In some examples, the base station 604 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 602. When the channel is reciprocal, the above-described uplink beam management scheme may also be used to select one or more downlink BPLs for downlink communication from the base station 604 to the UE 602. For example, the uplink BPLs may also be utilized as downlink BPLs.

Figure 7:
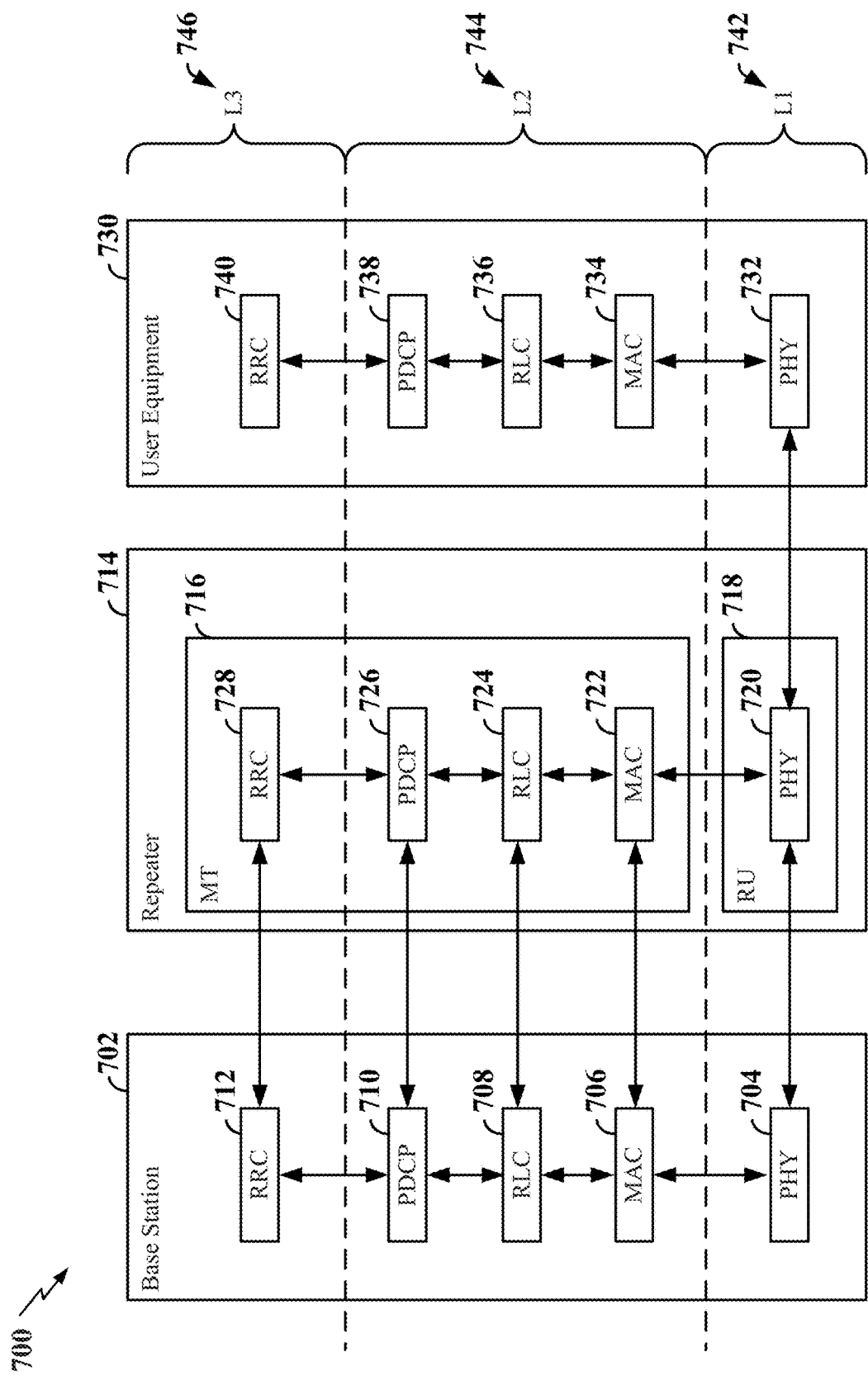
FIG. 7 is a diagram illustrating an example of a radio protocol architecture 700 in a control plane according to some aspects of the disclosure.

FIG. 7 is a diagram illustrating an example of a radio protocol architecture 700 in a control plane according to some aspects of the disclosure. The radio protocol architecture 700 may be that of a 5G wireless system. The radio protocol stacks may be implemented in devices operating in a 5G wireless network. FIG. 7 depicts a control plane protocol stack of a base station 702, a repeater device 714, and a UE 730. The base station 604 may correspond to any of the BSs (e.g., gNBs,) or scheduling entities of FIGS. 1, 2, 5, 6, 8, 9, 11, 12, 21 and/or 19. The UE 602 may correspond to any of the UEs or scheduled entities of FIGS. 1, 2, 5, 6, 8, 9, 11, 12, 18, and/or 19. The repeater device 714 may correspond to any of the repeater devices of FIGS. 8, 9, 10, 11, 12, 18, an/or 19.

As illustrated in FIG. 7, the radio protocol architecture 700 includes three layers: layer 1 (L1); layer 2 (L2); and layer 3 (L3). L1 742 is the lowest layer, L2 744 is above L1 742, and L3 746 is above L2 744.

With respect to the repeater device 714, an implementation of the protocol stack may be divided between a relay unit (RU) 718 in L1 742 and a mobile termination (MT) 716 in L2 744 and L3 746. In L1 742, the physical (PHY) layer 720 of the RU 718 may operate as a relay, relaying modulated RF analog signals (e.g., digital content on analog carriers) in the uplink and downlink directions between the physical (PHY) layer 704 of the base station 702 and the physical layer (PHY) 732 of the UE 730.

There are at least two types of relay procedures that may be used by the repeater device 714 to relay traffic (e.g., user data) through the repeater device 714 between the base station 702 and the UE 730. A first relay procedure may be referred to as a Layer-1 relay procedure, which may be implemented by a Layer-1 relay. A second relay procedure may be referred to as a Layer-2 relay procedure.

According to aspects described herein, the repeater device 714 may be configured as a Layer-1 relay operating according to a Layer-1 relay procedure. When operating as a Layer-1 relay, the repeater device 714 receives a signal as a modulated RF waveform at a receiver coupled to a receive antenna array, amplifies the signal, and retransmits the signal from a transmitter coupled to a transmit antenna array. Therefore, a Layer-1 relay may be referred to as an amplify and forward relay. In general, a Layer-1 relay may not require a great amount of upper level functionality to perform the amplify and forward type function and may be less complex and less costly than a Layer-2 relay.

A repeater device, such as repeater device 714, may be configured to operate as a Layer-2 relay. When operating as a Layer-2 relay, the repeater device 714 may receive a signal as a modulated RF waveform at receiver coupled to a receive antenna array, demodulate and decode the signal to obtain a digital representation of the signal, re-encode and re-modulate the signal, amplify, and then forward the signal from a transmitter coupled to a transmit antenna array. Therefore, a Layer-2 relay may be referred to as a decode and forward type of relay. In general, a Layer-2 relay is more complex than a Layer-1 relay and may require a greater amount of upper level functionality (in comparison to a Layer-1 relay) to perform the decode and forward type of operation. Therefore, the Layer-2 relay may be more complex and more costly than a Layer-1 relay.

According to some aspects of the disclosure, the repeater device 714 may be configured as, and referred to as, a smart repeater device. The smart repeater device may apply some upper level functionality to a Layer-1 relay but may not provide the level of functionality that would be required to operate as a Layer-2 relay. For example, while the smart repeater device may not use higher level functionality to demodulate, decode, encode, and re-modulate a signal, the smart relay may use higher level functionality to sense channels, implement MIMO functionality, select various beams in conjunction with a use of various synchronization signal block (SSB) information and transmission configuration indicator (TCI) states, and may adjust transmit power of a modulated RF waveform being amplified and forwarded by the Layer-1 relay of the smart repeater device.

Returning to FIG. 7, in the control plane, the various layers for each of the base station 702, the repeater device 714, and the UE 730 are similar and will be described once to avoid repetition. The layers include the PHY layer 704, 720, 732 at the L1 layer 742, the medium access control (MAC) layer 706, 722, 734, radio link control (RLC) layer 708, 724, 736, and packet data convergence protocol (PDCP) layer 710, 726, 738 at the L2 layer 744, and the RRC layer 712, 728, 740 at the L3 layer 746.

The PHY layer 704, 720, 732 may be responsible for transmitting and receiving data on physical channels (e.g., within slots). MAC SDUs may be placed in MAC PDUs for transport over transport channels to the PHY layer 704, 720, 732. A PHY context may indicate a transmission format and a radio resource configuration (e.g., bandwidth part (BWP), numerology, etc.). Functions of the PHY layer 704, 720, 732 may include, for example, error detection on transport channels and indications to higher layers, forward error correction encoding/decoding of the transport channels, hybrid automatic repeat request (HARQ) soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, multiple input multiple output (MIMO) antenna processing, transmit diversity, digital and analog beamforming, and RF processing The MAC layer 706, 722, 734 may provide services to upper layers and obtains services from the PHY layer 704, 720, 732. The PHY layer 704, 720, 732 offers transport channels to the MAC layer 706, 722, 734 to support transport services for data transfer over the radio interface. The MAC layer 706, 722, 734 offers logical channels to the RLC layer 708, 724, 736. The logical channels exist between the MAC and PHY layers, while transport channels exist between the PHY and radio layer. Therefore, the MAC layer may be an interface between higher layer logical channels and PHY layer transport channels. The functions of the MAC layer 706, 722, 734 may include, for example, beam management random access procedure, mapping between logical and transport channels, and concatenation of multiple MAC SDUs belonging to one logical channel into a transport block (TB).

The RLC layer 708, 724, 736 may provide segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 708, 724, 736.

The PDCP layer 710, 726, 738 may provide packet sequence numbering, in-order delivery of packets, retransmission of PDCP protocol data units (PDU), and transfer of upper layer data packets to lower layers. PDUs may include, for example, Internet Protocol (IP) packets, Ethernet frames and other unstructured data (i.e., machine-type communication (MTC), hereinafter collectively referred to as "packets"). The PDCP layer 710, 726, 738 may also provide header compression for upper layer data packets to reduce radio transmission overhead, security by ciphering the data packets, and integrity protection of data packets. A PDCP context may indicate whether PDCP duplication is utilized for a unicast connection, for example.

The RRC layer 712, 728, 740 of the L3 layer 746 may be responsible for establishing and configuring signaling radio bearers (SRBs) and data radio bearers (DRBs) between the base station 702 and the UE 730 and/or between the base station 702 and the repeater device 714, paging initiated by the 5GC or NG-RAN, and broadcast of system information related to Access Stratum (AS) and Non Access Stratum (NAS). The RRC layer 712, 728, 740 may further be responsible for QoS management, mobility management (e.g., handover, cell selection, inter-RAT mobility), UE 730 measurement and reporting, and security functions.

In the user plane (not shown), the radio protocol architecture for the base station 702, the repeater device 714, and the UE 730 are substantially similar for the L1 layer 742 and the L2 layer 744 and will not be repeated to avoid repetition. The user plane protocol stack does not include an RRC layer 712, 728, 740. The user plane protocol stack does include, for example, a service data adaptation protocol (SDAP) layer (not shown) in the L3 layer 746. The SDAP layer (not shown) may provide a mapping between a 5G core (5GC) quality of service (QoS) flow and a data radio bearer and performs QoS flow ID marking in both downlink and uplink packets.

The channels, carriers, and protocol layers described above and illustrated in FIGS. 1-7 are not necessarily all the channels, carriers, and protocol layers that may be utilized between a base station 702, a repeater device 714, and UE 730, and those of ordinary skill in the art will recognize that other channels, carriers, and protocol layers may be utilized in addition to the channels, carriers, and protocol layers that may be illustrated herein, such as other traffic, control, and feedback channels.

Figure 8:
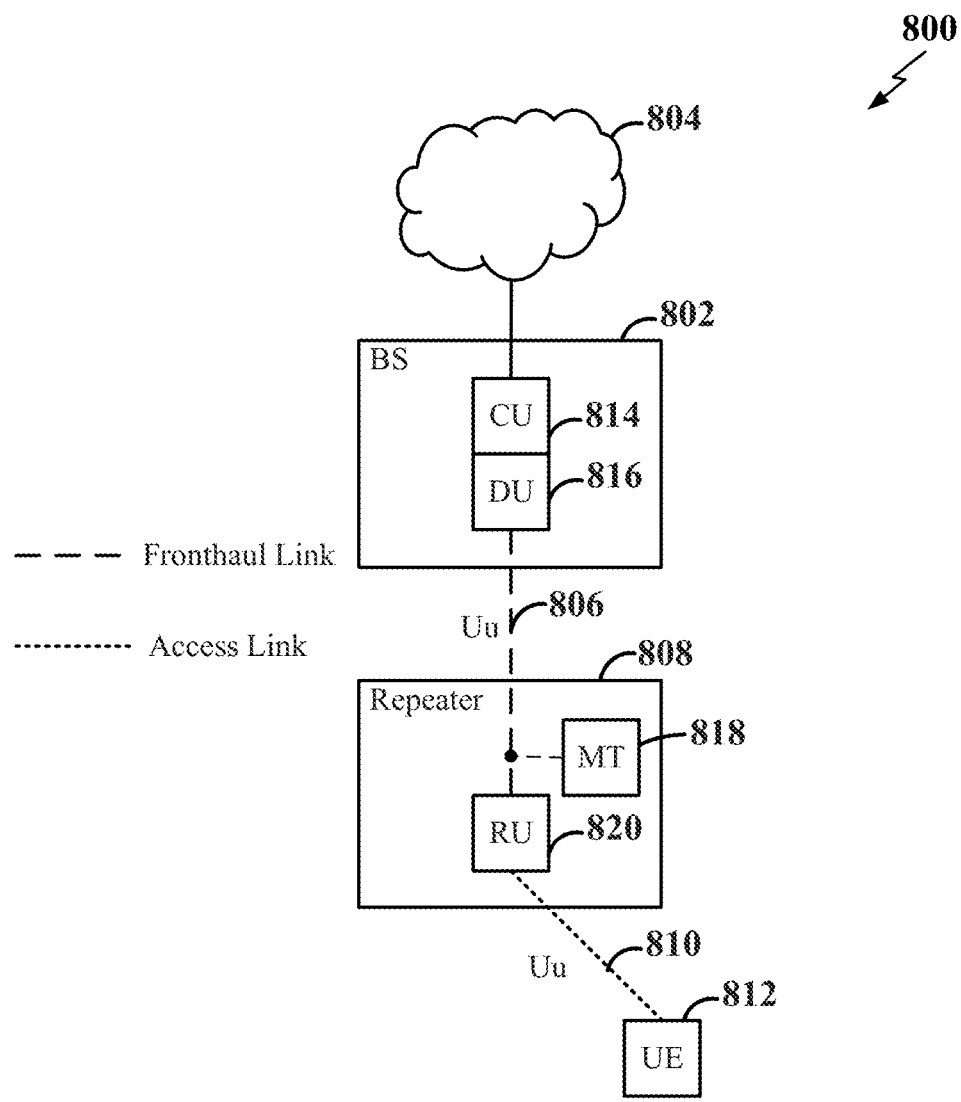
FIG. 8 is a diagram illustrating an example of a repeater device in a wireless communication system according to some aspects of the disclosure.

In some wireless communication networks, the functionality of the base stations and/or other components of the network may be distributed across multiple entities. FIG. 8 illustrates a wireless communication network 800 that may be utilized in some aspects of the disclosure. In this illustration, a network entity such as a base station (BS) 802 is coupled to a remote network 804, such as a main backhaul network or mobile core network. In the wireless communication network 800, wireless spectrum may be used for a fronthaul-link 806 between the base station 802 and a repeater device 808 and for an access-link 810 between the repeater device 808 and a UE 812. The fronthaul-link 806 and the access-link 810 may each be conducted over a Uu radio interface or some other suitable wireless communication interface. In some examples, the wireless spectrum may utilize millimeter-wave (mmWave) frequencies and/or sub-6 GHz carrier frequencies.

The wireless communication network 800 may include other base stations, UEs, and repeater devices (not shown). The base station 802 and other base stations may correspond to any of the BSs (e.g., gNBs,) or scheduling entities of FIGS. 1, 2, 5, 6, 7, 9, 11, 12, 19, and/or 21. The repeater device 808 and other repeater devices may correspond to any of the repeater devices of FIGS. 7, 9, 10, 11, 12, 18, and/or 19. A repeater device may also be referred to as a repeater, a relay, a relay device, and the like. The UE 812 and other UEs may be correspond to any of the UEs or scheduled entities of FIGS. 1, 2, 5, 6, 7, 9, 11, 12, 19, and/or 21.

In the example of FIG. 8, the base station 802 may be referred to as a donor node since the base station 802 provides a communication link to the remote network 804. A donor node may include, for example, a wired (e.g., fiber, coaxial cable, Ethernet, copper wires), microwave, or another suitable link to the remote network 804.

The base station 802 may be an enhanced gNB including functionality for controlling the wireless communication network 800. In some examples (e.g., as shown in FIG. 8), the base station 802 may include a central unit (CU) 814 and a distributed unit (DU) 816. The CU 814 is configured to operate as a centralized network node (or central entity) within the wireless communication network 800. For example, the CU 814 may include radio resource control (RRC) layer functionality and packet data convergence protocol (PDCP) layer functionality to control/configure the other nodes (e.g., repeater devices and UEs) within the wireless communication network 800. In some aspects, RRC signaling may be used for various functions including, as one example, setting up and releasing user data bears. In some examples, RRC signaling messages may be transported over signaling bearers (e.g., SRB 1 and SRB 2).

The DU 816 is configured to operate as a scheduling entity to schedule scheduled entities (e.g., repeater devices and/or UEs) of the base station 802. For example, the DU 816 may operate as a scheduling entity to schedule the repeater device 808 and the UE 812. In some examples, the DU 816 may include radio link control (RLC), medium access control (MAC), and physical (PHY) layer functionality to enable operation as a scheduling entity.

An F1 interface provides a mechanism to interconnect the CU 814 (e.g., PDCP layer and higher layers) and the DU 816 (e.g., RLC layer and lower layers). In some aspects, an F1 interface may provide control plane and user plane functions (e.g., interface management, system information management, UE context management, RRC message transfer, etc.). FLAP is an application protocol for F1 that defines signaling procedures for F1 in some examples. The F1 interfaces support F1-C on the control plane and F1-U on the user plane.

To facilitate wireless communication between the base station 802 and the UEs (e.g., the UE 812) served by the base station 802, the repeater device 808 may be configured to operate as a scheduled entity. The repeater device 808 may include a mobile termination (MT) unit 818 to enable scheduled entity functionality. For example, the MT unit 818 may include UE functionality to connect to the base station 802 and to be scheduled by the base station 802.

The repeater device 808 also includes a repeating unit 820 that relays signals between the base station 802 and the UE 812. The repeating unit 820 may also be referred to as a relay unit, a remote unit, and the like. The signal relay functionality and other repeater device functionality will be described in more detail below in conjunction with FIGS. 9-13.

Figure 9:
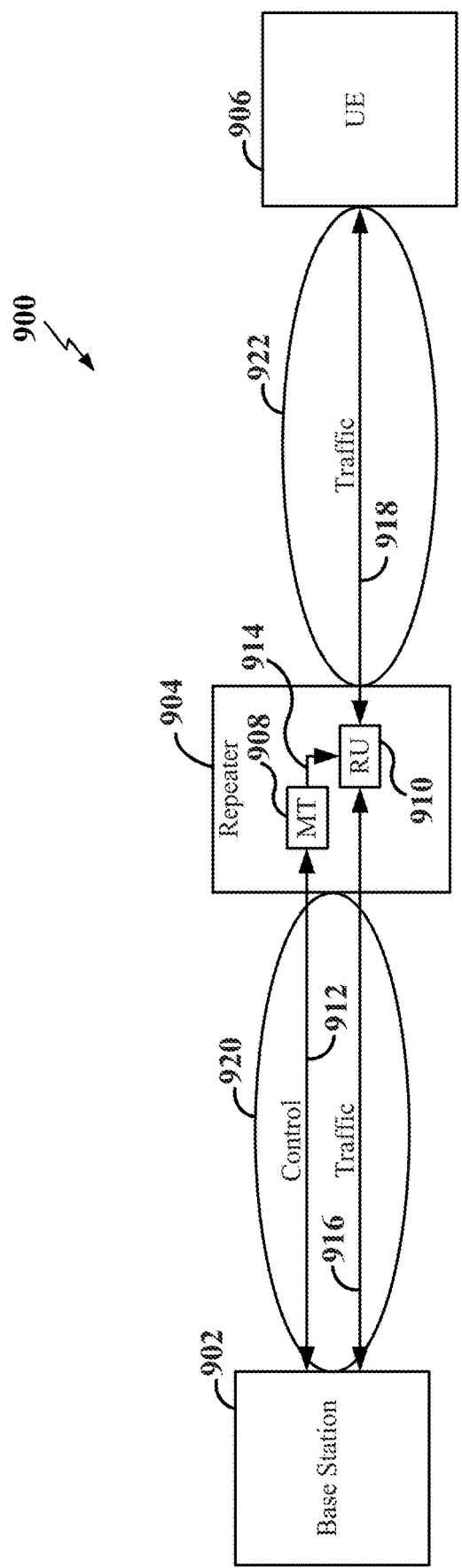
FIG. 9 is a block diagram illustrating example components and communication links associated with a repeater device according to some aspects of the disclosure.

FIG. 9 is a block diagram illustrating example components and communication links associated with a repeater device 904 according to some aspects of the disclosure. The repeater device 904 may be in communication with both a base station 902 and a UE 906. The base station 902 may correspond to any of the base stations or scheduling entities of FIGS. 1, 2, 5, 6, 7, 8, 11, 12, 19, and/or 21. The repeater device 904 may correspond to any of the repeater devices of FIGS. 7, 8, 10, 11, 12, 18, and/or 19. The UE 906 may correspond to any of the UEs or scheduled entities of FIGS. 1, 2, 5, 6, 7, 8, 11, 12, 19, and/or 21.

Millimeter wave communications have a higher frequency and shorter wavelength than other types of radio waves used for communications (e.g., sub-6 GHz communications). Consequently, millimeter wave communications may have shorter propagation distances and may be more easily blocked by obstructions than other types of radio waves. For example, a wireless communication carried over sub-6 GHz radio waves may be capable of penetrating a wall of a building or a structure to provide coverage to an area on an opposite side of the wall from a base station that communicates using the sub-6 GHz radio waves. However, a millimeter wave might not be capable of penetrating the same wall (e.g., depending on a thickness of the wall, a material from which the wall is constructed, and/or the like). Thus, a repeater device 904 may be used to increase the coverage area of a base station 902, to extend coverage to UEs (represented by UE 906) without line of sight to the base station 902 (e.g., due to an obstruction and/or the like).

For example, an obstruction (not shown) between the UE 906 and a base station 902 may block or otherwise reduce the quality of a link between the UE 906 and the base station 902. However, a repeater device 904 may be placed so that there are no obstructions or fewer obstructions between the repeater device 904 and the UE 906 and between the repeater device 904 and the base station 902. Thus, communications between the base station 902 and the UE 906 via the repeater device 904 may have a higher quality than communications directly between the base station 902 the UE 906.

In some examples, the repeater device 904 may perform directional communication by using beamforming to communicate with the base station 902 via a first beam pair 920 (e.g., a fronthaul-link beam pair) and to communicate with the UE 906 via a second beam pair 922 (e.g., an access-link beam pair). The term "beam pair" may refer to a transmit (Tx) beam used by a first device for transmission and a receive (Rx) beam used by a second device for reception of information transmitted by the first device via the Tx beam. Reciprocal beams are within the scope of the disclosure. In FIG. 9, the first beam pair 920 and the second beam pair 922 are each represented by a single oval shape.

The repeater device 904 includes the MT unit 908 and an RU 910 as discussed above in conjunction with FIGS. 7-9. The MT unit 908 communicates control information with the base station 902 via a bidirectional control path 912 (e.g., a bidirectional control path). The control path 912 between the MT unit 908 and the base station 902 (e.g., a DU in the base station 902, not shown) may be encompassed within the first beam pair 920 (e.g., encompassed within the fronthaul-link). In some examples, the control path 912 carries UL and DL control information to configure the repeater device 904. The control path 912 may be implemented using a relatively small BWP that is in-band with the BWPs allocated for UL transmission and/or DL transmission between the base station 902 and the UE 906. In some examples, the first beam pair 920 (e.g., the fronthaul-link) may operate within the FR2 frequency range. In some examples, the fronthaul-link may implement a reduced functionality Uu interface that may be modified to support repeater device functionality.

The base station 902 may also communicate control information to the UE 906 via the repeater device 904. The path for the UE 906 control information is not depicted in FIG. 9 to avoid cluttering the drawing.

The RU 910 provides relaying (e.g., reception, amplification, and transmission) functionality to permit communication of traffic (e.g., user data) from the base station 902 to reach the UE 906 and/or to enable traffic from the UE 906 to reach the base station 902. The RU 910 communicates with the base station 902 via a first traffic path 916 (e.g., a bidirectional traffic path) between the RU 910 and the base station 902. The first traffic path 916 may be encompassed within the first beam pair 920 (e.g., encompassed within the fronthaul-link). In some examples, the RU 910 may be an analog pass-through device (e.g., without store and forward capability). In other examples, the RU 910 may include store and forward functionality. Traffic between the base station 902 and the repeater device 904 may be carried over the first traffic path 916 of the first beam pair 920 (e.g., via the fronthaul-link). Traffic between the repeater device 904 and the UE 906 may be carried over a second traffic path 918 encompassed by the second beam pair 922 (e.g., via the access-link). The first traffic path 916 of the first beam pair 920 may carry analog UL traffic and DL traffic between the base station 902 and the repeater device 904. The second traffic path 918 of the second beam pair 922 may carry analog UL traffic and DL traffic between the repeater device 904 and the UE 906. In some examples, the second beam pair 922 (e.g., the access-link) may operate at the FR2 frequency range.

The RU 910 and the second traffic path 918 (e.g., of the access-link) may be controlled by the base station 902 (e.g., by a DU in the base station 902, not shown). For example, the base station 902 may schedule UL transmissions and DL transmissions on the access-link (e.g., by transmitting control information on a control channel (not shown) to the UE 906). In addition, the base station 902 may control the operation of the RU 910 through the MT unit 908. For example, the base station 902 may configure the MT unit 908 via the control path 912 described above to cause the MT unit 908 to configure the RU 910. To this end, the MT unit 908 may generate control signaling carried by a signal path 914 for controlling the operation of the RU 910.

Figure 10:
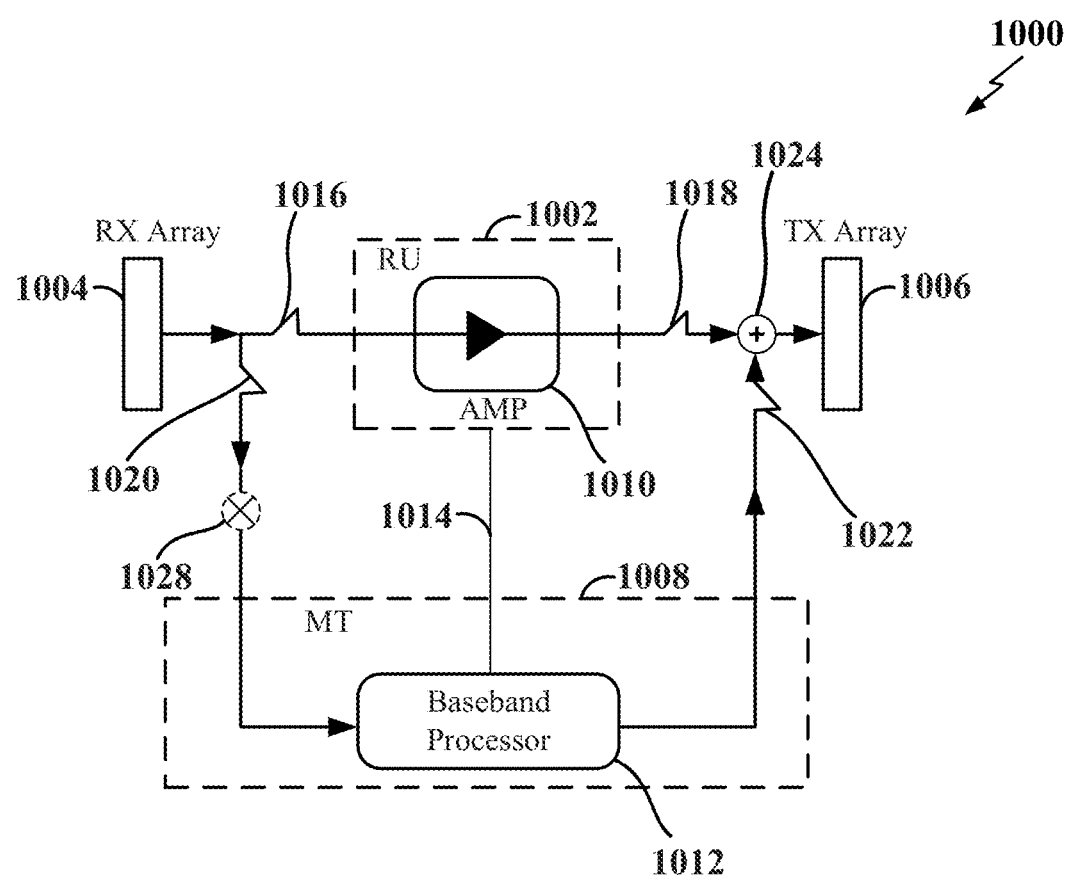
FIG. 10 is a schematic diagram illustrating example components of a repeater device according to some aspects of the disclosure.

FIG. 10 is a diagram illustrating an example of a repeater device 1000. The repeater device 1000 may correspond to any of the repeater devices described herein in FIGS. 7, 8, 9, 11, 12, 18, and/or 19. In some examples, the repeater device 1000 may be a millimeter wave repeater device that communicates via millimeter wave transmissions (e.g., as opposed to sub-6 GHz transmissions).

The repeater device 1000 may include a relay unit (RU) 1002, one or more antenna arrays (or antennas, antenna panels, and/or the like) such as a receive (Rx) array 1004 and a transmit (Tx) array 1006, and an MT unit 1008 as discussed herein. The RU 1002 includes an amplifier 1010 for amplifying signals received via the receive array 1004 and transmitting the amplified signals via the transmit array 1006. The mobile termination (MT) unit 1008 includes a baseband processor 1012 for processing signals received from a base station (not shown) over a control path as discussed above, controlling the operation of the RU 1002 as necessary (e.g., via control signaling 1014), and transmitting signals to the base station via the control path.

An antenna array may include multiple antenna elements capable of being configured for beamforming. An antenna array may be referred to as a phased array because phase values and/or phase offsets of the antenna elements may be configured to form a beam, with different phase values and/or phase offsets being used for different beams (e.g., in different directions). In some aspects, an antenna array may be a fixed receive (Rx) antenna array capable of only receiving communications while not transmitting communications. In some aspects, an antenna array may be a fixed transmit (Tx) antenna array capable of only transmitting communications while not receiving communications. In some aspects, an antenna array may be configured to act as an Rx antenna array or a Tx antenna array (e.g., via a Tx/Rx switch, a MUX/DEMUX, and/or the like). An antenna array may be capable of communicating using millimeter waves and/or other types of RF analog signals.

The amplifier 1010 includes one or more components capable of amplifying an input signal and outputting an amplified signal. For example, the amplifier 1010 may include a power amplifier, a variable gain component, and/or the like. In some aspects, amplifier 1010 may have variable gain control. In some examples, the level of amplification of the amplifier 1010 may be controlled by the baseband processor 1012 (e.g., under the direction of the base station or based on input and/or output signal power measured and/or calculated or otherwise determined by and at the repeater device 1000).

The baseband processor 1012 includes one or more components capable of controlling one or more other components of repeater device 1000. For example, the baseband processor 1012 may include a controller, a microcontroller, a processor, and/or the like. In some aspects, the baseband processor 1012 may control a level of amplification or gain applied by the amplifier 1010 to an input signal. Additionally, or alternatively, the baseband processor 1012 may control an antenna array by controlling a beamforming configuration for the antenna array (e.g., one or more phase values for the antenna array, one or more phase offsets for the antenna array, one or more power parameters for the antenna array, one or more beamforming parameters for the antenna array, a Tx beamforming configuration, an Rx beamforming configuration, and/or the like), by controlling whether the antenna array acts as a receive antenna array or a transmit antenna array (e.g., by configuring interaction and/or connections between the antenna array and switches), and/or the like. Additionally, or alternatively, the baseband processor 1012 may power on or power off one or more components of repeater device 1000 (e.g., when a base station does not need to use the repeater device to serve UEs). In some aspects, the baseband processor 1012 may control timing of one or more of the above configurations.

The baseband processor 1012 may include a component capable of communicating with a base station via the control path. In some aspects, the baseband processor 1012 may communicate with the base station using one or more in-band radio frequencies (e.g., radio frequencies that are included within an operating frequency bandwidth of the antenna arrays). If communicating using one or more in-band radio frequencies, the base station may configure a BWP within the operating frequency bandwidth of the antenna arrays (e.g., an in-band BWP) such that the BWP carries the control interface associated with the repeater device 1000.

In some examples, the baseband processor 1012 may include one or more components for digital signal processing (e.g., digital signal processor, a baseband processor, a digital-to-analog converter (DAC), an analog-to-digital converter (ADC), and/or the like). In this way, the baseband processor 1012 may demodulate, decode, and/or perform other types of processing on the control information received from a base station.

Switches 1016, 1018, 1020, and 1022 include one or more components capable of enabling the repeater device 1000 to either relay a signal received via a receive antenna array or to transmit an RF analog signal generated by the repeater device 1000 (e.g., generated by the MT unit 1008). For example, in one configuration, the switches 1016, 1018, 1020, and 1022 may be configured to couple the RU 1002 to the receive array 1004 and the transmit array 1006. In another configuration, the switches 1016, 1018, 1020, and 1022 may be configured to couple the MT unit 1008 to the receive array 1004 and the transmit array 1006. In some examples, the position of each of the switches 1016, 1018, 1020, and 1022 may be controlled by the MT unit 1008.

Switches (not shown) may be used to multiplex and/or demultiplex communications received from and/or transmitted to an antenna array. For example, switches (e.g., multiplexer/demultiplexers) may be used to switch an Rx antenna array to a Tx antenna array, or vice versa.

A summer 1024 (e.g., a multiplexer) may include functionality to combine signals from the amplifier 1010 with signals from the MT unit 1008. For example, signals for the traffic path (e.g., user data signals) may be provided on the frequency bands for the BWPs allocated for data transmission, while signals for the control path may be provided on the frequency band(s) for the BWP allocated for control transmission. A demultiplexer 1028 could be used in some examples (e.g., to demultiplex the control path from an incoming signal). The switches 1016, 1018, 1020, and 1022 may be controlled individually, in pairs, in triplets, or all together. The position (e.g., opened or closed) of one switch may or may not dictate the position of any other switch.

Figure 11:
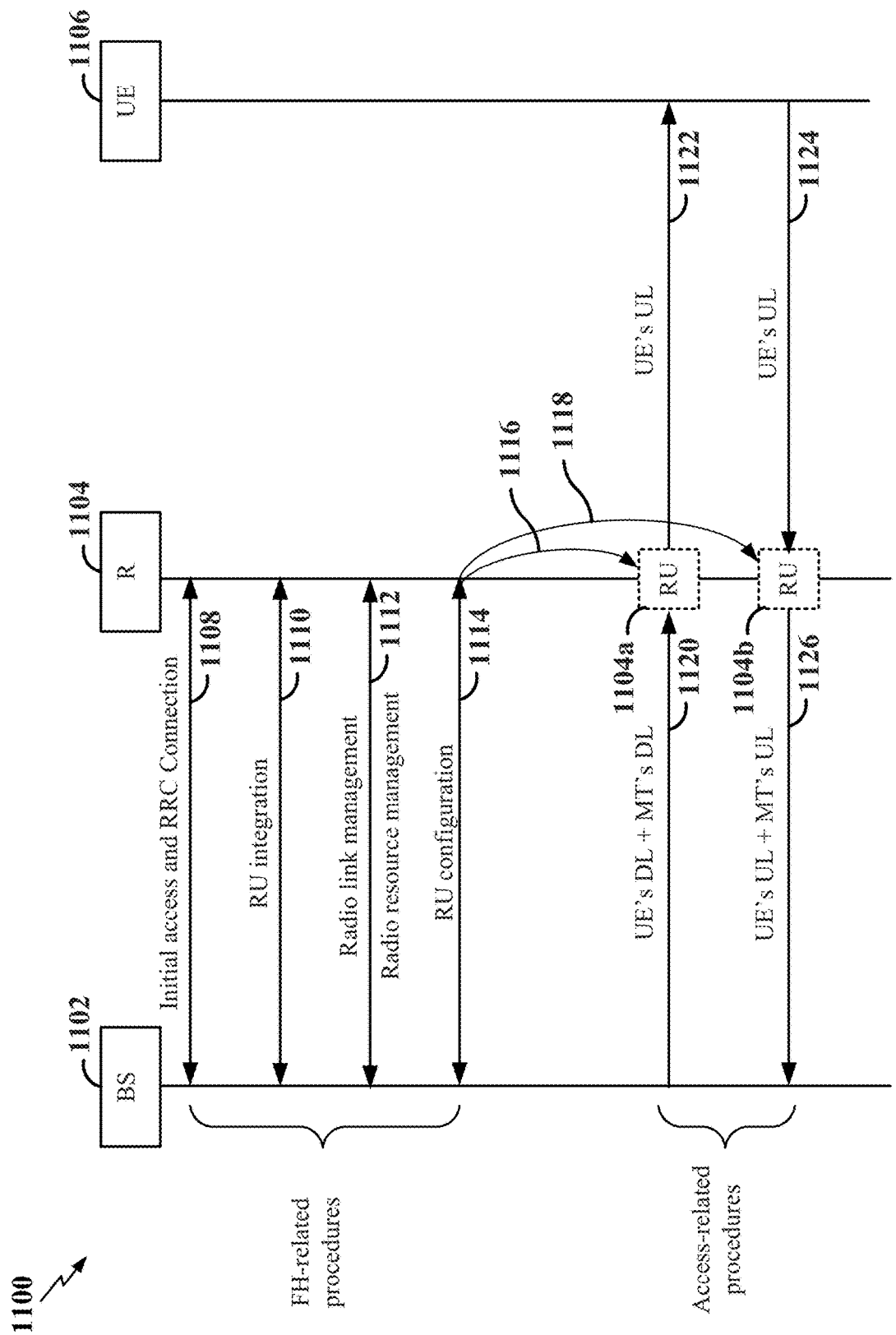
FIG. 11 is a signaling diagram illustrating an example of repeater device signaling according to some aspects of the disclosure.

FIG. 11 illustrates an example of call signaling 1100 in a wireless communication network including a base station (BS) 1102, a repeater device 1104, and a UE 1106. The base station 1102 may correspond to any of the base stations or scheduling entities of FIGS. 1, 2, 5, 6, 7, 8, 9, 12, 19, and/or 21. The repeater device 1104 may correspond to any of the repeater devices of FIGS. 7, 8, 9, 10, 12, 18, and/or 19. The UE 1106 may correspond to any of the UEs or scheduled entities of FIGS. 1, 2, 5, 6, 7, 8, 9, 12, 19, and/or 21.

At call 1108 of FIG. 11, the BS 1102 and the repeater device 1104 perform an initial access procedure and establish an RRC connection. The initial access procedure and establishment of an RRC connection may be communicated over a Uu link as discussed above using a specified (e.g., configurable) BWP. An initial BWP may be used as a default. The Uu link may use a single component carrier (CC) in some examples. An MT unit (not shown) of the repeater device 1104 may perform similar procedures as a UE (e.g., access, radio link management (RLM), and beam management (BM)). The procedures may be simplified and/or modified versions of RF and radio resource management (RRM) requirements/procedures may be adopted.

During call 1108, the BS 1102 and the repeater device 1104 may identify the beams they will use to communicate with each other. In addition, the BS 1102 and the repeater device 1104 may exchange configuration information, capability information, and other information in some examples.

At call 1110, the BS 1102 and the repeater device 1104 perform an RU integration procedure. For example, the BS 1102 may learn the capabilities of an RU of the repeater device. Here, the repeater device (e.g., the MT) may identify itself as a repeater device and share its capabilities. The shared information may include, for example, beam-related information and a required latency for implementing a configuration.

At call 1112, the BS 1102 and the repeater device 1104 perform radio link management and radio resource management procedures. For example, the BS 1102 may specify beam information and allocate resources.

At call 1114, the BS 1102 and the repeater device 1104 perform an RU configuration procedure. Here, the BS 1102 may send control information (e.g., control messages) to configure the operation of an RU. For example, the BS 1102 may send configuration information for an RU (e.g., for RU 1104*a* and/or RU 1104*b*) of the repeater device 1104 to the MT unit (not shown) of the repeater device 1104. Thus, in some examples, the RU configuration procedure may control the operation of a first RU 1104*a* (as represented by a line 1116) for DL traffic and control and may control the operation of a second RU 1104b (as represented by a line 1118) for UL traffic. New messages may be defined to configure the RU operation. The new messages may be communicated within an allocated BWP of an MT, for example. The configuration may include, for example, beamforming configurations and TDD configurations (e.g., Rx & Tx (forwarding) beamforming) and/or time-domain resource allocation (e.g., identify the resources used to adopt the indicated configuration or the indicated BF configuration). The configuration may also include TX power configuration. The configuration may also provide for a configurable operating bandwidth (which may utilize RF processing and/or filtering).

An RU-specific DCI format, which may be scrambled by an RU-RNTI, may be defined to provide the required configurations. In addition to supporting a dynamic configuration (e.g., a default mode), semi-persistent and periodic configurations may also be supported. Configuration via MAC-CE or RRC (e.g., for semi-persistent/periodic modes) also may be supported.

At call 1120, the BS 1102 transmits DL traffic and control for the UE 1106 and DL control for the MT unit (not shown) to the repeater device 1104. Then, at call 1122, the first RU 1104a forwards (relays, repeats) the DL traffic and control for the UE 1106 to the UE 1106. Here, the repeater device 1104 may demultiplex the DL control for the MT unit from the DL control for the UE 1106 from the transmissions (e.g., control and traffic) from the BS 1102. Downlink control for the MT unit need not be forwarded to the UE. The DL control for the MT unit may or may not be multiplexed with the DL control for the UE 1106 on the same time resources.

At call 1124, the UE 1106 transmits UL traffic to the repeater device 1104. At call 1126, the second RU 1104b forwards (relays, repeats) the UL control and traffic from the UE 1106 to the BS 1102 along with UL control from the MT. Here, the second RU 1104b may multiplex the UL control from the MT unit with the UL control from the UE 1106. The UL control from the MT unit may or may not be multiplexed with the UL control from the UE 1106 on the same time resources. A repeater device, such as repeater device 1104, may relay control and traffic (e.g., collectively referred to as signaling) to and from multiple UEs.

Figure 12:
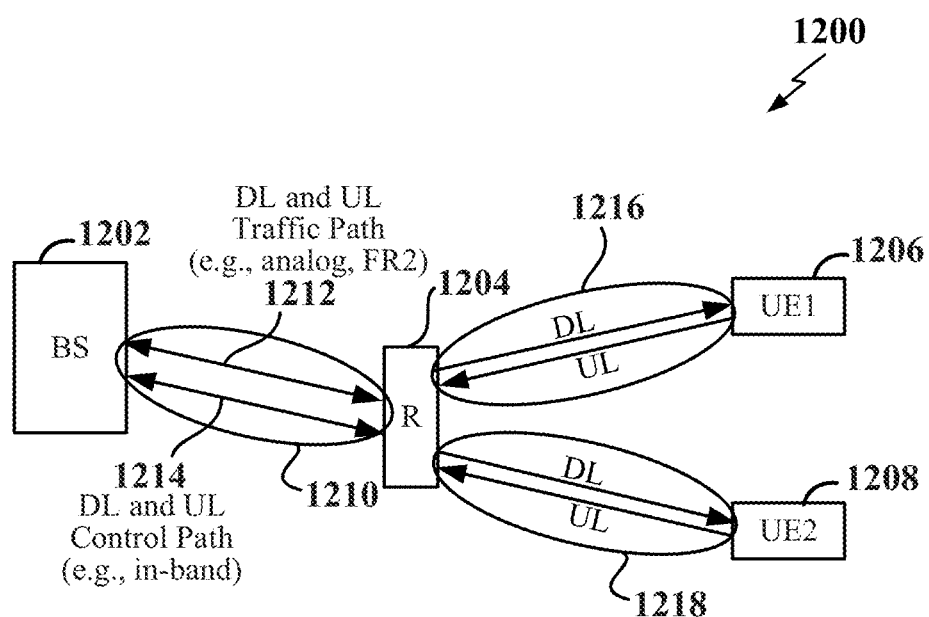
FIG. 12 is a conceptual illustration of an example of signaling paths for a repeater device according to some aspects of the disclosure.

FIG. 12 illustrates an example of a wireless communication network 1200 that includes a base station 1202 (identified as BS), a repeater device 1204 (identified as R), a first UE 1206, and a second UE 1208 (identified as UE1 and UE2, respectively). The base station 1202 may correspond to any of the base stations or scheduling entities shown in any of FIGS. 1, 2, 5, 6, 7, 8, 9, 11, 19, and/or 21. The repeater device 1204 may correspond to any of the repeater devices of FIGS. 7, 8, 9, 10, 11, 18, and/or 19. The first UE 1206 and the second UE 1208 may respectively correspond to any of the UEs or scheduled entities of FIGS. 1, 2, 5, 6, 7, 8, 9, 11, 19, and/or 21.

FIG. 12 is similar to FIG. 9. In FIG. 12 two UEs (the first UE 1206 and the second UE 1208) are shown in communication with the base station 1202 via the repeater device 1204, while in FIG. 9 one UE 906 was shown in communication with a base station 902 via a repeater device 904. Those of ordinary skill in the art will understand that one or more UEs and base stations may communicate with a repeater device simultaneously or substantially simultaneously without departing from the scope of the disclosure.

A first beam pair 1210, comprising a front-haul link, is denoted by a single oval shape in FIG. 12. The first beam pair 1210 includes a downlink beam from the base station 1202 to the repeater device 1204 and an uplink beam from the repeater device 1204 to the base station 1202. Reciprocal beams are within the scope of the disclosure. The first beam pair 1210 may carry a traffic path 1212 (e.g., a bidirectional traffic path), which may transport traffic (e.g., user data) in the downlink and uplink directions. The first beam pair 1210 may also carry a control path 1214 (e.g., a bidirectional control path), which may transport control (e.g., control information) in the downlink and uplink directions.

An MT unit (not shown) of the repeater device 1204 may communicate the control (e.g., control messaging, control information) via the DL and UL control path 1214. In some examples, the control path 1214 may be an in-band control path. An RU (not shown) of the repeater device 1204 may communicate the traffic (e.g., user data) via the DL and UL traffic path 1214. The traffic path 1212 and the control path 1214 may extend between the base station 1202 and the repeater device 1204.

A second beam pair 1216, comprising a first access-link, is denoted by a single oval shape in FIG. 12. The second beam pair 1216 includes a downlink beam from the repeater device 1204 to the first UE 1206 and an uplink beam from the first UE 1206 to the repeater device 1204. Reciprocal beams are also within the scope of the disclosure. The second beam pair 1216 may carry bidirectional traffic between the repeater device 1204 and the first UE 1206. The second beam pair 1216 may also carry bidirectional control between the repeater device 1204 and the first UE 1206. The control may be control information that is relayed to the first UE 1206 from the base station 1202 via the repeater device 1204. In some examples, the control my configure the first UE 1206. An RU (not shown) of the repeater device 1204 may communicate traffic (e.g., user data) between the base station 1202 and first UE 1206 via the repeater device 1204. The traffic may be, for example, analog traffic in the FR2 band.

A third beam pair 1218, comprising a second access-link, is denoted by a single oval shape in FIG. 12. The third beam pair 1218 may include a downlink beam from the repeater device 1204 to the second UE 1208 and an uplink beam from the second UE 1208 to the repeater device 1204. Reciprocal beams are also within the scope of the disclosure. The third beam pair 1218 may carry bidirectional traffic between the repeater device 1204 and the second UE 1208. The third beam pair 1218 may also carry bidirectional control between the repeater device 1204 and the second UE 1208. The control may be control information that is relayed to the second UE 1208 from the base station 1202 via the repeater device 1204. In some examples, the control my configure the second UE 1208. An RU (not shown) of the repeater device 1204 may communicate traffic (e.g., user data) between the base station 1202 and second UE 1208 via the repeater device 1204. The traffic may be, for example, analog traffic in the FR2 band.

Figure 13:
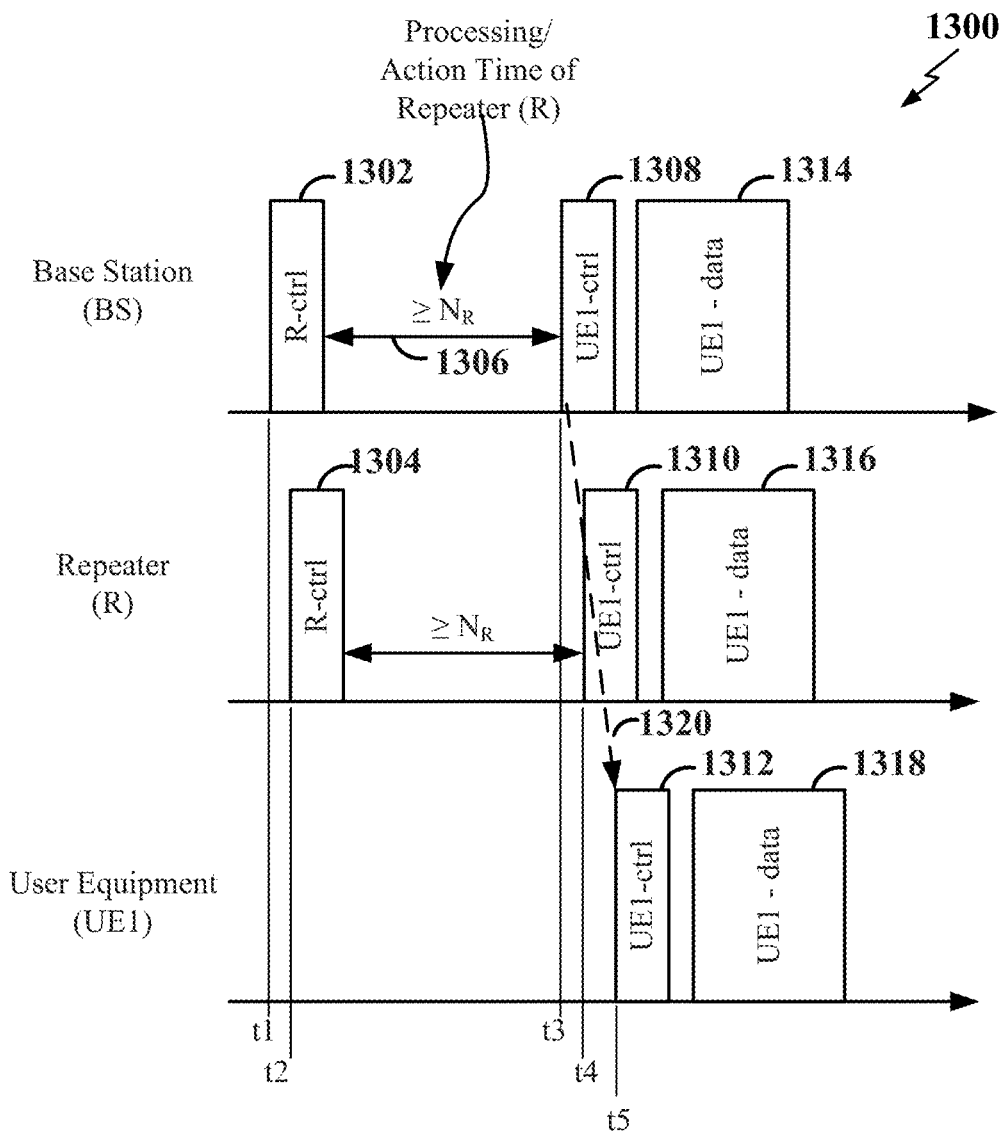
FIG. 13 is a conceptual illustration of an example of processing delay times for a repeater device according to some aspects of the disclosure.

FIG. 13 illustrates an example of processing time (or action time) and propagation delay times for a DL transmission from a base station (BS) to a UE (UE1) via a repeater device (R). Similar timing may be applicable to an UL transmission.

The base station transmits repeater device control (R-ctrl) information 1302 to a repeater device at a first time (t1). The repeater device receives the propagation delayed R-ctrl information 1304 at a second time (t2). In this example, a direct path is presumed, and multipath signals are not considered. The second time t2 is greater than the first time t1 (t2>t1). The difference in time between t2 and t1 is directly proportional to the distance between the base station and the repeater device. As discussed herein, the propagation delayed R-ctrl information 1304 may be used to configure the repeater device for an upcoming DL transmission.

After waiting for a period of time that may be equal to or greater than an amount of time $N_R$ 1306 it takes the repeater device to process the received propagation delayed R-ctrl information 1304, the base station transmits UE1 control information (UE1-ctrl) 1308 at a third time t3 (t3>t2>t1). The UE1-ctrl 1308 is received by the repeater device and re-transmitted (e.g., repeated, re-broadcast) as a propagation delayed UE1 ctrl 1310 at a fourth time t4. The fourth time t4 is greater than the third time t3 (t4>t3). Because the distance between the base station and the repeater device is, in the present example, fixed, the propagation time between transmission of a signal from the base station and reception of that signal by the repeater is constant. Therefore, (t2−t1)= (t4−t3) and t4>t3>t2>t1.

The R-ctrl information 1302 (same as the propagation delayed R-ctrl information 1304) may be information used to configure an RU of the repeater device. The UE1-ctrl information 1308, 1310 may be information used to configure the user equipment (UE1).

The repeater device may forward the UE1 control information 1310 to the UE1. UE1 may receive a propagation delayed UE1-ctrl 1312 at a fifth time, t5. The fifth time t5 is greater than the fourth time t4 (t5>t4). Overall, t5>t4>t3>t2>t1. The distance between the repeater and the UE may be the same or different from distance between the user equipment and the repeater device. The propagation delay changes as a function of distance. In the example of FIG. 13, the propagation delay between the repeater and the user equipment, given by t5−t3, is greater than the propagation delay between the base station and the repeater device, given by both t2−t1 and t4−t3.

Subsequent to the transmission of the UE control information UE1-ctrl 1308, the base station transmits UE1 data (UE1-data) 1314 to the repeater device. The UE1-data is received by the repeater device after the propagation delay and the repeater device retransmits the UE1-data 1316 to the UE. The UE1 data 1318 is subsequently received at UE1. A total delay between a first transmission of the R-Ctrl information 1302 from the base station and reception of UE1-ctrl 1312 at the user equipment is equal to t5−t1. A total delay between a first transmission of UE1-Ctrl 1308 from the base station and reception of UE1-ctrl 1312 at the user equipment is equal to t5−t3 as shown by the dashed arrow 1320 in FIG. 13.

Any of the exemplary repeater devices corresponding to the repeater devices of FIG. 7, 8, 9, 10, 11, and or 12 above, and FIG. 18 and or 19, below may be referred to as (and may be configured as) a smart repeater device. According to some examples, a smart repeater device may combine the "amplify and forward" aspects of a Layer-1 relay with enhancements of at least some of the functionality provided by upper layers (e.g., MAC, RLC, PDCP, and RRC) of upper levels (e.g., L2 744 and L3 746 of FIG. 7) of a protocol stack, such as a 5G protocol stack. For ease of reference, all references to a repeater device made herein may be understood as being references to a smart repeater device. As described in the examples above, a base station or scheduling entities (e.g., a network access node, a gNB, an eNB) shown in any of FIGS. 1, 2, 5, 6, 7, 8, 9, 11, 12, 19, and/or 21 may control a repeater device that is remote to the base station. According to aspects herein, a base station controlling a specific repeater device may be the base station that utilizes the specific repeater device to relay traffic. Accordingly, the repeater devices described herein may be remotely controlled by one base station. However, a use of multiple base stations remotely controlling a given repeater device is within the scope of the disclosure.

The base station may construct control information that is transmitted to the repeater device. The repeater device may use the control information to configure a relay unit (RU) of the repeater device. In some examples, the control information may be configured as downlink control information (DCI) or may be configured in a MAC-CE or otherwise conveyed, for example, in RRC signaling. The control information may be conveyed to the repeater device in control signaling, for example over a physical downlink control channel (PDCCH).

Figure 14:
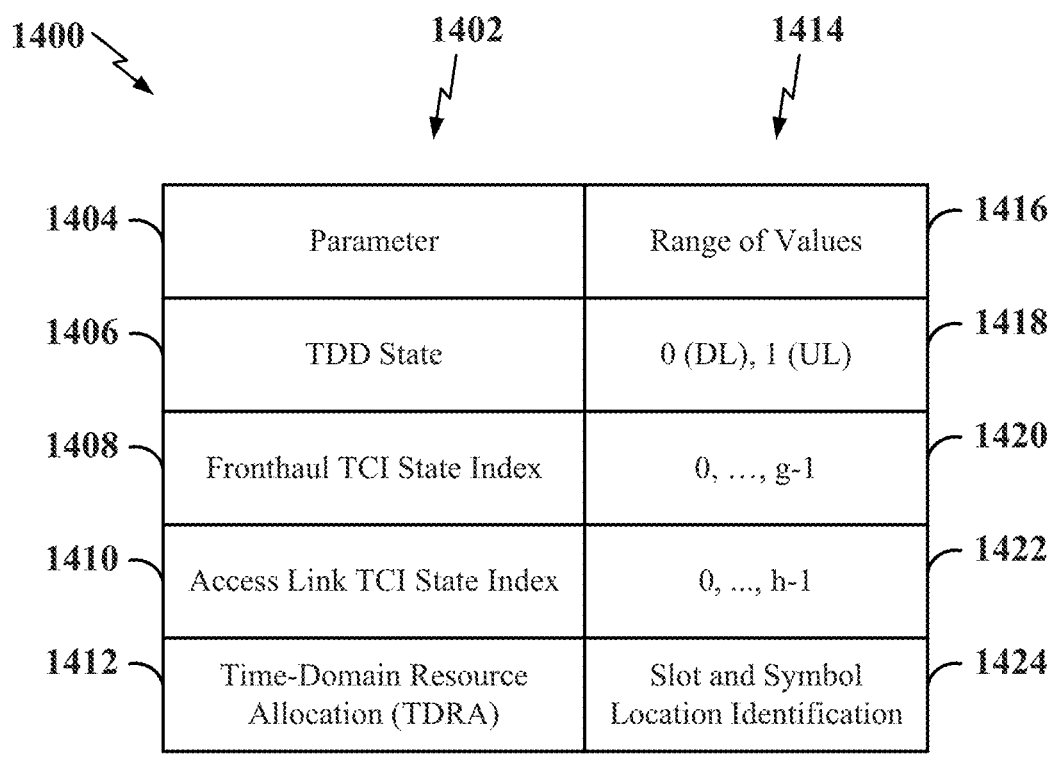
FIG. 14 is a table depicting one example of control information that may be carried in control signaling for a repeater device according to some aspects of the disclosure.

FIG. 14 is a table 1400 depicting one example of control information that may be carried in control signaling for a repeater device according to some aspects of the disclosure. Additional details regarding the parameters of the table 1400 are provided below. The repeater device may be a smart repeater device as described herein. The control information in the table 1400 may be obtained from at least one of: a downlink control information (DCI) carried, for example, on a physical downlink control channel (PDCCH), a MAC control element (MAC-CE), or configured in RRC signaling.

According to one aspect, the DCI may be transmitted with a masked cyclic redundancy check (CRC). The CRC may be masked with an arithmetic value (e.g., a number) that uniquely identifies the repeater device and associates the repeater device with traffic to be relayed through the repeater device between a base station and a user equipment (UE). According to some aspects the number may be a radio network temporary identifier (RNTI). In more detail, the RNTI may be designated as a relay unit (RU)-RNTI. The repeater device may recognize its own DCI by use of the masked CRC and knowledge of its own RNTI (e.g., its own RU-RNTI). According to some aspects, the repeater device may identify a DCI (e.g., a DCI carrying control information) by demasking (descrambling) a CRC of the DCI with an RNTI (of the repeater device), obtaining (e.g., by calculating, deriving) a CRC of the DCI, and by confirming that the demasked (descrambled) CRC of the DCI is equal to the obtained CRC of the DCI. If the two values are equal, the CRC is validated, and the DCI was intended for the repeater device. If the two values are not equal, the CRC may be in error or the CRC may have been masked with an RNTI of a different repeater device.

The table 1400 includes a first column 1402 identifying exemplary parameters 1404 that may be used to configure the repeater device. The table 1400 includes a second column 1414 identifying exemplary ranges 1416 of values that may be assigned to a respective exemplary parameter 1404 in the first column 1402.

A first parameter may be a time division duplex state 1406. The time division duplex state 1406 may be one bit and may indicate either a downlink (DL) symbol or an uplink (UL) symbol. For exemplary purposes, the time division duplex state 1406 is represented as a 0 to indicate DL and 1 to indicate UL, although these values may be reversed. In a case where a symbol is predesignated as a flexible symbol, the time division duplex state 1406 may be dynamically assigned to either indicate a DL symbol or a UL symbol. According to one aspect, the network node may dynamically assign the time division duplex state 1406.

A second parameter may be a fronthaul-link TCI state index 1408. The range of values 1420 of the fronthaul-link TCI state index 1408 may be 0, . . . , g−1. The variable g is an integer. By way of example, a downlink fronthaul-link TCI state index value, if indicated, may be an index to one of up to a given number, g, of MT unit activated TCI states. For example, there may be up to 8 (g=8) TCI state index values. In some examples, 3 bits may be used to represent a downlink fronthaul-link TCI state index value. By way of example, an uplink fronthaul-link TCI state index value, if indicated, may be given by an SRS resource indicator (SRI), where the SRI is an index referring to a configured sounding reference symbol (SRS) resource set of an MT. In some examples, 3 bits may be used to represent an uplink fronthaul-link TCI state index value. It is noted that an interpretation of the indicated fronthaul-link TCI state may be dependent of the time division duplex state. In another aspect, a (UL or DL) fronthaul-link TCI state index value may be an index to one of up to g fronthaul-link TCI states activated for a relay unit (RU) of the repeater device (e.g., activated via a MAC-CE). In some examples, each fronthaul-link TCI state may be an index to one of K SSBs sent by the repeater device. Here, K may be an integer having a valued that is greater than 0. During an initial integration and capability exchange, the repeater device may indicate how many (=K) beams it can create. In some examples, each fronthaul-link TCI state may be an index to a set of beam identifiers (e.g., {0, . . . , #beams−1}), where #beams may be indicated by the repeater device during its integration (e.g., #beams=K) and where #beams could be a number of fronthaul-link beams (i.e., beams that may be created on the array used for fronthaul-link communication). In some examples, each fronthaul-link TCI state may be an index to an SSB and/or CSI-RS, or SRS resource.

A third parameter may be an access-link TCI state index 1410. The range of values 1422 of the access-link TCI state index 1410 may be 0, . . . , h−1. The variable h is an integer. By way of example, an access-link TCI state index value, if indicated, may be an index to one of up to a given number, h, of access-link TCI states activated for an RU of the repeater device (e.g., activated via MAC-CE). For example, there may be up to 8 (h=8) access-link TCI state index values. In some examples, 3 bits may be used to represent access-link TCI state index values. In some examples, each access-link TCI state may be an index to one of K SSBs sent by the repeater device. In some examples, each access-link TCI state may be an index to a set of beam identifiers (e.g., {0, . . . , #beams−1}), where #beams may be indicated by the repeater device during its integration and where #beams could be a number of access-link beams (i.e., beams that can be created on the array used for access-link communication). In some examples, each access-link TCI state may be an index to an SSB and/or CSI-RS, or SRS resource.

It is noted that according to some aspects, g may be less than or equal to h, and a number (quantity) of fronthaul-link beams may be less than or equal to a number of access-link beams.

A fourth parameter may be a time domain resource allocation (TDRA) 1412. The range of values are replaced by a slot and symbol location identifier 1424.

FIG. 15 is a table 1500 depicting another example of control information that may be carried in control signaling for a repeater device according to some aspects of the disclosure. The repeater device may be a smart repeater device as described herein. The control information in the table 1500 may be obtained from at least one of: a downlink control information (DCI) carried, for example, on a physical downlink control channel (PDCCH), a MAC control element (MAC-CE), or configured in RRC signaling. According to one aspect, the DCI may be transmitted with a masked cyclic redundancy check (CRC). The use of the masked CRC was described above in connection with FIG. 14 and will not be repeated to avoid repetition.

Like the table 1400 of FIG. 14, the table 1500 includes a first column 1502 identifying exemplary parameters 1504 that may be used to configure the repeater device as well as a second column 1514 identifying exemplary ranges 1516 of values that may be assigned to a respective exemplary parameter 1504.

A difference between the table 1400 of FIG. 14 and the table 1500 of FIG. 15 is that the latter includes two sets of the time division duplex state, fronthaul-link TCI state index, and access-link TCI state index. The latter also includes two sets of values (two sets of ranges of values) for the fronthaul-link TCI state index and the access-link TCI state index. A first set is identified by appending the number "1" after the parameters and respective ranges of values belonging to the first set. A second set is identified by appending the number "2" after the parameters and respective ranges of values belonging to the second set.

The table 1500 of FIG. 15 may be used in conjunction with a bidirectional repeater device that can simultaneously relay traffic in both the downlink and the uplink directions. Such a repeater device may be exemplified by the repeater device 904 of FIG. 9, where a second RU (not shown) would be added to the repeater device 904 (e.g., in addition to the illustrated RU 910). According to such a configuration, the pair of RUs may be used to simultaneously relay traffic in both the uplink and downlink directions. The second RU is not depicted in FIG. 9 to avoid cluttering the drawing.

The parameters identified as the time division duplex state 1 (TDD state 1) 1506 and time division duplex state 2 (TDD state 2) 1507 are the same types of parameters as described earlier with respect to time division duplex state 1406 of table 1400 of FIG. 14; the description will not be repeated to avoid repetition. The parameters identified as fronthaul-link TCI state index 1 1508 and fronthaul-link TCI state index 2 1509 are the same types of parameters as described earlier with respect to fronthaul-link TCI state index 1408 of table 1400 of FIG. 14; the description will not be repeated to avoid repetition. The parameters identified as access-link TCI state index 1 1510 and access-link TCI state index 2 11511 are the same types of parameters as described earlier with respect to access-link TCI state index 1410 of table 1400 of FIG. 14; the description will not be repeated to avoid repetition. The TDRA 1412 parameter of FIG. 14 and its associated range of values is not duplicated in FIG. 15. Instead, a parameter referred to as time configuration 1512 is presented. The range of values of the time configuration 1512 includes, for example, start symbol and duration 1524. The time configuration 1512 and its corresponding range of values may not require duplication; accordingly, the time configuration 1512 and its corresponding range of values may be used in conjunction with both sets of the previously described parameters.

Figure 16A:
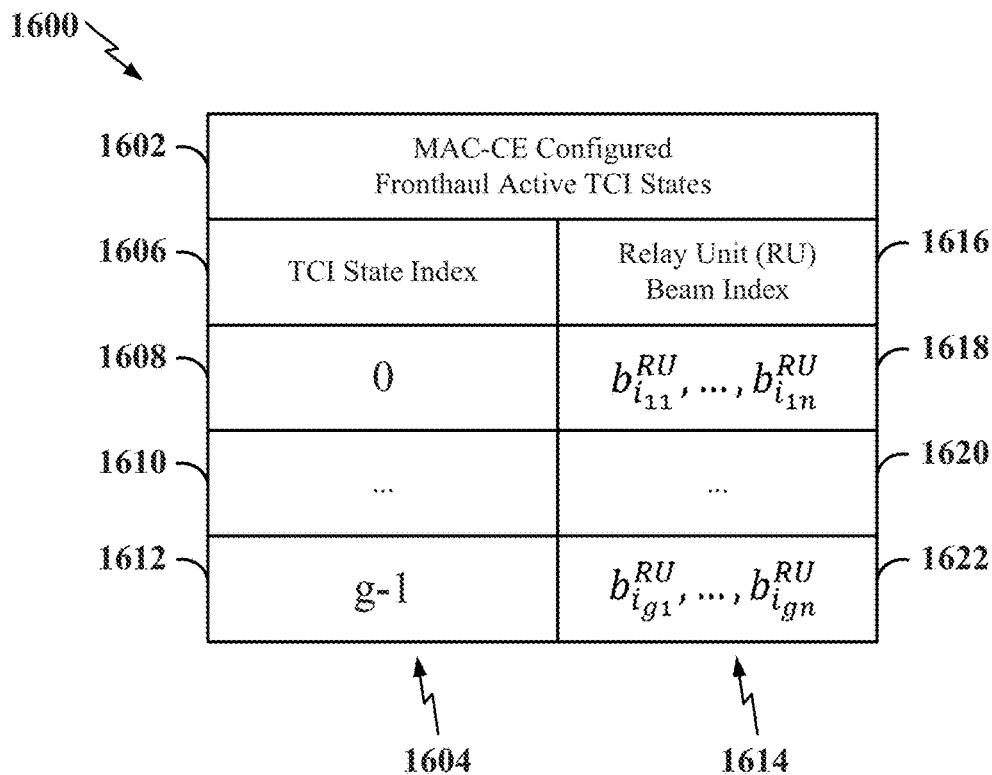
FIG. 16A is a first table populated with MAC-CE configured fronthaul-link active TCI states according to some aspects of the disclosure.
Figure 16B:
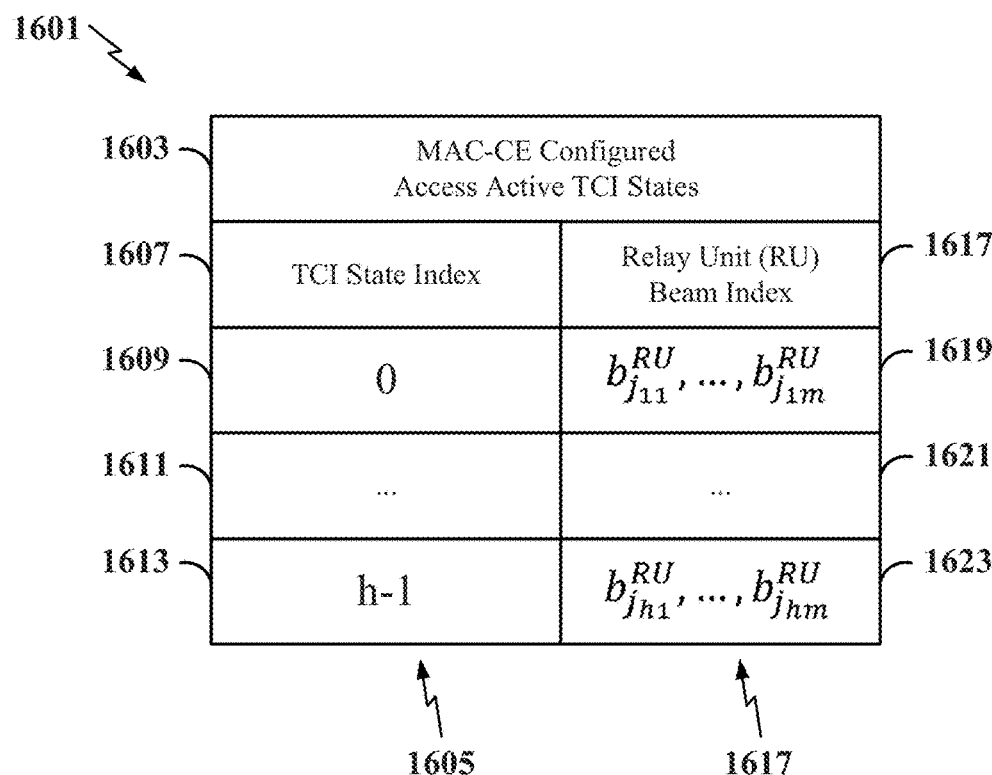
FIG. 16B is a second table populated with MAC-CE configured access-link active TCI states according to some aspects of the disclosure.

FIG. 16A is a first table 1600 populated with MAC-CE configured fronthaul-link active TCI states 1602 according to some aspects of the disclosure. FIG. 16B is a second table 1601 populated with MAC-CE configured access-link active TCI states 1603 according to some aspects of the disclosure. The first table 1600 and the second table 1601 contain the same parameters; however, the TCI state index 1606 of the first table 1600 ranges from 0 to g−1, while the TCI state index 1607 of the second table 1601 ranges from 0 to h−1.

According to the first table 1600 of FIG. 16A, a TCI state index 1606 of 0 1608 corresponds to a relay unit beam index 1616, wherein the relay unit beam index 1616 may be associated with n beams indicated by $b_{i_{11}}^{RU}, \ldots, b_{i_{1n}}^{RU}$ (each of these n values $b_{i_{1x}}^{RU}$ indicates one beam). According to some aspects, a value of the variable n may equal 1, that is the corresponding TCI state is associated with using a single beam by the relay unit (e.g., n=1). At the opposite end of index values, according to the first table 1600 of FIG. 16A, a TCI state index 1606 of g−1 1612 corresponds to a relay unit beam index 1622 associated with n beams, $b_{i_{g1}}^{RU}, \ldots, b_{i_{gn}}^{RU}$. Relay unit beam indices 1620 for TCI state index values between 0 and g−1 1610 are not provided but may be readily realized according to the sequence of relay unit beam index 1616 numbers illustrated in FIG. 16A.

According to the second table 1601 of FIG. 16B, a TCI state index 1607 of 0 1609 corresponds to a relay unit beam index 1617 number that ranges from $b_{i_{11}}^{RU}, \ldots, b_{i_{1m}}^{RU}$. According to some aspects, a value of the variable m may be greater than or equal to 1 (e.g., m≥1). The value and range of m may depend on the capability of the repeater device. The variable m may correspond to a number (e.g., a quantity) of concurrent beams a repeater device can create on a service-side. The number of concurrent beams may depend on the quantity of antenna arrays on the repeater device. By way of a non-limiting example, a repeater device may have 2 or 4 antenna arrays (other quantities of antenna arrays are within the scope of the disclosure). At the opposite end of index values, according to the first table 1600 of FIG. 16A, a TCI state index 1607 of h−1 1613 corresponds to a relay unit beam index 1623 that ranges from $b_{j_{h1}}^{RU}, \ldots, b_{j_{hm}}^{RU}$. Relay unit beam indices 1621 for TCI state index values between 0 and h−1 1611 are not provided but may be readily realized according to the sequence of relay unit beam index 1617 numbers illustrated in FIG. 16B. In some aspects, the variable g of the first table 1600 of FIG. 16A may be less than or equal to the variable h of second table 1601 of FIG. 16B.

Figure 17:
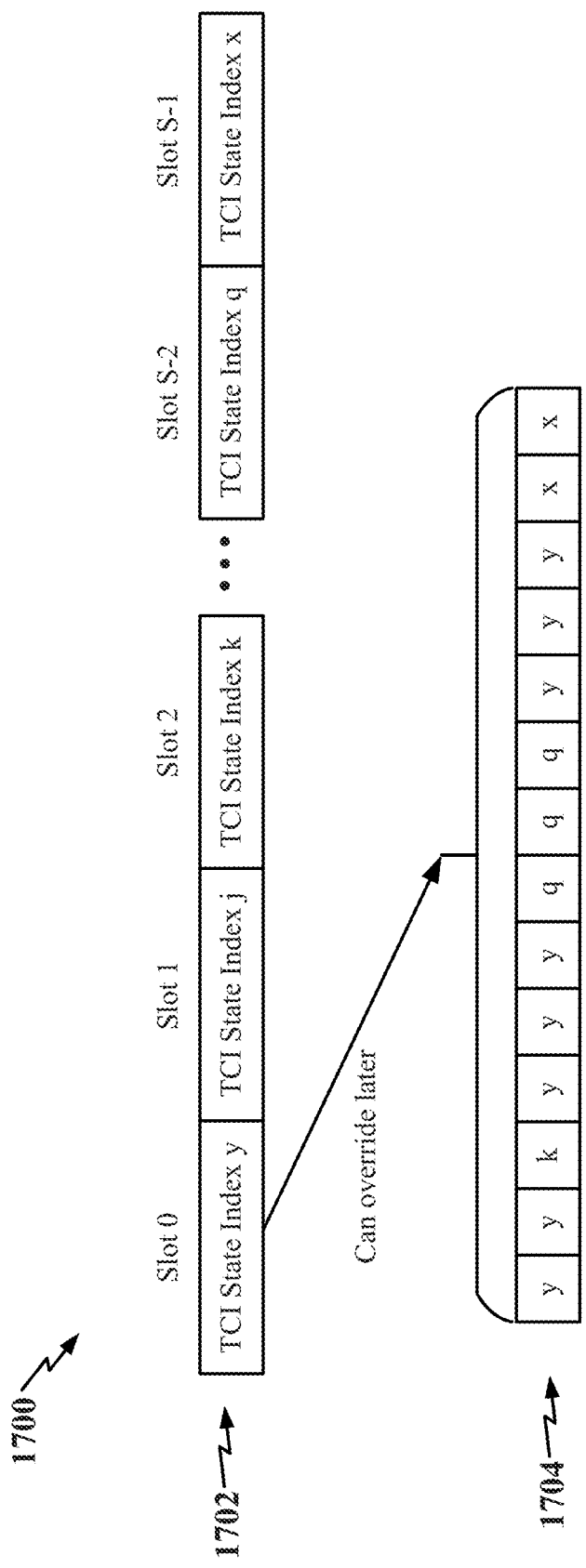
FIG. 17 is a graphic representation of periodic slot-level beamforming patterns and a symbol-level beamforming pattern of a representative slot according to some aspects of the disclosure.

FIG. 17 is a graphic representation of periodic slot-level beamforming patterns 1702 and a symbol-level beamforming pattern of a representative slot 1704 according to some aspects of the disclosure. The plurality of slots in the representation of periodic slot-level beamforming patterns 1702 ranges from slot index 0 to slot index S−1, where S is the slot index number. The range of 0 to S−1 is exemplary and non-limiting. For illustrative purposes, slot index 0 carries TCI state index y, slot index 1 carries TCI state index j, slot index 2 carries TCI state index k, slot index S−2 carries TCI state index q, and slot index S−1 carries TCI state index x. The use of the variables y, j, k, q, and x is exemplary, non-limiting, and has no meaning with respect to their positions in the English alphabet. Each of the TCI states indices (e.g., y, j, k, q, and x) may correspond to a fronthaul-link TCI state index 1408 of FIG. 14, an access-link TCI state index 1410 of FIG. 14, a fronthaul-link TCI state index 1 1508 of FIG. 15, an access-link TCI state index 1 1510 of FIG. 15, a fronthaul-link TCI state index 2 1509 of FIG. 15, an access-link TCI state index 2 1511 of FIG. 15, a MAC-CE configured fronthaul-link active TCI state index 1606 of FIG. 16A, or a MAC-CE configured access-link active TCI state index 1607 of FIG. 16B. According to some aspects, the periodic slot-level beamforming patterns 1702 may be configured at an RU of a repeater device by MAC-CE (as depicted in FIG. 16A and FIG. 16B) or by RRC signaling (see, for example RRC layer 712 of a base station 702 and RRC layer 728 of MT unit 716 of the repeater device 714 of FIG. 7).

FIG. 17 also depicts one representative slot 1704 providing a symbol-level beamforming patter according to some aspects of the disclosure. The symbol-level beamforming pattern in representative slot 1704 may be provided for a given slot having an index value of ranging from 0 to S−1. The values of the symbols of any given slot, established with a periodic slot-level beamforming patterns 1702 may be overridden by the symbols of a symbol-level beamforming pattern such as that of representative slot 1704. In other words, the repeater device may override a slot comprising a previously received periodic slot-level beamforming pattern with a symbol-level beamforming pattern. According to some aspects, the symbol-level beamforming pattern such as that of representative slot 1704 may be configured at an RU of a repeater device by a DCI (that may be associated with, or multiplexed with downlink control information of a UE on a PDCCH), by MAC-CE (as depicted in FIG. 16A and FIG. 16B), or by RRC signaling (see, for example RRC layer 712 of a base station 702 and RRC layer 728 of MT unit 716 of the repeater device 714 of FIG. 7).

By way of non-limiting example, each symbol of the representative slot 1704 may be associated with a slot index number. According to the example in representative slot 1704, symbols 0, 1, 3, 4, 5, 9, 10, and 11 are set with TCI state index y. Using the MAC-CE configured fronthaul-link active TCI states 1602 of FIG. 16A for exemplary and non-limiting purposes, given a TCI state index number of y (assuming index number y lies between TCI state index numbers 0 and g−1), the TCI state of every symbol designated with a y in representative slot 1704 may range from $b_{i_{y1}}^{RU}, \ldots, b_{i_{ym}}^{RU}$. According to one example, representative slot 1704, symbol 2 may be set with TCI state index k, symbols 6, 7, and 8 may be set with TCI state index q, and symbols 12 and 13 may be set with TCI state index x. The values (e.g., ranges of values of the TCI states) given by any TCI state index number may be obtained from at least one of: table 1400 of FIG. 15, table 1500 of FIG. 15, first table 1600 of FIG. 16A, or second table 1601 of FIG. 16B, for example. The terms "TCI state index" and "TCI state index number" are used interchangeably herein.

With regard to the RU configuration, there may exist a default TCI state. For example, in the event that the number of active states is equal to one, the default TCI state may be the active TCI state (e.g., the then-active TCI state). For example, if a fronthaul-link TCI state is not present in a DCI, the repeater device may use whatever beam that the MT would use for the DL/UL within the resources available to the repeater device (e.g., within the resources identified in the DCI). In one example, the same beam that is used by the MT to receive a DCI (RU-RNTI) (i.e., a DCI scrambled by an RU-RNTI) may be used for the configured operation of the RU for DL forwarding.

By way of further example with respect to the access-link TCI state, in a first aspect, the default state may be one that is currently being used, or that was most recently configured. For example, if a DCI at time t0 indicates an access-link TCI state, then the indicated access-link TCI state may be used until another DCI indicates a different access-link TCI state. In a second aspect, where there is a semi-statically configured default access-link TCI state per time resources, there may be provided periodic slot or symbol-level BF patterns in association with, for example, periodic or semi-static communications (including for example, SSBs, RMSI PDCCHs, RACH, CSI-RS, SR, and/or SRS) or semi-persistent (or even dynamic) communications.

According to some aspects of the disclosure, the periodic slot-level beamforming patterns 1702 and the symbol-level beamforming pattern of the representative slot 1704 may support the use of a null value and also may support the use of flexible TCI states. In accordance with flexible TCI states, the base station and/or the repeater device may use a way other than the periodic slot-level beamforming patterns 1702 and/or the symbol-level beamforming pattern of the representative slot 1704 to obtain (e.g., determine, calculate, derive) a default TCI state index. As used herein, a flexible TCI state may mean that a repeater device is to (use other means) determine a default TCI state. In accordance with the use of a null value, a presence of a null value may indicate that there is no RU activity and may indicate that the RU may power off. Accordingly, as used herein, a null TCI state may indicate that the RU may power off.

According to some aspects of the disclosure, control signaling comprising control information for a smart repeater device is described, in which control information of the control signaling includes at least one of: a time division duplex state indicative of a direction of a conveyed message between the base station and the UE; a fronthaul-link transmission control indicator (TCI) state index indicative of one of a plurality of fronthaul-link beam configurations corresponding to at least one of: a downlink (DL) fronthaul-link beam, or an uplink (UL) fronthaul-link beam; an access-link transmission control indicator (TCI) state index indicative of one of a plurality of access-link beam configurations corresponding to at least one of: a DL access-link beam, or a UL access-link beam; or a time domain resource allocation (TDRA) comprising at least slot and symbol locations.

Figure 18:
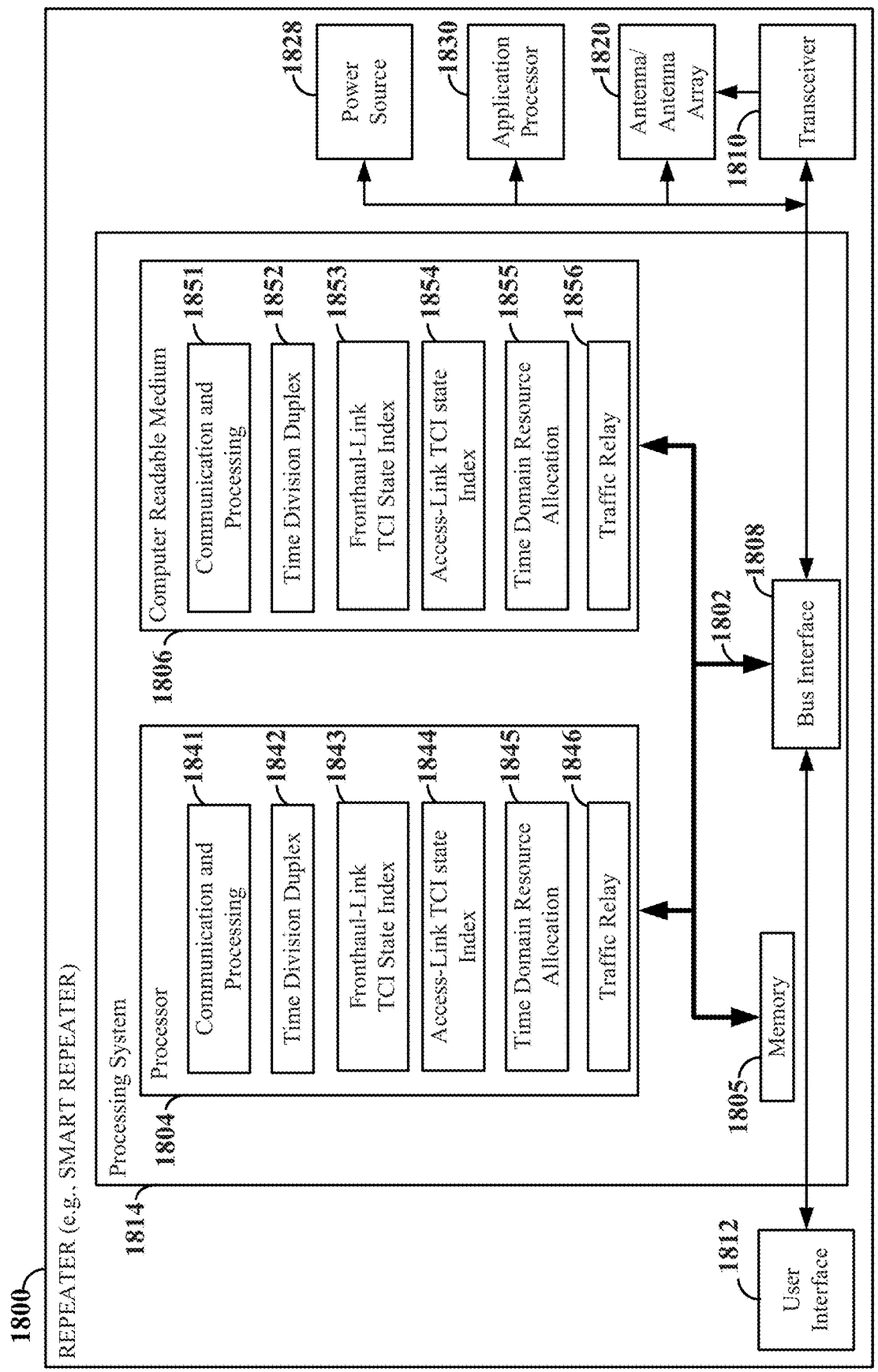
FIG. 18 is a block diagram illustrating an example of a hardware implementation of repeater device employing a processing system according to some aspects of the disclosure.

FIG. 18 is a block diagram illustrating an example of a hardware implementation of repeater device 1800 (e.g., a smart repeater device as referred to and described herein) employing a processing system 1814 according to some aspects of the disclosure. The repeater device 1800 may correspond to any repeater device of FIGS. 7, 8, 9, 10, 11, 12, and/or 19.

In accordance with various aspects of the disclosure, an element, or any portion of an element, or any combination of elements may be implemented with a processing system 1814 that includes one or more processors, such as processor 1804. Examples of processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 1804 may in some instances be implemented via a baseband or modem chip and in other implementations, the processor 1804 may itself comprise a number of devices distinct and different from a baseband or modem chip (e.g., in such scenarios is may work in concert to achieve examples discussed herein). And as mentioned above, various hardware arrangements and components outside of a baseband modem processor can be used in implementations, including RF-chains, power amplifiers, modulators, buffers, interleavers, adders/summers, etc. In various examples, the repeater device 1800 may be configured to perform any one or more of the functions described herein. That is, the processor 1804, as utilized in the repeater device 1800, may be used to implement any one or more of the methods or processes described and illustrated, for example, in FIG. 20 and/or FIG. 22.

In the example of FIG. 18, the processing system 1814 may be implemented with a bus architecture, represented generally by the bus 1802. The bus 1802 may include any number of interconnecting buses and bridges depending on the specific application of the processing system 1814 and the overall design constraints. The bus 1802 communicatively couples together various circuits including one or more processors (represented generally by the processor 1804), a memory 1805, and computer-readable medium (represented generally by the computer-readable medium 1806). The computer-readable medium 1806 may be referred to as a computer-readable storage medium, a non-transitory computer-readable medium, or a non-transitory computer-readable storage medium. The non-transitory computer-readable medium may store computer-executable code. The computer executable code may include code for causing a computer to implement one or more of the functions described herein. The bus 1802 may also link various other circuits such as timing sources, peripherals, voltage regulators, and power management circuits, which are well known in the art, and therefore, will not be described any further.

A bus interface 1808 provides an interface between the bus 1802 and a transceiver 1810. The transceiver 1810 may be, for example, a wireless transceiver. The transceiver 1810 provides a communication interface or means for communicating with various other apparatus over a transmission medium (e.g., air interface). The transceiver 1810 may further be coupled to one or more antennas/antenna array/antenna module 1820. The one or more antennas/antenna array/antenna module 1820 may transmit energy into and receive energy from the transmission medium. The bus interface 1808 further provides an interface between the bus 1802 and a user interface 1812 (e.g., keypad, display, touch screen, speaker, microphone, control features, etc.). Of course, such a user interface 1812 is optional, and may be omitted in some examples. In addition, the bus interface 1808 further provides an interface between the bus 1802 and a power source 1828, and between the bus 1802 and an application processor 1830, which may be separate from a modem (not shown) of the repeater device 1800 or processing system 1814.

One or more processors, such as processor 1804, may be responsible for managing the bus 1802 and general processing, including the execution of software stored on the computer-readable medium 1806. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1806. The software, when executed by the processor 1804, causes the processing system 1814 to perform the various processes and functions described herein for any particular apparatus.

The computer-readable medium 1806 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product or article of manufacture. By way of example, a computer program product or article of manufacture may include a computer-readable medium in packaging materials. In some examples, the computer-readable medium 1806 may be part of the memory 1105. Those of ordinary skill in the art will recognize how best to implement the described functionality presented throughout this disclosure depending on the particular application and the overall design constraints imposed on the overall system. The computer-readable medium 1806 and/or the memory 1805 may also be used for storing data that is manipulated by the processor 1804 when executing software.

In some aspects of the disclosure, the processor 1804 may include communication and processing circuitry 1841 configured for various functions, including for example communicating with a base station (e.g., a scheduled entity), a network core (e.g., a 5G core network), and a user equipment (UE) (e.g., a scheduled entity), or any other entity, such as, for example, local infrastructure or an entity communicating with the repeater device 1800 via the Internet, such as a network provider. In some examples, the communication and processing circuitry 1841 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1841 may be configured to receive and relay uplink traffic and uplink control messages (e.g., similar to uplink traffic 116 and uplink control 118 of FIG. 1) and transmit relayed downlink traffic and downlink control messages (e.g., similar to downlink traffic 112 and downlink control 114) via the antennas/antenna array/antenna module 1820 and the transceiver 1810. In addition, the communication and processing circuitry 1841 may be configured to receive, from a base station, control signaling comprising control information, in association with traffic relayed through the repeater device 1800 between the base station and a user equipment (UE). The communication and processing circuitry 1841 may further be configured to execute communication and processing software 1851 stored on the computer-readable medium 1806 to implement one or more functions described herein including one or more of the functions described below in relation to FIG. 20, including, e.g., block 2002.

In some aspects of the disclosure, the processor 1804 may include time division duplex circuitry 1842 configured for various functions, including, for example, obtaining a time division duplex state from the control information. In some examples, the time division duplex circuitry 1842 may include one or more hardware components that provide the physical structure that performs processes related to performing identification of the time division duplex state from the control information. The time division duplex circuitry 1842 may further be configured to execute time division duplex software 1852 stored on the computer-readable medium 1806 to implement one or more functions described herein including one or more of the functions described below in relation to FIG. 20, including, e.g., block 2004.

In some aspects of the disclosure, the processor 1804 may include fronthaul-link transmission control indicator (TCI) state index circuitry 1843 configured for various functions, including, for example, obtaining a fronthaul-link TCI state index from the control information. In some examples, the fronthaul-link TCI state index circuitry 1843 may include one or more hardware components that provide the physical structure that performs processes related to obtaining the fronthaul-link TCI state index from the control information. The fronthaul-link TCI state index circuitry 1843 may further be configured to execute fronthaul-link TCI state index software 1853 stored on the computer-readable medium 1806 to implement one or more functions described herein including one or more of the functions described below in relation to FIG. 20, including, e.g., block 2006.

In some aspects of the disclosure, the processor 1804 may include access-link TCI state index circuitry 1844 configured for various functions, including, for example, obtaining access-link TCI state index from the control information. In some examples, the access-link TCI state index circuitry 1844 may include one or more hardware components that provide the physical structure that performs processes related to obtaining the access-link TCI state index from the control information. The access-link TCI state index circuitry 1844 may further be configured to execute access-link TCI state index software 1854 stored on the computer-readable medium 1806 to implement one or more functions described herein including one or more of the functions described below in relation to FIG. 20, including, e.g., block 2008.

In some aspects of the disclosure, the processor 1804 may include time domain resource allocation circuitry 1845 configured for various functions, including, for example, obtaining a time domain resource allocation from the control information. In some examples, the time domain resource allocation circuitry 1845 may include one or more hardware components that provide the physical structure that performs processes related to obtaining the time domain resource allocation from the control information. The time domain resource allocation circuitry 1845 may further be configured to execute time domain resource allocation software 1855 stored on the computer-readable medium 1806 to implement one or more functions described herein including one or more of the functions described below in relation to FIG. 20, including, e.g., block 2010.

In some aspects of the disclosure, the processor 1804 may include traffic relay circuitry 1846 configured for various functions, including, for example, causing the relay unit to relay traffic between the base station and the UE. In some examples, the traffic relay circuitry 1846 may include one or more hardware components that provide the physical structure that performs processes related to configuring the relay unit of the repeater device to communicate traffic between the first wireless communication device and the second wireless communication device using at least one of: the time division duplex state, the fronthaul-link TCI state index, the access-link TCI state index, and the time domain resource allocation. The traffic relay circuitry 1846 may further be configured to execute traffic relay software 1856 stored on the computer-readable medium 1806 to implement one or more functions described herein including one or more of the functions described below in relation to FIG. 20, including, e.g., block 2012.

Figure 19A:
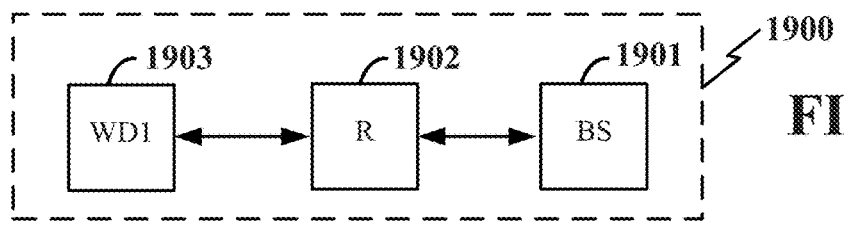
FIG. 19A is a first block diagram illustrating a first configuration of various nodes of a wireless communication network including a base station and a repeater device according to some aspects of the disclosure.
Figure 19B:
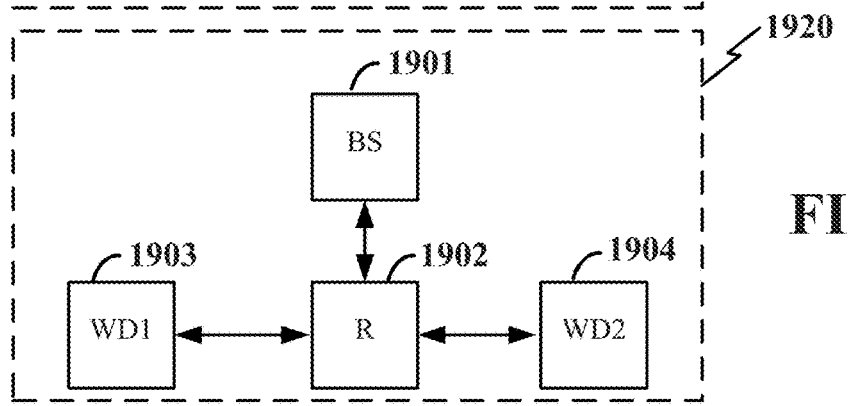
FIG. 19B is a second block diagram illustrating a second configuration between various nodes of a wireless communication network including a base station and a repeater device according to some aspects of the disclosure.
Figure 19C:
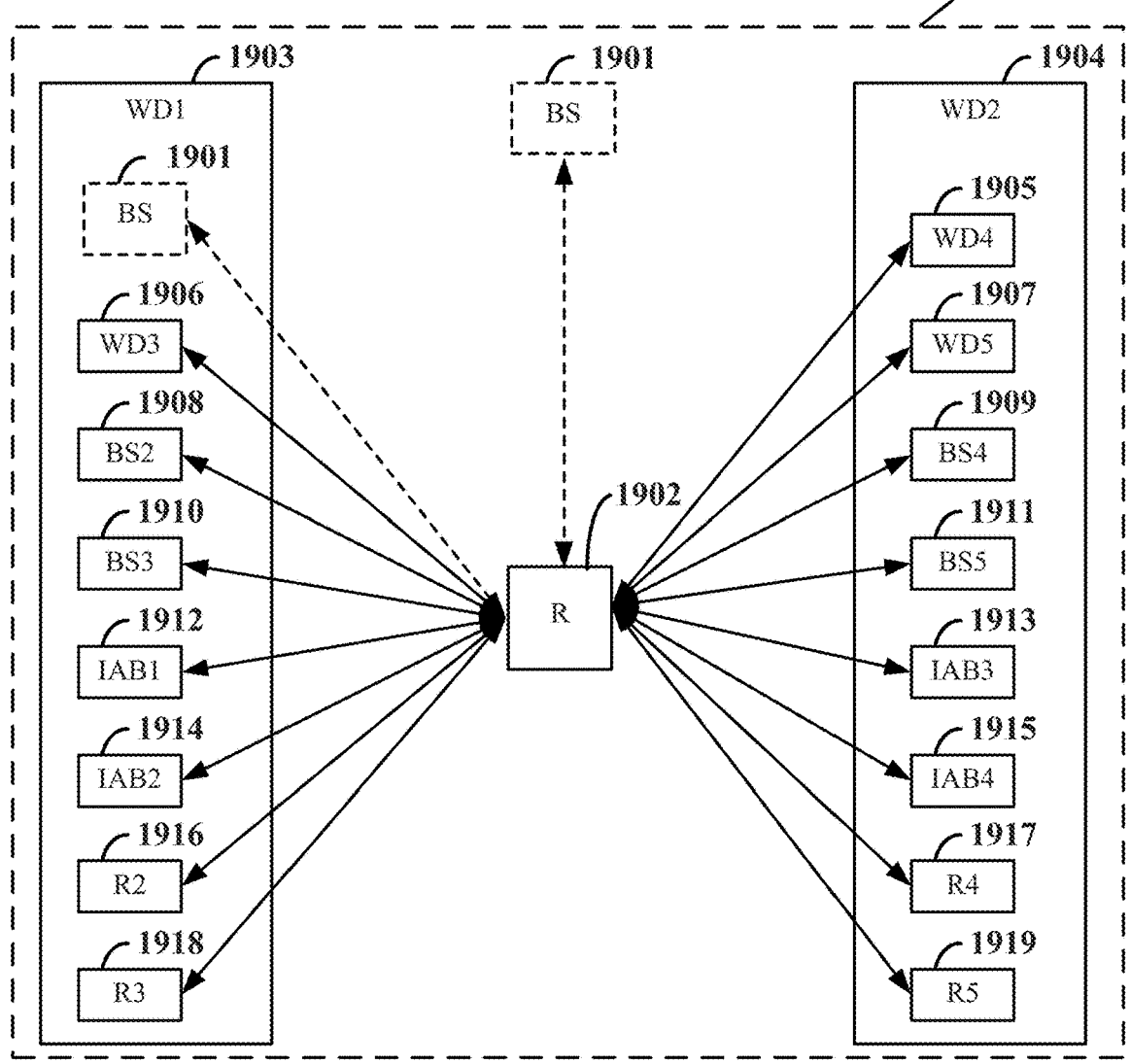
FIG. 19C is a third block diagram illustrating a third configuration of various nodes of a wireless communication network including a base station and a repeater device according to some aspects of the disclosure.

FIG. 19A is a first block diagram illustrating a first configuration 1900 of various nodes of a wireless communication network including a base station 1901 (identified as BS) and a repeater device 1902 (identified as R) according to some aspects of the disclosure. FIG. 19B is a second block diagram illustrating a second configuration 1920 between various nodes of a wireless communication network including the base station 1901 and the repeater device 1902 according to some aspects of the disclosure. FIG. 19C is a third block diagram illustrating a third configuration 1930 of various nodes of a wireless communication network including the base station 1901 (identified as BS) and the repeater device 1902 according to some aspects of the disclosure. The repeater device 1902 may be a smart repeater device as described herein. The repeater device 1902 may correspond to any of the repeater devices of FIGS. 7, 8, 9, 10, 11, 12, and/or 18. The base station 1901 may correspond to any of the base stations of FIGS. 1, 2, 5, 6, 7, 8, 9, 11, 12, and/or 21.

In the first configuration 1900, the repeater device 1902 may be controlled by the base station 1901. The repeater device 1902 may receive control signaling comprising control information from the base station 1901. The control signaling may be associated with traffic (e.g., data signaling) relayed through the repeater device 1902 between the base station 1901 (e.g., BS) and a first wireless communication device 1903 (e.g., a UE). Traffic flows through the repeater device 1902 between the base station 1901 and a second wireless communication device 1904.

In the second configuration 1920, the repeater device 1902 may be controlled by the base station 1901. The repeater device 1902 may receive control signaling comprising control information from the base station 1901. The control signaling may be associated with traffic (e.g., data signaling) relayed through the repeater device 1902 between the first wireless communication device 1903 (WD1) and the second wireless communication device 1904 (WD2). In the second configuration 1920, the first wireless communication device 1903 (WD1) is not a base station (e.g., it is not the base station 1901 (BS)). In the second configuration, traffic (e.g., user data, user signaling) may be relayed through the repeater device 1902, between the first wireless communication device 1903 (WD1) and the second wireless communication device 1904 (WD2). The base station 1901 and the repeater device 1902 may exchange control information over control signaling. Traffic between the first wireless communication device 1903 (WD1) and the second wireless communication device 1904 (WD2) may, or may not, be passed (copied, bicast, groupcast) to the base station 1901.

In a third configuration 1930, the repeater device 1902 may be controlled by the base station 1901. The base station 1901 may be the first wireless communication device 1903 or may not be the first wireless communication device 1903. The alternative identities/locations of the base station 1901 are shown in dashed line. The repeater device 1902 may receive from the base station 1901, control signaling comprising control information, in association with traffic relayed through the repeater device 1902 between the first wireless communication device 1903 (WD1) and the second wireless communication device 1904 (WD2). In the third configuration 1930, the first wireless communication device 1903 (WD1) may be represented as being at least one of: the base station 1901, one or more different base stations (BS 2) 1908, (BS 3) 1910, one or more different wireless communication devices (WD3) 1906, one or more integrated access and backhaul (IAB) nodes (IAB 1) 1912, (IAB 2) 1914, or one or more different repeater devices (R2) 1916, (R3) 1918. The second wireless communication device 1904 (WD2) may be represented as being at least one or more of: one or more different base stations (BS 4) 1909, (BS 5) 1911, one or more different wireless communication devices 1903 (WD1), 1904 (WD2), 1905 (WD4), 1907 (WD5), one or more integrated access and backhaul (IAB) nodes (IAB 3) 1913, (IAB 4) 1915, or one or more different repeater devices (R4) 1917, (R5) 1919.

Figure 20:
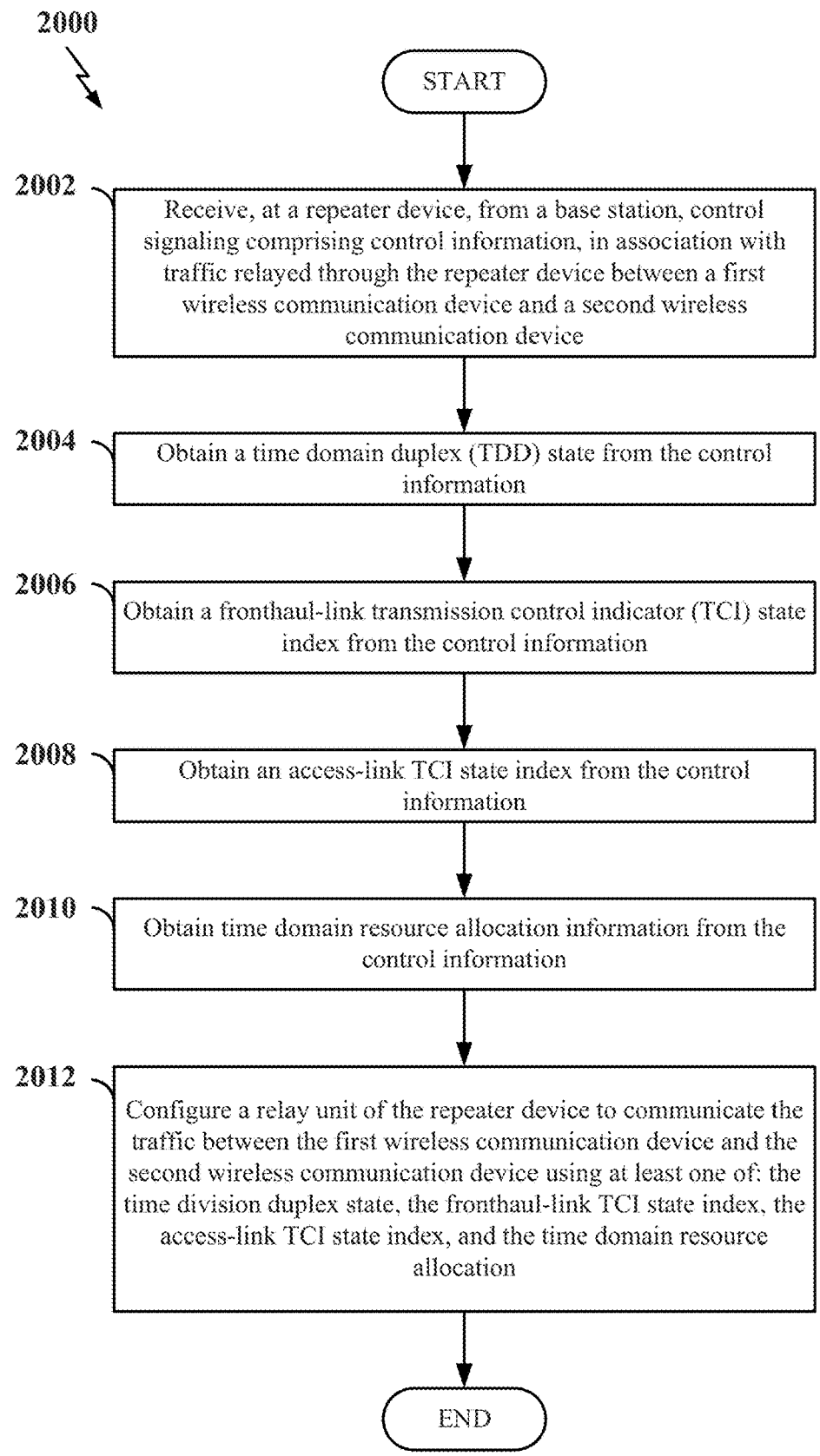
FIG. 20 is a flow chart illustrating an exemplary process at a wireless repeater device controlled by a base station for receiving control signaling comprising control information and configuring the repeater device according to the control information in accordance with some aspects of the disclosure.

FIG. 20 is a flow chart illustrating an exemplary process 2000 (e.g., a method) at a wireless repeater device controlled by a base station for receiving control signaling comprising control information and configuring a relay unit of the repeater device according to the control information in accordance with some aspects of the disclosure. The repeater device may relay traffic (e.g., user data, user signaling) and/or control (e.g., control information, control messaging), between the base station and a wireless device as graphically illustrated in FIG. 19A, between two wireless devices as graphically illustrated in FIG. 19B, and/or between pluralities of devices as graphically illustrated in FIG. 19C. As described below, some or all illustrated features may be omitted in a particular implementation within the scope of the present disclosure, and some illustrated features may not be required for implementation of all examples. In some examples, the process 2000 may be carried out by the repeater device 1800 illustrated in FIG. 18. In some examples, the process 2000 may be carried out by any suitable apparatus or means for carrying out the functions or algorithms described herein.

In some examples, the base station may correspond to any of the base stations or scheduling entities shown in any of FIGS. 1, 2, 5, 6, 7, 8, 9, 11, 12, 19, and/or 21. While reference may be made to the repeater device 1800 of FIG. 18, in some examples the repeater device may correspond to any of the repeater devices of FIGS. 7, 8, 9, 10, 11, 12, 18, and/or 19. In some examples, the first wireless device and the second wireless device may respectively correspond to any of the UEs or scheduled entities of FIGS. 1, 2, 5, 6, 7, 8, 9, 11, 12, 19, and/or 21.

At block 2002, the repeater device may receive, from the base station, control signaling comprising control information, in association with traffic relayed through, or to be relayed through, the repeater device between a first wireless communication device and a second wireless communication device. Prior to receiving the control signaling, the repeater device and the base station may establish a link between the repeater device and the base station over a Uu radio interface (e.g., a 5G Uu interface) between the base station and the repeater device. The link may be established on one component carrier, for example.

The control information may be configured as downlink control information (DCI). The control information may also include, for example, at least one of: a relay unit receiver beamforming parameter, a relay unit transmitter beamforming parameter, a relay unit transmitter power parameter, or a relay unit operating bandwidth.

According to some aspects, the method may also include obtaining the DCI from wireless communication device control signaling (e.g., the first wireless communication device, the second wireless communication device). The control signaling may be directed toward the wireless communication device on a physical downlink control channel (PDCCH). In some examples the DCI may occupy some or all of a bandwidth part (BWP) allocated for the wireless communication device control signaling. The BWP may be at least one of: an initial BWP, or a configured BWP. In some aspects, the repeater device may demultiplex (e.g., separate, extract) the control information from the wireless communication device control signaling. In such a circumstance, the control information and the wireless communication device control signaling may be conveyed on a resource allocated for the wireless communication device control signaling (e.g., a PDCCH, or a granted resource on a PDSCH).

At block 2004, the repeater device may obtain a time division duplex state from the control information. According to some aspects, the repeater device may configure the relay unit of the repeater device according to the time division duplex state. Configuring the relay unit according to the time division duplex state may cause the repeater device (or the relay unit of the repeater device) to relay the traffic in a direction indicated by the time division duplex state.

At block 2006, the repeater device may obtain a fronthaul-link transmission control indicator (TCI) state index from the control information. According to some aspects, the repeater device may configure a fronthaul-link beam of the relay unit according to the fronthaul-link TCI state index. The fronthaul-link TCI state index (also referred to as a fronthaul-link TCI state index number) may correspond to one of a plurality of fronthaul-link beam configurations corresponding to at least one of: a downlink (DL) fronthaul-link beam, or an uplink (UL) fronthaul-link beam.

At block 2008, the repeater device may obtain an access-link TCI state index (also referred to as an access-link TCI state index number) from the control information. According to some aspects, the repeater device may configure an access-link beam of the relay unit according to the access-link TCI state index. The access-link TCI state index may correspond to one of a plurality of access-link beam configurations corresponding to at least one of: a DL access-link beam, or a UL access-link beam.

At block 2010, the repeater device may obtain a time domain resource allocation from the control information. The time domain resource allocation information may include, for example, at least one of: a slot location, and a symbol location of the traffic. According to some aspects, the repeater device may configure the relay unit to relay the traffic identified by at least one of: the slot location, and the symbol location of the traffic obtained from the time domain resource allocation.

At block 2012, the repeater device may configure a relay unit of the repeater device to communicate the traffic between the first wireless communication device and the second wireless communication device based the control information using at least one of: the time division duplex state, the fronthaul-link TCI state index, the access-link TCI state index, or the time domain resource allocation. According to some aspects, the obtaining (including, e.g., receiving and identifying) any one or more of the obtained features (e.g., time domain duplex state, fronthaul-link TCI state index, access-link TCI state index and/or time domain resource allocation information), and the configuring of the relay unit may be performed by a mobile termination (MT) of the repeater device. In accordance with some aspects of the disclosure, a relay unit beamforming configuration may be selected using the control information.

In some examples, the repeater device may demask the control information by descrambling a cyclic redundancy check (CRC) of the control information with a radio network temporary identifier (RNTI) of the repeater device. The repeater device may then obtain a CRC of the control information. The repeater device may next confirm that the descrambled CRC of the control information is equal to the obtained CRC of the control information. Correctly validating the CRC according to such a procedure may allow the repeater device to conclude that a DCI having a CRC masked with the RNTI of the repeater device was intended for the repeater device, and not for another repeater device (having a different RNTI). The RNTI may be designated to uniquely identify the repeater device and associate the repeater device with a relay of the control (e.g., control information, control signaling, control messaging) and the traffic (e.g., user data, user signaling) between the base station and between a first wireless communication device and a second wireless communication device. According to some aspects, the RNTI may be designated as a relay unit-RNTI (RU-RNTI).

In some examples the control information transmitted to the repeater device may be configured as downlink control information (DCI). In some examples, the configuration of the relay unit with the control information may be a dynamic configuration, a semi-persistent configuration, or a periodic configuration. According to some aspects the control information may be received as at least one of: a downlink control information (DCI), a medium access control-control element (MAC-CE), or a radio resource control (RRC) configuration.

For both access-link and fronthaul-link TCI states, an active TCI state may be associated with multiple beam identifiers (or indexes). For example, for the access-link, the multiple beam identifiers may be realized in connection with a relay unit (RU) of a repeater device that can simultaneously serve multiple directions (e.g., broadcast (TX) a DL signal, or receive (RX) a UL signal, combined with forwarding (FWD) multiple frequency division multiplexed (FDMed) UL signals). In another example, for the fronthaul-link, the multiple beam identifiers may be realized in connection with an RU that can simultaneously communicate with a gNB with multiple beams, or with multiple gNBs.

In one exemplary aspect, the repeater device may additionally configure the relay unit with a respective default of at least one of: the time division duplex state, the fronthaul-link TCI state index, the access-link TCI state index, or the TDRA when a respective value is not given with the control information. In another exemplary aspect the repeater device may configure the relay unit to not relay a message when a predetermined value of the fronthaul-link TCI state index or the access-link TCI state index is given with the control information. The predetermined value may be, for example, a value of "0" or a "null" value. The respective default may be obtained, for example, from a corresponding parameter configured for a mobile termination (MT) of the repeater device. In one example, when the relay is between a first wireless communication device and a second wireless communication device, the respective default may be obtained, for example, from a corresponding parameter configured for at least one of: the first wireless communication device, or the second wireless communication device.

According to aspects described herein, a time division duplex state (that may take on two values, e.g., DL and UL) may be provided in control information (e.g., control messaging) for a repeater device. The use of the time division duplex state may be optional. In a case where a time division duplex state may not be included in the control information, the repeater device may use a default time division duplex state. According to some examples, the default time division duplex state may be obtained from at least one of: a TDDconfigCommon, a TDDconfigDedicated, or a slot format identification (SFI) parameter of the MT.

In some examples, a time division duplex state may not be included in a control message of repeater device and/or a state of the associated resources may be indicated as being "flexible" in the time division duplex configuration (e.g., TDDconfigCommon, TDDconfigDedicated) or the SFI. In such an example, if the repeater device is a bidirectional repeater device, the repeater device may forward communication (e.g., traffic and/or control) in both the UL and DL directions. However, if the repeater device is not a bidirectional repeater device, the repeater device may forward communication (e.g., traffic and/or control) in either the UL or DL direction, as determined by a default direction that may be configured to the repeater device.

In some examples, the respective default of the fronthaul-link TCI state index may be obtained from a TCI state of the MT. That is, the default of the fronthaul-link TCI state index may be whatever beam that the MT unit would use for its downlink or uplink within the same resources. In other words, the default of the fronthaul-link TCI state index may be the TCI state index value used (e.g., currently used) by the MT unit for a corresponding beam (e.g., a UL or a DL beam) that uses the same resources. For example, an uplink fronthaul-link TCI state index may be the same TCI state index as for an uplink beam of the MT. For example, a downlink fronthaul-link TCI state index may be the same TCI state index as for a downlink beam of the MT.

According to one aspect, the respective default of the access-link TCI state index may be the TCI state index that is currently being used or was most recently configured. For example, a DCI at time t0 may indicate an access-link TCI state index value of X, where X is an integer. According to this example, the repeater device may use X as the access-link TCI state index value until another DCI indicates any different access-link TCI state index value. According to another aspect, the respective default of the access-link TCI state index may be semi-statically configured or may be semi-statically configured per time resources. According to this aspect, the respective default of the access-link TCI state index may be conveyed in at least one of: periodic slot beamforming patterns, or symbol-level beamforming patterns. In one example, the default may be conveyed for periodic or semi-static communications (e.g., SSBs/RMSI PDCCH/RACH, CSI-RS, SR, SRS). In another example, the default may be conveyed for semi-persistent (or even dynamic) communications.

According to some examples, the respective default of the TDRA is obtained from a corresponding TDRA parameter of the MT. Alternatively, if the TDRA is not present in the control information, an indicated configuration in the control information may be adopted until a next TDRA in a next control information, overrides the adopted configuration. The indicated configuration may be adopted as soon as the control information is successfully decoded, and the content is acquired.

In one example, the fronthaul-link TCI state index of the DL fronthaul-link beam may be equal to a first MT unit TCI state index of a corresponding MT unit DL beam. The fronthaul-link TCI state index of the UL fronthaul-link beam may be equal to a second MT unit TCI state index of a corresponding MT unit UL beam. Alternatively, the fronthaul-link TCI state index of at least one of: a DL or a UL fronthaul-link TCI state, or an access-link TCI state index of at least one of: a DL or a UL access-link TCI state may be an index value of up to g activated fronthaul-link TCI states, or up to h activated access-link TCI states, respectively, wherein g and h are integers.

According to some aspects, the fronthaul-link TCI and the access-link TCI may be activated over one or more MAC-CE. For example, at least one of: an activated fronthaul-link TCI state, or an activated access-link TCI state may be activated over one or more medium access control-control elements (MAC-CEs). In one example, at least one of: an active fronthaul-link TCI state, or an active access-link TCI state may be associated with a plurality of beam identifiers (IDs). For a TCI state, an index value of the up to g fronthaul-link TCI states, or the up to h access-link TCI states may be an index to at least one of: one or multiple of K SSBs sent by the repeater device, wherein K is an integer; a set of beam identifiers, wherein the repeater device indicates a quantity of members of the set of beam identifiers as at least one capability of the relay unit; a synchronization signal block (SSB) (where SSB refers to the SSBs (1, ..., L_max) sent by the base station and received/measured/reported by the MT unit of the repeater device and where the SSBs may be the same or different from the K SSBs recited above); a channel state information-reference signal (CSI-RS); or a sounding reference signal (SRS) resource. The quantity of members of the set of beam identifiers may be equal to a number of fronthaul-link beams that are configured on an array used for the fronthaul-link.

According to some aspects, g and h may be less than or equal to K. For example, for K=16 (i.e., the base station sends K SSBs presumably using K different beams), the repeater device may be configured with g=8 of these K=16 SSBs (these may be referred to as the active TCI states). For example, a 1st SSB, 3rd SSB, 5th SSB, 6th SSB, .... The control information may provide an index of a value from 0 to 7 to indicate the active TCI states. In some examples, the K SSBs recited above may refer to SSBs that are sent (e.g., forwarded) by the repeater device. At some prior time, the network had indicated these K SSBs (out of total of L_max SSBs that could be e.g., L_max=64 in FR2).

According to one aspect, at least one of: the obtaining the fronthaul-link TCI state index, or the obtaining the access-link TCI state index may further include at least one of: receiving a periodic slot-level beamforming pattern or receiving a symbol-level beamforming pattern in a slot identified by a slot index number. Still further, a slot comprising a previously received periodic slot-level beamforming pattern may be overridden with a symbol-level beamforming pattern. The periodic slot-level beamforming pattern may be received in at least one of: a MAC-CE, or RRC signaling. The symbol-level beamforming pattern may be received in at least one of: a DCI, a MAC-CE, or RRC signaling. According to some example, at least one of: the periodic slot-level beamforming pattern, or the symbol-level beamforming pattern may include a null value in at least one symbol in at least one slot, and the relay unit powers off during the at least one symbol containing the null value. In another example at least one of: the periodic slot-level beamforming pattern, or the symbol-level beamforming pattern may include a flexible symbol in at least one symbol in at least one slot, and at least one of: the base station, or the repeater device obtains a default TCI state index of the flexible signal from a location other than the periodic slot-level beamforming pattern or the symbol-level beamforming pattern.

In some aspects, the repeater device may be bidirectional. Accordingly, a method of receiving the control signaling comprising control information may be altered. For example, receiving, from the base station, control signaling comprising control information, in association with traffic relayed through the repeater device between the base station and a user equipment (UE) may further include identifying a second time division duplex state, different from the time division duplex state, from the control information, obtaining a second fronthaul-link TCI state index from the control information, obtaining a second access-link TCI state index from the control information, and obtaining a time configuration comprised of a start symbol and a duration from the control information. Still further the bidirectional repeater device may be configured to: relay the traffic in a first direction indicated by the time division duplex state, on a fronthaul-link beam defined by the fronthaul-link TCI state and on an access-link beam defined by the access-link TCI state, and to simultaneously relay second traffic in a second direction indicated by the second time division duplex state, on a second fronthaul-link beam defined by the second fronthaul-link TCI state and on a second access-link beam defined the second access-link TCI state, wherein the second traffic starts at a predetermined start symbol and duration identified by the time configuration.

In greater detail, with regard to a repeater device that is bidirectional and communicates the traffic in a first direction and second traffic in a second direction, The repeater device may additionally: obtain a second time division duplex state, different from the time division duplex state, from the control information, obtain a second fronthaul-link TCI state index from the control information, obtain a second access-link TCI state index from the control information, and/or obtain a time configuration comprised of a start symbol and a duration from the control information. Still further, the repeater device may configure the relay unit to communicate the traffic between the first wireless communication device and the second wireless communication device in the first direction based the control information comprising at least one of: the time division duplex state, the fronthaul-link TCI state index, the access-link TCI state index, or the time domain resource allocation, and may still further configure the relay unit to communicate the second traffic between the first wireless communication device and the second wireless communication device in the second direction based the control information further comprising at least one of: the second time division duplex state, the second fronthaul-link TCI state index, the second access-link TCI state index, or the time domain resource allocation. According to some examples, the third and fourth devices may be realized individually or in various combinations, where, for example, the third device may be the first device, the third device may be the second device, the fourth device may be the first device, and/or the fourth device may be the second device.

In one configuration, the repeater device 1800 for wireless communication, controlled by a base station, in a wireless communication network, may include: means for receiving, from the base station, control signaling comprising control information, in association with traffic relayed through the repeater device between a first wireless communication device (e.g., a first UE) and a second wireless communication device (e.g. a second UE), or between the base station and the first wireless communication device; means for obtaining a time division duplex state from the control information; means for obtaining a fronthaul-link TCI state index from the control information; means for obtaining an access-link TCI state index from the control information; means for obtaining a time domain resource allocation from the control information; and means for configuring a relay unit of the repeater device to communicate the traffic between the first wireless communication device and the second wireless communication device, or between the base station and the first wireless communication device, using at least one of: the time division duplex state, the fronthaul-link TCI state index, the access link TCI state index, or the time domain resource allocation.

In one aspect, the aforementioned means may be the processor 1804 shown in FIG. 18 and configured to perform the functions recited by the aforementioned means. In another aspect, the aforementioned means may be a circuit, or any apparatus configured to perform the functions recited by the aforementioned means.

According to another aspect, an article of manufacture for use by a wireless repeater device controlled by a base station in a wireless communication network may be described. The article of manufacture may include a non-transitory computer-readable medium having stored therein instructions executable by one or more processors of the wireless communication device to: receive, from the base station, control signaling comprising control information, in association with traffic relayed through the repeater device between a first wireless communication device and a second wireless communication device, obtain a time division duplex state from the control information, obtain a fronthaul-link TCI state index from the control information, obtain an access-link TCI state index from the control information, obtain a time domain resource allocation from the control information, and configure a relay unit of the repeater device to communicate the traffic between the first wireless communication device and the second wireless communication device based at least one of: the time division duplex state, the fronthaul-link TCI state index, the access-link TCI state index, or the time domain resource allocation.

Figure 21:
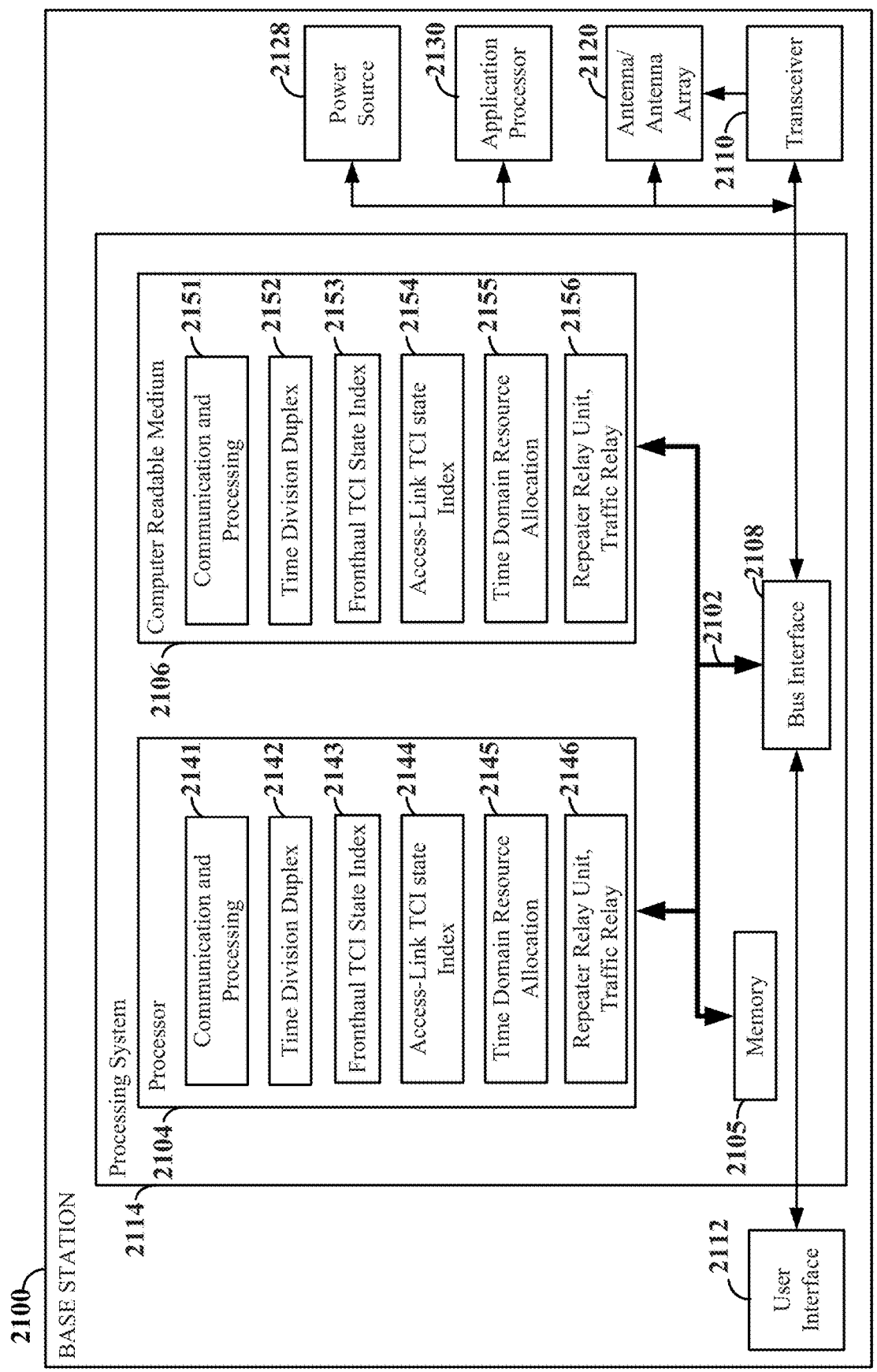
FIG. 21 is a block diagram illustrating an example of a hardware implementation of a base station employing a processing system according to some aspects of the disclosure.

FIG. 21 is a block diagram illustrating an example of a hardware implementation of a base station 2100 employing a processing system 2114 according to some aspects of the disclosure. The base station 2100 may correspond to any base station, eNB, gNB, or network access node of FIGS. 1, 2, 5, 6, 7, 8, 9, 11, 12, and/or 19. According to some aspects, some components of the base station 2100 may be the same or similar to components of other devices described herein including, for example, the repeater device 1800 of FIG. 18, a first base station 1901, a first wireless communication device 1903, and/or a second wireless communication device 1904, all of FIG. 19. To avoid repetition, in general, and without any intent to limit any hardware or structure, the description of the hardware implementation of the base station 2100 may be understood from the descriptions of similar hardware implementations of the repeater device 1800, the first base station 1901, the first wireless communication device 1903, and/or the second wireless communication device 1904.

The processing system 2114 may be substantially the same as the processing system 1814 illustrated in FIG. 18, including a bus interface 2108, a bus 2102, memory 2105, a processor 2104, and a computer-readable medium 2106. In accordance with various aspects of the disclosure, an element, or any portion of an element, or any combination of elements may be implemented with a processing system 2114 that includes one or more processors, such as processor 2104. The processor 2104 may in some instances be implemented via a baseband or modem chip and in other implementations, the processor 2104 may itself comprise a number of devices distinct and different from a baseband or modem chip (e.g., in such scenarios is may work in concert to achieve examples discussed herein). As mentioned above, various hardware arrangements and components outside of a baseband modem processor can be used in implementations, including RF-chains, power amplifiers, modulators, buffers, interleavers, adders/summers, etc. In various examples, the base station 2100 may be configured to perform any one or more of the functions described herein. That is, the processor 2104, as utilized in base station 2100, may be used to implement any one or more of the processes described and illustrated, for example, in FIG. 22.

Furthermore, the base station 2100 may include a user interface 2112, a transceiver 2110, one or more antennas/ antenna array/antenna module 2120, an application processor 2130, and a power source 2128 substantially similar to those described above with reference to FIG. 18. In some aspects, the user interface 2112 may be optional. The transceiver 2110 may be, for example, a wireless transceiver. The processor 2104, as utilized in the base station 2100, may be used to implement any one or more of the processes described herein and illustrated, for example, in FIG. 22.

In some aspects of the disclosure, the processor 2104 may include communication and processing circuitry 2141 configured for various functions, including for example communicating with a user equipment (UE), a wireless communication device, a network core (e.g., a 5G core network), other base stations or scheduling entities, or any other entity, such as, for example, an IAB node, local infrastructure, or an entity communicating with the base station 2100 (e.g., the scheduled entity) via the Internet, such as a network provider. In some examples, the communication and processing circuitry 2141 may include one or more hardware components that provide the physical structure that performs processes related to wireless communication (e.g., signal reception and/or signal transmission) and signal processing (e.g., processing a received signal and/or processing a signal for transmission), as well as process related to determining to relay traffic between a first wireless communication device and a second wireless communication device, through a repeater device such as the repeater device 1800, and transmitting, to the repeater device, control information over control signaling to configure a relay unit of the repeater device to communicate traffic between the first wireless communication device and the second wireless communication device using the control information comprising at least one of: the time division duplex state, the fronthaul link TCI state index, the access link TCI state index, or the time domain resource allocation. In addition, the communication and processing circuitry 2141 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118), as well as being configured to determine to relay traffic through a repeater device, such as the repeater device 1800. The communication and processing circuitry 2141 may further be configured to execute communication and processing software 2151 stored on the computer-readable medium 2106 to implement one or more functions described herein including one or more of the functions described below in relation to FIG. 22, including, e.g., blocks 2202 and 2212.

In some aspects of the disclosure, the processor 2104 may include time division duplex circuitry 2142 configured for various functions, including, for example, obtaining a time division duplex state associated with traffic to be relayed. In some examples, the time division duplex circuitry 2142 may include one or more hardware components that provide the physical structure that performs processes related to obtaining a time division duplex state associated with traffic to be relayed. The time division duplex circuitry 2142 may further be configured to execute time division duplex software 2152 stored on the computer-readable medium 2106 to implement one or more functions described herein including one or more of the functions described below in relation to FIG. 22, including, e.g., block 2204.

In some aspects of the disclosure, the processor 2104 may include fronthaul-link TCI state index circuitry 2143 configured for various functions, including, for example, obtaining a fronthaul-link TCI state index associated with traffic to be relayed. In some examples, the fronthaul-link TCI state index circuitry 2143 may include one or more hardware components that provide the physical structure that performs processes related to obtaining a fronthaul-link TCI state index associated with traffic to be relayed. The fronthaul-link TCI state index circuitry 2143 may further be configured to execute fronthaul-link TCI state index software 2153 stored on the computer-readable medium 2106 to implement one or more functions described herein including one or more of the functions described below in relation to FIG. 22, including, e.g., blocks 2206.

In some aspects of the disclosure, the processor 2104 may include access-link TCI state index circuitry 2144 configured for various functions, including, for example, obtaining the access-link TCI state index associated with traffic to be relayed. In some examples, the access-link TCI state index circuitry 2144 may include one or more hardware components that provide the physical structure that performs processes related to obtaining the access-link TCI state index associated with traffic to be relayed. The access-link TCI state index circuitry 2144 may further be configured to execute access-link TCI state index software 2154 stored on the computer-readable medium 2106 to implement one or more functions described herein including one or more of the functions described below in relation to FIG. 22, including, e.g., block 2208.

In some aspects of the disclosure, the processor 2104 may include time domain resource allocation circuitry 2145 configured for various functions, including, for example, obtaining a time domain resource allocation associated with traffic to be relayed. In some examples, the time domain resource allocation circuitry 2145 may include one or more hardware components that provide the physical structure that performs processes related to obtaining time domain resource allocation associated with traffic to be relayed. The time domain resource allocation circuitry 2145 may further be configured to execute time domain resource allocation software 2155 stored on the computer-readable medium 2106 to implement one or more functions described herein including one or more of the functions described below in relation to FIG. 22, including, e.g., block 2210.

Figure 22:
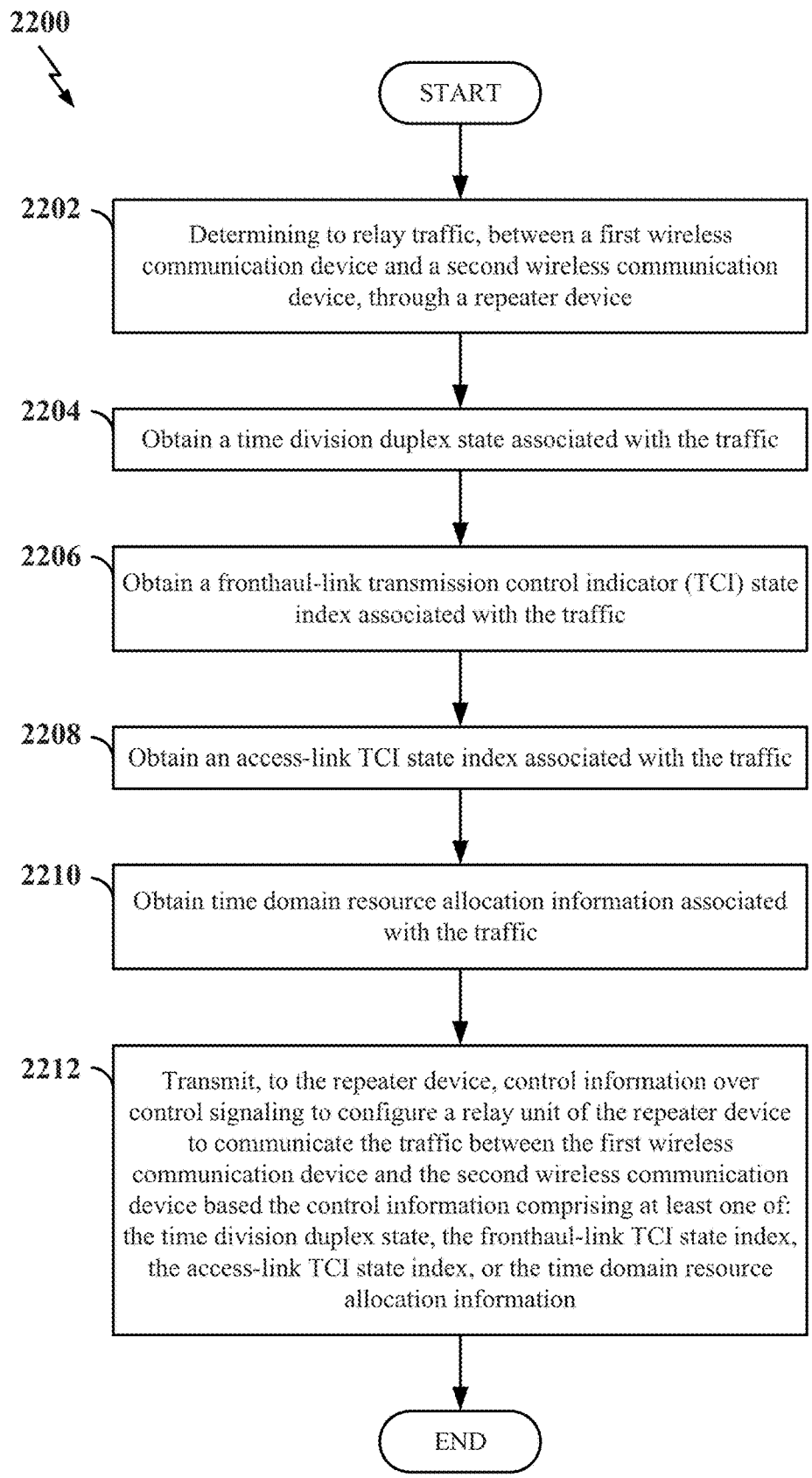
FIG. 22 is a flow chart illustrating an exemplary process for a base station that configures a repeater device with control information conveyed over control signaling in accordance with some aspects of the disclosure.

FIG. 22 is a flow chart illustrating an exemplary process 2200 (e.g., a method) for a base station that configures a repeater device with control information conveyed over control signaling in accordance with some aspects of the disclosure. As described below, some or all illustrated features may be omitted in a particular implementation within the scope of the present disclosure, and some illustrated features may not be required for implementation of all examples. In some examples, the process 2200 may be carried out by the base station 2100 illustrated in FIG. 21. In some examples, the process 2200 may be carried out by any suitable apparatus or means for carrying out the functions or algorithms described herein.

At block 2202, the base station may determine to relay traffic, between a first wireless communication device and a second wireless communication device, through the repeater device. Prior to transmitting the control signaling, the repeater device and the base station may establish a link between the repeater device and the base station over a Uu radio interface (e.g., a 5G Uu interface) between the base station and the repeater device. The link may be established on one component carrier.

The control information may be configured as downlink control information (DCI). The control information may also include, for example, a relay unit receiver beamforming parameter, a relay unit transmitter beamforming parameter, a relay unit transmitter power parameter, or a relay unit operating bandwidth.

According to some aspects, the method may also include obtaining the DCI from wireless communication device control signaling (e.g., the first wireless communication device, the second wireless communication device). The control signaling may be directed toward the wireless communication device on a physical downlink control channel (PDCCH). In some examples the DCI may occupy some or all of a bandwidth part (BWP) allocated for the wireless communication device control signaling. The BWP may be at least one of: an initial BWP, or a configured BWP. In some aspects, the repeater device may demultiplex (e.g., extract) the control information from the wireless communication device control signaling. In such a circumstance, the control information and the wireless communication device control signaling may be conveyed on a resource allocated for the wireless communication device control signaling (e.g., a PDCCH, or a granted resource on a PDSCH).

At block 2204, the base station may obtain a time division duplex state associated with the traffic. According to some aspects, obtaining the time division duplex state may include configuring the control information with a traffic direction indicated by the time division duplex state.

At block 2206, the base station may obtain a fronthaul-link TCI state index associated with the traffic. According to some aspects, obtaining the fronthaul-link TCI state index may also include configuring the control information with the fronthaul-link TCI state index that indicates one fronthaul-link beam configuration, of a relay unit of the repeater device, from a plurality of fronthaul-link beam configurations corresponding to at least one of: a downlink (DL) fronthaul-link beam, or an uplink (UL) fronthaul-link beam.

At block 2208, the base station may obtain an access-link TCI state index associated with the traffic. According to some aspects, obtaining the access-link TCI state index may also include configuring the control information with the access-link TCI state index that indicates one access-link beam configuration, of a relay unit of the repeater device, from a plurality of access-link beam configurations corresponding to at least one of: a DL access-link beam, or a UL access-link beam.

At block 2210, the base station may obtain a time domain resource allocation associated with the traffic. According to some aspects, obtaining the time domain resource allocation may also include configuring the control information with at least one of: a slot location, or a symbol location indicated by the time domain resource allocation.

At block 2212, the base station may transmit, to the repeater device, control information over control signaling to configure a relay unit of the repeater device to communicate the traffic between the first wireless communication device and the second wireless communication device based the control information comprising at least one of: the time division duplex state, the fronthaul-link TCI state index, the access-link TCI state index, or the time domain resource allocation.

In some examples, the base station may mask the control information by scrambling a cyclic redundancy check (CRC) of the control information with a radio network temporary identifier (RNTI) of the repeater device. The RNTI may be an RU-RNTI. The repeater device may use the masked CRC to identify control information designated to the repeater device. For example, repeater device may use a process of validating the CRC that is the same or similar to the CRC validation process described above.

In some examples the control information transmitted to the repeater device may be configured as downlink control information (DCI). In some examples, the configuration of the relay unit with the control information may be at least one of: a dynamic configuration, a semi-persistent configuration, or a periodic configuration. According to some aspects the control information may be received as at least one of: a downlink control information (DCI), a medium access control-control element (MAC-CE), or a radio resource control (RRC) configuration.

In one exemplary aspect, the base station may not provide a value of at least one of: the time division duplex state, the fronthaul-link TCI state, the access-link TCI state, or the TDRA with the control information. By not providing a value, the base station may cause the mobile termination to configure the relay unit with a respective default. Alternatively, the base station may provide a predetermined value of the fronthaul-link TCI state index or the access-link TCI state index with the control information to cause the mobile termination to configure the relay unit to not relay a message. In one example, the predetermined value may be a 0 value or a "null" value.

In some examples, the respective default may be obtained from a corresponding parameter configured for a mobile termination (MT) of the repeater device, or a corresponding parameter configured for at least one of: the first wireless communication device, or the second wireless communication device. In one example, the respective default of the time division duplex state may be obtained from a TDD-configCommon parameter of at least one of: the first wireless communication device, or the second wireless communication device. In another example, the respective default of the time division duplex state may be obtained from at least one of: a TDDconfigCommon, a TDDconfigDedicated, or a slot format identification parameter of a mobile termination (MT) of the repeater device.

In one example, the respective default of the fronthaul-link TCI state index may be a TCI state index value used by a mobile termination (MT) of the repeater device for a corresponding beam that uses the same resources. In one example, the respective default of the fronthaul-link TCI state index may be obtained from a synchronization signal block (SSB) parameter of at least one of: the repeater device, the first wireless communication device, or the second wireless communication device.

In one example, the respective default of the access-link TCI state index may be obtained from the synchronization signal block (SSB) parameter of the at least one of: the repeater device, the first wireless communication device, or the second wireless communication device. In another example, the respective default of the access-link TCI state index may be at least one of: a current access-link TCI state index, a last configured access-link TCI state index if there is no current access-link TCI state index, or a semi-statically configured value conveyed in at least one of: a periodic slot beamforming pattern, or a symbol-level beamforming pattern.

The respective default of the TDRA may be obtained from a corresponding TDRA parameter of at least one of: the repeater device, the first wireless communication device, or the second wireless communication device. Alternatively, if the TDRA is not present in the control information, an indicated configuration in the control information may be adopted until a next TDRA in a next control information overrides the adopted configuration. In one example, the respective default of the time domain resource allocation may be at least one of: obtained from a corresponding time domain resource allocation parameter of a mobile termination (MT) of the repeater device, or if the time domain resource allocation is not present in the control information, an indicated configuration in the control information is adopted until a next time domain resource allocation in a next control information, overrides the adopted configuration.

In one example, the fronthaul-link TCI state index of the DL fronthaul-link beam may be equal to a first TCI state index of a corresponding DL beam of at least one of: the repeater device, the first wireless communication device, or the second wireless communication device. The fronthaul-link TCI state index of the UL fronthaul-link beam may be equal to a second TCI state index of a corresponding UL beam at least one of: the repeater device, the first wireless communication device, or the second wireless communication device. The fronthaul-link TCI state index of at least one of: a DL or a UL fronthaul-link TCI state index, or an access-link TCI state index is an index value of up to g activated fronthaul-link TCI states, or up to h activated access-link TCI states, respectively, wherein g and h are integers. According to some aspects, the fronthaul-link TCI and the access-link TCI may be activated over one or more medium access control-control elements (MAC-CEs).

In one example, at least one of: an activated fronthaul-link TCI state, or an activated access-link TCI state may be associated with a plurality of beam identifiers (IDs). In another example the index value of the up to g fronthaul-link TCI states, or the up to h access-link TCI states may be an index to at least one of: one or multiple of K SSBs sent by the repeater device, wherein K is an integer; a set of beam identifiers, wherein the repeater device indicates a quantity of members of the set of beam identifiers as at least one capability of the relay unit; an SSB (where SSB refers to the SSBs (1, . . . , L_max) sent by the base station and received/measured/reported by the MT unit of the repeater device; the SSBs may be the same or different from the K SSBs recited above); a channel state information-reference signal (CSI-RS); or a sounding reference signal (SRS) resource. The quantity of members of the set of beam identifiers may be equal to a number of fronthaul-link beams that are configured on an array used for the fronthaul.

According to some aspects, g and h may be less than or equal to K. For example, for K=16 (i.e., the base station sends K SSBs presumably using K different beams), the repeater device may be configured with g=8 of these K=16 SSBs (these may be referred to as the active TCI states). For example, a 1st SSB, 3rd SSB, 5th SSB, 6th SSB, . . . . The control information may provide an index of a value from 0 to 7 to indicate the active TCI states. In some examples, the K SSBs recited above may refer to SSBs that are sent (e.g., forwarded) by the repeater device. At some prior time, the network had indicated these K SSBs (out of total of L_max SSBs that could be e.g., L_max=64 in FR2).

According to one aspect, at least one of: the obtaining the fronthaul-link TCI state index, or the obtaining the access-link TCI state index may further include at least one of: transmitting a periodic slot-level beamforming pattern or transmitting a symbol-level beamforming pattern in a slot identified by a slot index number. Still further, a slot comprising a previously transmitted periodic slot-level beamforming pattern may be overridden with a symbol-level beamforming pattern. The periodic slot-level beamforming pattern may be transmitted in at least one of: a MAC-CE, or RRC signaling. The symbol-level beamforming pattern may be received in at least one of: a DCI, a MAC-CE, or RRC signaling. According to some example, at least one of: the periodic slot-level beamforming pattern, or the symbol-level beamforming pattern may include a null value in at least one symbol in at least one slot, and transmitting the null value causes the relay unit to power off during the at least one symbol containing the null value. In another example at least one of: the periodic slot-level beamforming pattern, or the symbol-level beamforming pattern includes a flexible symbol in at least one symbol in at least one slot. At least one of: the base station, or the repeater device may obtain a default TCI state index of the flexible signal from a location other than the periodic slot-level beamforming pattern or the symbol-level beamforming pattern.

In some aspects, the repeater device may be bidirectional and may communicate the traffic in a first direction (e.g., UL) and second traffic in a second direction (e.g., DL). Accordingly, a method of transmitting, to the repeater device, control information over control signaling to configure the relay unit of the repeater device to communicate the traffic between the first wireless communication device and the second wireless communication device may be altered. For example, determining to relay traffic, between the first wireless communication device and the second wireless communication device, through the repeater device, may further include obtaining a second time division duplex state, different from the time division duplex state, associated with the traffic. The method may also include obtaining a second fronthaul-link TCI state index associated with the traffic and obtaining a second access-link TCI state index associated with the traffic. The method may still further include obtaining a time configuration comprised of a start symbol and a duration associated with the traffic. The transmitting may also be modified, for example, for a bidirectional repeater device, the base station may transmit, to the repeater device, the control information over the control signaling to configure the relay unit of the repeater device to communicate the traffic between the first wireless communication device and the second wireless communication device in the first direction based the control information comprising at least one of: the time division duplex state, the fronthaul-link TCI state index, the access-link TCI state index, or the time domain resource allocation. The base station may then also transmit, to the repeater device, the control information over the control signaling to configure the relay unit of the repeater device to communicate the second traffic between the first wireless communication device and the second wireless communication device in the second direction based the control information further comprising at least one of: the second time division duplex state, the second fronthaul-link TCI state index, the second access-link TCI state index, or the time domain resource allocation. Other examples of bidirectional repeater devices are described above and will not be repeated for the sake of conciseness.

In one configuration, the base station 2100 for wireless communication may include means for determining to relay traffic, between a first wireless communication device and a second wireless communication device, through the repeater device, means for obtaining a time division duplex state associated with the traffic, means for obtaining a fronthaul-link TCI state index associated with the traffic, means for obtaining an access-link TCI state index associated with the traffic, means for obtaining a time domain resource allocation associated with the traffic, and means for transmitting, to the repeater device, control information over control signaling to configure a relay unit of the repeater device to communicate the traffic between the first wireless communication device and the second wireless communication device using the control information comprising at least one of: the time division duplex state, the fronthaul-link TCI state index, the access-link TCI state index, or the time domain resource allocation.

In one aspect, the aforementioned means may be the processor 2104 shown in FIG. 21 and configured to perform the functions recited by the aforementioned means. In another aspect, the aforementioned means may be a circuit, or any apparatus configured to perform the functions recited by the aforementioned means.

According to another aspect, an article of manufacture for use by a base station that controls a wireless repeater device for wireless communication in a wireless communication network is described. The article may include a non-transitory computer-readable medium having stored therein instructions executable by one or more processors of the wireless communication device to: determine to relay traffic, between a first wireless communication device and a second wireless communication device, through the repeater device; obtain a time division duplex state associated with the traffic; obtain a fronthaul-link TCI state index associated with the traffic; obtain an access-link TCI state index associated with the traffic; obtain a time domain resource allocation associated with the traffic; and transmit, to the repeater device, control information over control signaling to configure a relay unit of the repeater device to communicate the traffic between the first wireless communication device and the second wireless communication device using at least one of: the time division duplex state, the fronthaul-link TCI state index, the access-link TCI state index, or the time domain resource allocation.

Of course, in the above examples, the circuitry included in the processor 1804 and/or 2104 is merely provided as an example, and other means for carrying out the described functions may be included within various aspects of the present disclosure, including but not limited to the instructions stored in the computer-readable medium 1806 and/or 2106, or any other suitable apparatus or means described in any one of the FIGS. 1, 2, 5, 6, 7, 8, 9, 11, 12, 18, 21 and/or 19, and utilizing, for example, the processes and/or algorithms described herein in relation to FIG. 20 and/or FIG. 22.

The following provides an overview of the present disclosure:

Aspect 1: A method of wireless communication at a wireless repeater device controlled by a base station in a wireless communication network, comprising: receiving, from the base station, control signaling comprising control information, in association with traffic relayed through the repeater device between a first wireless communication device and a second wireless communication device; obtaining a time division duplex state from the control information; obtaining a fronthaul link transmission control indicator (TCI) state index from the control information; obtaining an access link TCI state index from the control information; obtaining a time domain resource allocation from the control information; and configuring a relay unit of the repeater device to communicate the traffic between the first wireless communication device and the second wireless communication device using at least one of: the time division duplex state, the fronthaul link TCI state index, the access link TCI state index, or the time domain resource allocation.

Aspect 2: The method of aspect 1, wherein at least one of: the first wireless communication device, or the second wireless communication device comprise: at least one of: the base station, one or more different base stations, one or more different wireless communication devices, one or more integrated access and backhaul (IAB) nodes, or one or more different repeater devices.

Aspect 3: The method of aspect 1 or 2, wherein obtaining the time division duplex state further comprises: configuring the relay unit to relay the traffic in a direction indicated by the time division duplex state.

Aspect 4: The method of aspect 3, wherein obtaining the fronthaul link TCI state index further comprises: configuring a fronthaul link beam of the relay unit, according to the fronthaul link TCI state index, from a plurality of fronthaul link beam configurations corresponding to at least one of: a downlink (DL) fronthaul link beam, or an uplink (UL) fronthaul link beam.

Aspect 5: The method of aspect 3 or 4, wherein obtaining the access link TCI state index further comprises: configuring an access link beam of the relay unit, according to the access link TCI state index, from a plurality of access link beam configurations corresponding to at least one of: a DL access link beam, or a UL access link beam.

Aspect 6: The method of any of aspects 1 through 5, wherein obtaining the time domain resource allocation further comprises: configuring the relay unit to relay the traffic identified by at least one of: a slot location, or a symbol location of the traffic obtained from the time domain resource allocation.

Aspect 7: The method of aspect 6, further comprising at least one of: configuring the relay unit with a respective default of at least one of: the time division duplex state, the fronthaul link TCI state index, the access link TCI state index, or the time domain resource allocation when a respective value is not given with the control information, or configuring the relay unit to not relay a message when a predetermined value of the fronthaul link TCI state index or the access link TCI state index is given with the control information.

Aspect 8: The method of aspect 6 or 7, wherein at least one of: the obtaining the fronthaul link transmission control indicator (TCI) state index, or the obtaining the access link TCI state index further comprises at least one of: receiving a periodic slot-level beamforming pattern, or receiving a symbol-level beamforming pattern in a slot identified by a slot index number.

Aspect 9: The method of any of aspects 1 through 8, wherein the repeater device is bidirectional and communicates the traffic in a first direction and a second traffic in a second direction, the method further comprising: obtaining a second time division duplex state from the control information; obtaining a second fronthaul link TCI state index from the control information; obtaining a second access link TCI state index from the control information; obtaining a time configuration comprised of a start symbol and a duration from the control information; configuring the relay unit to communicate the traffic between the first wireless communication device and the second wireless communication device in the first direction using at least one of: the time division duplex state, the fronthaul link TCI state index, the access link TCI state index, or the time domain resource allocation; and configuring the relay unit to communicate the second traffic between the first wireless communication device and the second wireless communication device in the second direction using at least one of: the second time division duplex state, the second fronthaul link TCI state index, the second access link TCI state index, or the time configuration.

Aspect 10: A wireless repeater device for wireless communication, controlled by a base station, in a wireless communication network, comprising: a wireless transceiver; a memory; and a processor communicatively coupled to the wireless transceiver and the memory, wherein the processor and the memory are configured to: receive, from the base station, control signaling comprising control information, in association with traffic relayed through the repeater device between a first wireless communication device and a second wireless communication device; obtain a time division duplex state from the control information; obtain a fronthaul link transmission control indicator (TCI) state index from the control information; obtain an access link TCI state index from the control information; obtain a time domain resource allocation from the control information; and configure a relay unit of the repeater device to communicate the traffic between the first wireless communication device and the second wireless communication device using at least one of: the time division duplex state, the fronthaul link TCI state index, the access link TCI state index, or the time domain resource allocation.

Aspect 11: The wireless repeater device of aspect 10, wherein the processor and the memory are further configured to: configure the relay unit to relay the traffic in a direction indicated by the time division duplex state.

Aspect 12: The wireless repeater device of aspect 10 or 11, wherein the processor and the memory are further configured to: configure a fronthaul link beam of the relay unit, according to the fronthaul link TCI state index, from a plurality of fronthaul link beam configurations corresponding to at least one of: a downlink (DL) fronthaul link beam, or an uplink (UL) fronthaul link beam.

Aspect 13: The wireless repeater device of aspect 12, wherein the processor and the memory are further configured to: configure an access link beam of the relay unit, according to the access link TCI state index, from a plurality of access link beam configurations corresponding to at least one of: a DL access link beam, or a UL access link beam.

Aspect 14: The wireless repeater device of any of aspects 10 through 13, wherein the processor and the memory are further configured to: configure the relay unit to relay the traffic identified by at least one of: a slot location, or a symbol location of the traffic obtained from the time domain resource allocation.

Aspect 15: The wireless repeater device of any of aspects 10 through 14, wherein the processor and the memory are further configured to: configure the relay unit with a respective default of at least one of: the time division duplex state, the fronthaul link TCI state index, the access link TCI state index, or the time domain resource allocation when a respective value is not given with the control information, or configure the relay unit to not relay a message when a predetermined value of the fronthaul link TCI state index or the access link TCI state index is given with the control information.

Aspect 16: The wireless repeater device of any of aspects 10 through 15, wherein the repeater device is bidirectional and communicates the traffic in a first direction and a second traffic in a second direction, wherein the processor and the memory are further configured to: obtain a second time division duplex state from the control information; obtain a second fronthaul link TCI state index from the control information; obtaining a second access link TCI state index from the control information; obtain a time configuration comprised of a start symbol and a duration from the control information; configure the relay unit to communicate the traffic between the first wireless communication device and the second wireless communication device in the first direction using at least one of: the time division duplex state, the fronthaul link TCI state index, the access link TCI state index, or the time domain resource allocation; and configure the relay unit to communicate the second traffic between the first wireless communication device and the second wireless communication device in the second direction using at least one of: the second time division duplex state, the second fronthaul link TCI state index, the second access link TCI state index, or the time configuration.

Aspect 17: A method of wireless communication at a base station that controls a wireless repeater device in a wireless communication network, comprising: determining to relay traffic, between a first wireless communication device and a second wireless communication device, through the repeater device; obtaining a time division duplex state associated with the traffic; obtaining a fronthaul link transmission control indicator (TCI) state index associated with the traffic; obtaining an access link TCI state index associated with the traffic; obtaining a time domain resource allocation associated with the traffic; and transmitting, to the repeater device, control information over control signaling to configure a relay unit of the repeater device to communicate the traffic between the first wireless communication device and the second wireless communication device using the control information comprising at least one of: the time division duplex state, the fronthaul link TCI state index, the access link TCI state index, or the time domain resource allocation.

Aspect 18: The method of aspect 17, wherein at least one of: the first wireless communication device, or the second wireless communication device comprise: at least one or more of: the base station, one or more different base stations, one or more different wireless communication devices, one or more integrated access and backhaul (IAB) nodes, or one or more different repeater devices.

Aspect 19: The method of aspect 17 or 18, wherein obtaining the time division duplex state further comprises: configuring the control information with a traffic direction indicated by the time division duplex state.

Aspect 20: The method of aspect 19, wherein obtaining the fronthaul link TCI state index further comprises: configuring the control information with the fronthaul link TCI state index that indicates one fronthaul link beam configuration, of the relay unit, from a plurality of fronthaul link beam configurations corresponding to at least one of: a downlink (DL) fronthaul link beam, or an uplink (UL) fronthaul link beam.

Aspect 21: The method of any of aspects 17 through 20, wherein obtaining the access link TCI state index further comprises: configuring the control information with the access link TCI state index that indicates one access link beam configuration, of the relay unit, from a plurality of access link beam configurations corresponding to at least one of: a DL access link beam, or a UL access link beam.

Aspect 22: The method of any of aspects 17 through 21, further comprising at least one of: not providing a value of at least one of: the time division duplex state, the fronthaul link TCI state index, the access link TCI state index, or the time domain resource allocation with the control information to cause the repeater device to configure the relay unit with a respective default, or providing a predetermined value of the fronthaul link TCI state index or the access link TCI state index with the control information to cause the repeater device to configure the relay unit to not relay a message.

Aspect 23: The method of any of aspects 17 through 22, wherein at least one of: the obtaining the fronthaul link transmission control indicator (TCI) state index, or the obtaining the access link TCI state index further comprises at least one of: transmitting a periodic slot-level beamforming pattern, or transmitting a symbol-level beamforming pattern in a slot identified by a slot index number.

Aspect 24: A base station for wireless communication, that controls a wireless repeater device in a wireless communication network, comprising: a wireless transceiver; a memory; and a processor communicatively coupled to the wireless transceiver and the memory, wherein the processor and the memory are configured to: determine to relay traffic, between a first wireless communication device and a second wireless communication device, through the repeater device; obtain a time division duplex state associated with the traffic; obtain a fronthaul link transmission control indicator (TCI) state index associated with the traffic; obtain an access link TCI state index associated with the traffic; obtain a time domain resource allocation associated with the traffic; and transmit, to the repeater device, control information over control signaling to configure a relay unit of the repeater device to communicate the traffic between the first wireless communication device and the second wireless communication device using the control information comprising at least one of: the time division duplex state, the fronthaul link TCI state index, the access link TCI state index, or the time domain resource allocation.

Aspect 25: The base station of aspect 24, wherein at least one of: the first wireless communication device, or the second wireless communication device comprise: at least one or more of: the base station, one or more different base stations, one or more different wireless communication devices, one or more integrated access and backhaul (IAB) nodes, or one or more different repeater devices.

Aspect 26: The base station of aspect 24 or 25, wherein the processor and the memory are further configured to: configure the control information with a traffic direction indicated by the time division duplex state.

Aspect 27: The base station of aspect 26, wherein the processor and the memory are further configured to: configure the control information with the fronthaul link TCI state index that indicates one fronthaul link beam configuration, of the relay unit, from a plurality of fronthaul link beam configurations corresponding to at least one of: a downlink (DL) fronthaul link beam, or an uplink (UL) fronthaul link beam.

Aspect 28: The base station of aspect 26 or 27, wherein the processor and the memory are further configured to: configure the control information with the access link TCI state index that indicates one access link beam configuration, of the relay unit, from a plurality of access link beam configurations corresponding to at least one of: a DL access link beam, or a UL access link beam.

Aspect 29: The base station of any of aspects 24 through 28, wherein the processor and the memory are further configured to: not provide a value of at least one of: the time division duplex state, the fronthaul link TCI state index, the access link TCI state index, or the time domain resource allocation with the control information to cause the repeater device to configure the relay unit with a respective default, or provide a predetermined value of the fronthaul link TCI state index or the access link TCI state index with the control information to cause the repeater device to configure the relay unit to not relay a message.

Aspect 30: The base station of any of aspects 24 through 29, wherein at least one of: the obtaining the fronthaul link TCI state index, or the obtaining the access link TCI state index further comprises at least one of: transmitting a periodic slot-level beamforming pattern, or transmitting a symbol-level beamforming pattern in a slot identified by a slot index number, and the processor and the memory are further configured to at least one of: transmit the periodic slot-level beamforming pattern, or transmit the symbol-level beamforming pattern in the slot identified by the slot index number.

Aspect 31: An apparatus configured for wireless communication comprising at least one means for performing a method of any one of aspects 1 through 9 or 17 through 23.

Aspect 32: A non-transitory computer-readable medium storing computer-executable code, comprising code for causing an apparatus to perform a method of any one of aspects 1 through 9 or 17 through 23.

Several aspects of a wireless communication network have been presented with reference to an exemplary implementation. As those of ordinary skill in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The word "obtain" is used to mean to get, to acquire, to select, to copy, to derive, and/or to calculate. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, features, and/or functions illustrated in FIGS. 1-22 may be rearranged and/or combined into a single component, feature, or function or embodied in several components, features, or functions. Additional elements, components, features, and/or functions may also be added without departing from novel features disclosed herein. The apparatus, devices, and/or components illustrated in FIGS. 1, 2, 5-12, 18, 19, and/or 21 may be configured to perform one or more of the methods, features, and/or functions described herein, including those associated with FIGS. 13, 17, 20, and/or 22. The novel algorithms described herein may also be efficiently implemented in software and/or embedded in hardware.

It is to be understood that the specific order or hierarchy of blocks in the methods disclosed is an illustration of exemplary processes. Based upon design preferences, it is understood that the specific order or hierarchy of blocks in the methods may be rearranged. The accompanying method claims present elements of the various blocks in a sample order and are not meant to be limited to the specific order or hierarchy presented unless specifically recited therein.

The previous description is provided to enable any person skilled in the art to practice the various aspects described herein. Various modifications to these aspects will be readily apparent to those of ordinary skill in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Similarly, the construct of "A and/or B" is intended to cover: A; B; or A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a wireless repeater device controlled by a base station in a wireless communication network, comprising:
   receiving, from the base station, control signaling comprising control information, in association with traffic relayed through the repeater device between a first wireless communication device and a second wireless communication device;
   obtaining a time division duplex state from the control information;
   obtaining a fronthaul-link transmission control indicator (TCI) state index from the control information, wherein the fronthaul-link TCI state index is indicative of at least one fronthaul-link beams between the repeater device and the first wireless communication device;
   obtaining an access-link TCI state index from the control information, wherein the access-link TCI state index is indicative of at least one access-link beams between the repeater device and the second wireless communication device;
   obtaining a time domain resource allocation from the control information; and
   configuring a relay unit of the repeater device to communicate the traffic between the first wireless communication device and the second wireless communication device using at least one of: the time division duplex state, the fronthaul-link TCI state index, the access-link TCI state index, or the time domain resource allocation.

2. The method of claim 1, wherein at least one of: the first wireless communication device, or the second wireless communication device comprise:
   at least one of: the base station, one or more different base stations, one or more different wireless communication devices, one or more integrated access and backhaul (IAB) nodes, or one or more different repeater devices.

3. The method of claim 1, wherein obtaining the time division duplex state further comprises:
   configuring the relay unit to relay the traffic in a direction indicated by the time division duplex state.

4. The method of claim 1, wherein obtaining the fronthaul-link TCI state index further comprises:
   configuring a fronthaul-link beam of the relay unit, according to the fronthaul-link TCI state index, from a plurality of fronthaul-link beam configurations corresponding to at least one of: a downlink (DL) fronthaul-link beam, or an uplink (UL) fronthaul-link beam.

5. The method of claim 1, wherein obtaining the access-link TCI state index further comprises:
   configuring an access-link beam of the relay unit, according to the access-link TCI state index, from a plurality of access-link beam configurations corresponding to at least one of: a downlink (DL) access-link beam, or an uplink (UL) access-link beam.

6. The method of claim 1, wherein obtaining the time domain resource allocation further comprises:
   configuring the relay unit to relay the traffic identified by at least one of: a slot location, or a symbol location of the traffic obtained from the time domain resource allocation.

7. The method of claim 1, further comprising at least one of:
   configuring the relay unit with a respective default of at least one of: the time division duplex state, the fronthaul-link TCI state index, the access-link TCI state index, or the time domain resource allocation when a respective value is not given with the control information, or
   configuring the relay unit to not relay a message when a predetermined value of the fronthaul-link TCI state index or the access-link TCI state index is given with the control information.

8. The method of claim 1, wherein at least one of: the obtaining the fronthaul-link transmission control indicator (TCI) state index, or the obtaining the access-link TCI state index further comprises at least one of:
   receiving a periodic slot-level beamforming pattern, or
   receiving a symbol-level beamforming pattern in a slot identified by a slot index number.

9. The method of claim 1, wherein the repeater device is bidirectional and communicates the traffic in a first direction and a second traffic in a second direction, the method further comprising:
   obtaining a second time division duplex state from the control information;
   obtaining a second fronthaul-link TCI state index from the control information;
   obtaining a second access-link TCI state index from the control information;
   obtaining a time configuration comprised of a start symbol and a duration from the control information;
   configuring the relay unit to communicate the traffic between the first wireless communication device and the second wireless communication device in the first direction using at least one of: the time division duplex state, the fronthaul-link TCI state index, the access-link TCI state index, or the time domain resource allocation; and configuring the relay unit to communicate the second traffic between the first wireless communication device and the second wireless communication device in the second direction using at least one of: the second time division duplex state, the second fronthaul-link TCI state index, the second access-link TCI state index, or the time configuration.

10. A wireless repeater device for wireless communication, controlled by a base station, in a wireless communication network, comprising:

a wireless transceiver;

a memory; and a processor communicatively coupled to the wireless transceiver and the memory, wherein the processor is configured to:

receive, from the base station, control signaling comprising control information, in association with traffic relayed through the repeater device between a first wireless communication device and a second wireless communication device;

obtain a time division duplex state from the control information;

obtain a fronthaul-link transmission control indicator (TCI) state index from the control information, wherein the fronthaul-link TCI state index is indicative of at least one fronthaul-link beams between the repeater device and the first wireless communication device;

obtain an access-link TCI state index from the control information, wherein the access-link TCI state index is indicative of at least one access-link beams between the repeater device and the second wireless communication device;

obtain a time domain resource allocation from the control information; and configure a relay unit of the repeater device to communicate the traffic between the first wireless communication device and the second wireless communication device using at least one of: the time division duplex state, the fronthaul-link TCI state index, the access-link TCI state index, or the time domain resource allocation.

11. The wireless repeater device of claim 10, wherein the processor is further configured to:

configure the relay unit to relay the traffic in a direction indicated by the time division duplex state.

12. The wireless repeater device of claim 10, wherein the processor is further configured to:

configure a fronthaul-link beam of the relay unit, according to the fronthaul-link TCI state index, from a plurality of fronthaul-link beam configurations corresponding to at least one of: a downlink (DL) fronthaul-link beam, or an uplink (UL) fronthaul-link beam.

13. The wireless repeater device of claim 10, wherein the processor is further configured to:

configure an access-link beam of the relay unit, according to the access-link TCI state index, from a plurality of access-link beam configurations corresponding to at least one of: a downlink (DL) access-link beam, or an uplink (UL) access-link beam.

14. The wireless repeater device of claim 10, wherein the processor is further configured to:

configure the relay unit to relay the traffic identified by at least one of: a slot location, or a symbol location of the traffic obtained from the time domain resource allocation.

15. The wireless repeater device of claim 10, wherein the processor is further configured to:

configure the relay unit with a respective default of at least one of: the time division duplex state, the fronthaul-link TCI state index, the access-link TCI state index, or the time domain resource allocation when a respective value is not given with the control information, or configure the relay unit to not relay a message when a predetermined value of the fronthaul-link TCI state index or the access-link TCI state index is given with the control information.

16. The wireless repeater device of claim 10, wherein the repeater device is bidirectional and communicates the traffic in a first direction and a second traffic in a second direction, wherein the processor is further configured to:

obtain a second time division duplex state from the control information;

obtain a second fronthaul-link TCI state index from the control information;

obtain a second access-link TCI state index from the control information;

obtain a time configuration comprised of a start symbol and a duration from the control information;

configure the relay unit to communicate the traffic between the first wireless communication device and the second wireless communication device in the first direction using at least one of: the time division duplex state, the fronthaul-link TCI state index, the access-link TCI state index, or the time domain resource allocation; and configure the relay unit to communicate the second traffic between the first wireless communication device and the second wireless communication device in the second direction using at least one of: the second time division duplex state, the second fronthaul-link TCI state index, the second access-link TCI state index, or the time configuration.

17. A method of wireless communication at a base station that controls a wireless repeater device in a wireless communication network, comprising:

determining to relay traffic, between a first wireless communication device and a second wireless communication device, through the repeater device;

obtaining a time division duplex state associated with the traffic;

obtaining a fronthaul-link transmission control indicator (TCI) state index associated with the traffic, wherein the fronthaul-link TCI state index is indicative of at least one fronthaul-link beams between the repeater device and the first wireless communication device;

obtaining an access-link TCI state index associated with the traffic, wherein the access-link TCI state index is indicative of at least one access-link beams between the repeater device and the second wireless communication device;

obtaining a time domain resource allocation associated with the traffic; and transmitting, to the repeater device, control information over control signaling to configure a relay unit of the repeater device to communicate the traffic between the first wireless communication device and the second wireless communication device using the control information comprising at least one of: the time division duplex state, the fronthaul-link TCI state index, the access-link TCI state index, or the time domain resource allocation.

18. The method of claim 17, wherein at least one of: the first wireless communication device, or the second wireless communication device comprise:
at least one or more of: the base station, one or more different base stations, one or more different wireless communication devices, one or more integrated access and backhaul (IAB) nodes, or one or more different repeater devices.

19. The method of claim 17, wherein obtaining the time division duplex state further comprises:
configuring the control information with a traffic direction indicated by the time division duplex state.

20. The method of claim 17, wherein obtaining the fronthaul-link TCI state index further comprises:
configuring the control information with the fronthaul-link TCI state index that indicates one fronthaul-link beam configuration, of the relay unit, from a plurality of fronthaul-link beam configurations corresponding to at least one of: a downlink (DL) fronthaul-link beam, or an uplink (UL) fronthaul-link beam.

21. The method of claim 17, wherein obtaining the access-link TCI state index further comprises:
configuring the control information with the access-link TCI state index that indicates one access-link beam configuration, of the relay unit, from a plurality of access-link beam configurations corresponding to at least one of: a downlink (DL) access-link beam, or an uplink (UL) access-link beam.

22. The method of claim 17, further comprising at least one of:
not providing a value of at least one of: the time division duplex state, the fronthaul-link TCI state index, the access-link TCI state index, or the time domain resource allocation with the control information to cause the repeater device to configure the relay unit with a respective default, or
providing a predetermined value of the fronthaul-link TCI state index or the access-link TCI state index with the control information to cause the repeater device to configure the relay unit to not relay a message.

23. The method of claim 17, wherein at least one of: the obtaining the fronthaul-link transmission control indicator (TCI) state index, or the obtaining the access-link TCI state index further comprises at least one of:
transmitting a periodic slot-level beamforming pattern, or transmitting a symbol-level beamforming pattern in a slot identified by a slot index number.

24. A base station for wireless communication, that controls a wireless repeater device in a wireless communication network, comprising:
a wireless transceiver;
a memory; and
a processor communicatively coupled to the wireless transceiver and the memory, wherein the processor is configured to:
determine to relay traffic, between a first wireless communication device and a second wireless communication device, through the repeater device;
obtain a time division duplex state associated with the traffic;
obtain a fronthaul-link transmission control indicator (TCI) state index associated with the traffic, wherein the fronthaul-link TCI state index is indicative of at least one fronthaul-link beams between the repeater device and the first wireless communication device;
obtain an access-link TCI state index associated with the traffic, wherein the access-link TCI state index is indicative of at least one access-link beams between the repeater device and the second wireless communication device;
obtain a time domain resource allocation associated with the traffic; and
transmit, to the repeater device, control information over control signaling to configure a relay unit of the repeater device to communicate the traffic between the first wireless communication device and the second wireless communication device using the control information comprising at least one of: the time division duplex state, the fronthaul-link TCI state index, the access-link TCI state index, or the time domain resource allocation.

25. The base station of claim 24, wherein at least one of: the first wireless communication device, or the second wireless communication device comprise:
at least one or more of: the base station, one or more different base stations, one or more different wireless communication devices, one or more integrated access and backhaul (IAB) nodes, or one or more different repeater devices.

26. The base station of claim 24, wherein the processor is further configured to:
configure the control information with a traffic direction indicated by the time division duplex state.

27. The base station of claim 24, wherein the processor is further configured to:
configure the control information with the fronthaul-link TCI state index that indicates one fronthaul-link beam configuration, of the relay unit, from a plurality of fronthaul-link beam configurations corresponding to at least one of: a downlink (DL) fronthaul-link beam, or an uplink (UL) fronthaul-link beam.

28. The base station of claim 24, wherein the processor is further configured to:
configure the control information with the access-link TCI state index that indicates one access-link beam configuration, of the relay unit, from a plurality of access-link beam configurations corresponding to at least one of: a downlink (DL) access-link beam, or an uplink (UL) access-link beam.

29. The base station of claim 24, wherein the processor is further configured to:
not provide a value of at least one of: the time division duplex state, the fronthaul-link TCI state index, the access-link TCI state index, or the time domain resource allocation with the control information to cause the repeater device to configure the relay unit with a respective default, or
provide a predetermined value of the fronthaul-link TCI state index or the access-link TCI state index with the control information to cause the repeater device to configure the relay unit to not relay a message.

30. The base station of claim 24, wherein the processor is further configured to at least one of:
transmit the periodic slot-level beamforming pattern, or transmit the symbol-level beamforming pattern in the slot identified by the slot index number.

* * * * *